United States Patent [19]
Jefferies et al.

[11] 4,146,558
[45] Mar. 27, 1979

[54] AZO DYESTUFF INTERMEDIATE NITRO- OR AMINOBENZENES RING-SUBSTITUTED BY A QUATERNIZED AMINE ALKYL OR AMINO-ALKOXY GROUP

[75] Inventors: Patrick J. Jefferies, Fort Mitchell, Ky.; Nathan N. Crounse, Cincinnati, Ohio

[73] Assignee: Sterling Drug Inc., New York, N.Y.

[21] Appl. No.: 839,975

[22] Filed: Oct. 6, 1977

Related U.S. Application Data

[63] Continuation-in-part of Ser. No. 672,428, Mar. 31, 1976, Pat. No. 4,065,500, which is a continuation-in-part of Ser. No. 486,180, Jul. 5, 1974, Pat. No. 3,996,282, which is a continuation-in-part of Ser. No. 51,690, Jul. 1, 1970, Pat. No. 3,839,426, which is a continuation-in-part of Ser. No. 777,884, Nov. 21, 1968, abandoned, which is a continuation-in-part of Ser. No. 551,868, May 23, 1966, abandoned, which is a continuation-in-part of Ser. No. 595,864, Jul. 14, 1975, Pat. No. 4,103,042, which is a continuation-in-part of Ser. No. 332,511, Feb. 14, 1973, Pat. No. 3,935,182, which is a continuation-in-part of Ser. No. 201,153, Nov. 22, 1971, Pat. No. 3,784,599, which is a continuation-in-part of Ser. No. 51,676, Jul. 1, 1970, Pat. No. 3,709,903, which is a continuation-in-part of Ser. No. 777,884, Nov. 21, 1968, abandoned, which is a continuation-in-part of Ser. No. 551,868, May 23, 1966, abandoned.

[51] Int. Cl.$^2$ .................. C07C 85/02; C07C 87/30; C07C 103/54
[52] U.S. Cl. .................. 260/562 R; 260/154; 260/157; 260/175; 260/176; 260/184; 260/185; 260/193; 260/197; 260/199; 260/204; 260/326.2; 260/326.43; 260/558 P; 260/559 R; 260/562 A; 260/567.6 M; 544/391; 544/165; 544/163; 546/233; 546/205; 546/230; 546/234; 546/235
[58] Field of Search .................. 260/567.6 R, 567.6 A, 260/567.6 M, 567.6 P, 562 R, 562 A, 558 P

[56] References Cited

U.S. PATENT DOCUMENTS

| | | | |
|---|---|---|---|
| 2,151,518 | 3/1939 | Krzikalla et al. | 260/163 |
| 2,679,533 | 5/1954 | Darragh et al. | 260/567.6 |
| 2,813,904 | 11/1957 | Lott et al. | 260/567.6 |
| 2,821,526 | 1/1958 | Boyd | 260/205 |
| 2,945,849 | 7/1960 | Kruckenberg et al. | 260/185 |
| 3,037,910 | 6/1962 | Copp et al. | 260/567.6 M X |
| 3,055,939 | 9/1962 | Cavallito et al. | 260/567.6 P |
| 3,090,725 | 5/1963 | Copp et al. | 424/199 |
| 3,170,909 | 2/1965 | Neracher et al. | 260/152 |
| 3,200,143 | 8/1965 | Copp | 260/567.6 M |
| 3,203,991 | 8/1965 | Blank et al. | 260/570 |
| 3,524,842 | 8/1970 | Grossmann et al. | 260/151 |
| 3,634,511 | 1/1972 | Howe et al. | 260/562 A |
| 3,729,459 | 4/1973 | Hegar | 260/205 |
| 3,875,215 | 4/1975 | Strycker | 260/501.15 |

OTHER PUBLICATIONS

Akhvlediani et al., Chemical Abstracts, vol. 65, 16886b (1966).
Credner et al., Chemical Abstracts, vol. 50, 6683c (1956).
Linnell et al., J. Pharm. Pharmacol., vol. 4, pp. 55 to 65 (1952).
Reilly et al., J. Chem. Soc. (London), vol. of 1935, pp. 871-873.

*Primary Examiner*—Floyd D. Higel
*Attorney, Agent, or Firm*—Lynn T. Fletcher; B. Woodrow Wyatt

[57] ABSTRACT

Water-soluble cationic dyestuffs of the formulae

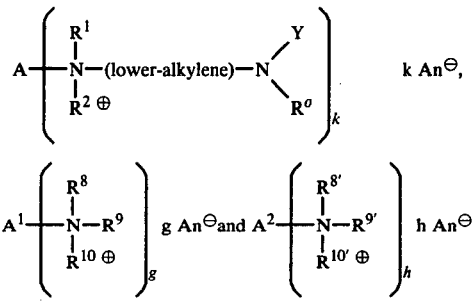

wherein $R^0$ is hydrogen, lower-alkyl or hydroxy-lower-alkyl;

$R^1$ is lower-alkyl, lower-alkenyl or hydroxy-lower-alkyl;

$R^2$ is lower-alkyl, lower-alkenyl, hydroxy-lower-alkyl or -(lower-alkylene)-$NR^0Y$ or $R^1$ and $R^2$ together with the nitrogen atom, are pyrrolidino, piperidino or 4-lower-alkanoyl piperazino;

Y is hydrogen or

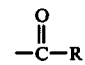

wherein R is hydrogen, lower-alkyl, lower-alkenyl, phenyl or phenyl-lower-alkyl;

A is a member selected from the group consisting of an aromatic azo dyestuff residue attached to the quaternary ammonium nitrogen atom through a lower-alkylene bridge.

k is a small integer whose value is dependent on the nature of A such that it has a range from one to two;

$R^8$ is lower-alkyl, lower-alkenyl or hydroxy-lower-alkyl;

$R^9$ is lower-alkyl, hydroxy-lower-alkyl or $NH_2$;

$R^{10}$ is lower-alkyl or lower-alkenyl;

$A^1$ is an aromatic azo dyestuff residue attached to the quaternary ammonium nitrogen atom through a lower-alkylene bridge;

g is a small integer whose value is dependent on the nature of $A^1$ such that it has a range from one to two;

$R^{8'}$ is lower-alkyl;

$R^{9'}$ is lower-alkyl, lower-alkenyl or hydroxy-lower-alkyl;

$R^{10'}$ is lower-alkyl, lower-alkenyl or hydroxy-lower-alkyl or $R^{9'}$ and $R^{10'}$ together with the nitrogen atom are morpholino;

$A^2$ is an aromatic azo dyestuff residue attached to the quaternary ammonium nitrogen atom through a lower-alkylene bridge;

h is a small integer whose value is dependent on the nature of $A^2$ such that it has a range from one to two; and An is an anion are particularly useful for coloring natural fibers, synthetic fiber-forming materials and cellulosic materials. These dyes dye cotton and paper various shades of stable yellows, reds and oranges. The dyeing from these dyes on paper are less prone to bleed and have a high degree of color discharge when bleached with hypochlorite or chlorine bleaches.

12 Claims, No Drawings

AZO DYESTUFF INTERMEDIATE NITRO- OR AMINOBENZENES RING-SUBSTITUTED BY A QUATERNIZED AMINE ALKYL OR AMINO-ALKOXY GROUP

This application is a continuation-in-part of our prior copending application Ser. No. 672,428, filed Mar. 31, 1976 (now U.S. Pat. No. 4,065,500 issued Dec. 27, 1977), which in turn is a continuation-in-part of our prior copending application Ser. No. 486,180, filed July 5, 1974 (now U.S. Pat. No. 3,996,282 issued Dec. 7, 1976), which in turn is a continuation-in-part of our prior copending application Ser. No. 51,690, filed July 1, 1970 (now U.S. Pat. No. 3,839,426 issued Oct. 1, 1974), which in turn is a continuation-in-part of our now-abandoned application Ser. No. 777,884, filed Nov. 21, 1968, which in turn is a continuation-in-part of our now-abandoned application Ser. No. 551,868, filed May 23, 1966; which is a continuation-in-part of our copending application Ser. No. 595,864, filed July 14, 1975 (now U.S. Pat. No. 4,103,042), which in turn is a continuation-in-part of our prior copending application Ser. No. 332,511, filed Feb. 14, 1973 (now U.S. Pat. No. 3,935,182 issued Jan. 27, 1976), which in turn is a continuation-in-part of our application Ser. No. 201,153, filed Nov. 22, 1971 (now U.S. Pat. No. 3,784,599 issued Jan. 8, 1974), which in turn is a continuation-in-part of our application Ser. No. 51,676, filed July 1, 1970 (now U.S. Pat. No. 3,709,903 issued Jan. 9, 1973), which in turn is a continuation-in-part of our now-abandoned application Ser. No. 777,884, filed Nov. 21, 1968, which in turn is a continuation-in-part of our now-abandoned application Ser. No. 551,868, filed May 23, 1966.

BACKGROUND OF THE INVENTION (a) Field of the Invention

This invention relates to cationic azo dyestuffs. More particularly, the present invention relates to novel water-soluble quaternary ammonium azo dyestuffs useful in the dyeing art, particularly for coloring natural fibers, synthetic fiber-forming material and cellulosic materials such as threads, sheets, fibers, filaments, textile fabrics and the like, as well as in the manufacture of paper, varnishes, inks, coatings and plastics.

(b) Description of the Prior Art

A number of quaternary ammonium azo compounds of widely diverse structural types are known to be useful as dyestuffs for coloring synthetic fibers and cellulosic materials in various shades of yellows, reds and oranges. For example, U.S. Pat. No. 2,821,526, patented Jan. 28, 1958, teaches monoazo dyes bearing a quaternized group of the type

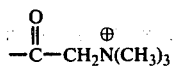

which are prepared by coupling a diazotized N-(p-aminophenacyl)-N,N,N-trialkyl ammonium halide with a N,N-dialkylaniline. The products are indicated as being useful for dyeing acrylic fiber or acrylic fiber in mixture with cellulosic fiber. U.S. Pat. No. 2,945,849, patented July 19, 1960, teaches in particular, unsymmetrical disazo compounds containing a quaternary ammonium group of the type $-N(C_2H_5)CH_2CH_2N^{\oplus}(CH_3)_3$ which are obtained by coupling a diazotized aminophenyl-azo-benzene with a N,N,N-trialkyl-N-2-(N'-alkylanilino)ethylammonium halide or methosulfate.

These compounds are stated to be useful for dyeing and printing polymers of acrylonitrile. U.S. Pat. No. 3,524,842, patented Aug. 18, 1970, teaches water-soluble cationic phenylazonaphthol dyestuffs bearing a simple quaternary ammonium moiety which are prepared by coupling a diazotized phenylenediamine with a N-(hydroxynaphthyl)-N,N,N-trimethyl ammonium halide. The products are taught to be useful for dyeing tanned cotton. U.S. Pat. No. 3,729,459, patented Apr. 24, 1973, discloses quaternized monoazo dyestuffs bearing a quaternary ammonium moiety of the type $-N(C_2H_5)CH_2CH_2N^{\oplus}(CH_3)_2C_6H_5$ which are prepared by coupling a diazotized aromatic or heterocyclic amine with, inter alia, a N-(N'-alkylanilino)ethyl-N-phenyl-N,N-dialkylammonium halide. The products are taught to be useful in dyeing synthetic fibers. However, heretofore known water-soluble quaternary ammonium azo and disazo dyestuffs have suffered from a number of deficiencies when employed as dyes for coloring cellulose in the form of bleached pulp of the type used for the manufacture of household paper goods such as paper napkins, paper toweling, facial tissues and so forth. Thus, they have been found to undesirably bleed out of paper products colored with them when the article is brought into contact with water, milk, soapy solutions or other common household solutions. They have also been found to have relatively poor substantivity to bleached pulp and have suffered from a low rate and degree of exhaust from dyeing solutions containing them. There is thus a need for water-soluble dyestuffs for coloring bleached pulp which have high bleed resistance, good substantivity and a high rate and a high degree of exhaust from aqueous dyeing solutions in which they are utilized. It has surprisingly been found that the quaternary ammonium azo compounds of the instant invention possess these desired properties and consequently are particularly well adapted as dyestuffs for bleached pulp.

U.S. Pat. No. 3,170,909, patented Feb. 23, 1965, teaches quaternary ammonium salts of azo compounds bearing a moiety of the type

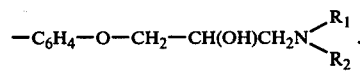

The compounds, which are stated to be useful as dyestuffs for dyeing cellulosic materials and synthetic fibers, are prepared by interacting in a step-wise sequence a phenylazophenol with an epihalohydrin to form a (2,3-epoxy-propoxy)pheny-azo-benzene which is then interacted with a secondary amine. The resulting aminated product is then quaternized with a suitable quaternizing agent, for example, an alkyl halide to form a N-(3-phenylazophenoxy-2-hydroxypropyl)trialkyl ammonium halide.

U.S. Pat. No. 2,151,518, patented Mar. 21, 1939, discloses a 4-(2-dialkylaminoethyl)aniline which is prepared by interacting in a first step p-nitrophenylethyl alcohol with thionyl chloride. The resulting 4-(2-chloroethyl)nitrobenzene is then interacted with a dialkylamine and the nitro group subsequently reduced to the amine. The products are disclosed to be useful as intermediates to azo dyestuffs.

N-benzyl-N,N,N',N',N'-pentaalkyl alkylenediammonium halides are described in U.S. Pat. No. 2,813,904, patented Nov. 19, 1957. The compounds are indicated to be useful as intermediates to hypotensive agents and are prepared by quaternizing a N-benzyl-N,N',N'-trialkyl alkylene diamine with an alkyl halide. The above references appear to constitute the most relevant prior art with regard to the present invention.

SUMMARY OF THE INVENTION

In one of its composition of matter aspects, the invention relates to certain water-soluble quaternary ammonium azo compounds having the formula

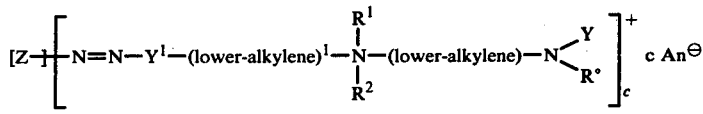

Formula I which are useful as dyestuffs.

In a second composition of matter aspect, the invention relates to certain water-soluble quaternary ammonium azo compounds which are useful as dyestuffs and having the formula

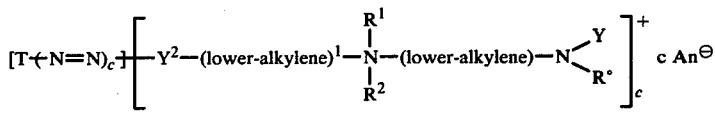

Formula II

In a third composition of matter aspect, the invention relates to certain water-soluble quaternary ammonium azo compounds which are useful as dyestuffs and having the formula

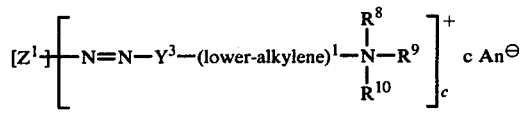

Formula III

In a fourth composition of matter aspect, the invention relates to certain water-soluble quaternary ammonium azo compounds which are useful as dyestuffs and having the formula

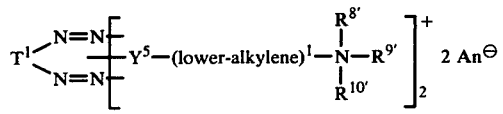

Formula IV

In a fifth composition of matter aspect, the invention relates to the N-$R^1$-N-[(lower-alkylene)$^1$-$Y^1$-$NH_2$]-N-$R^2$-N-[(lower-alkylene)-NR°Y] ammonium halides, N-$R^1$-N-[(lower-alkylene)$^1$-$Y^2$-H]-N-$R^2$-N-[(lower-alkylene)-NR°Y] ammonium halides, N-$R^8$-N-[(lower-alkylene)-$Y^3$-$NH_2$]-N-$R^9$-N-$R^{10}$ ammonium halides, and N-$R^{8'}$-N-[(lower-alkylene)-$Y^5$-H]-N-$R^{9'}$-N-$R^{10'}$ ammonium halides which are useful in the preparation of the final products of Formulas I-IV above, respectively.

In one of its process aspects, the invention relates to a process for preparing the final products of Formula I which comprises diazotizing an amine:

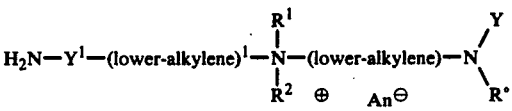

Formula V and coupling the diazonium salt with a coupling component.

In a second of its process aspects, the invention relates to a process for preparing the final products of Formula II which comprises coupling a compound:

$$H-Y^2-(lower-alkylene)^1-\overset{R^1}{\underset{R^2}{\underset{|}{N}}}-(lower-alkylene)-N\overset{Y}{\underset{R°}{\diagdown}}$$
$$\oplus \quad An^{\ominus}$$

Formula VI with the diazonium salt of an amine.

In a third of its process aspects, the invention relates to a process for preparing the final products of Formula III which comprises diazotizing an amine:

$$H_2N-Y^3-(lower-alkylene)^1-\overset{R^8}{\underset{R^{10}}{\underset{|}{N}}}-R^9$$
$$\oplus \quad An^{\ominus}$$

Formula VII and coupling the diazonium salt with a coupling component.

In a fourth of its process aspects, the invention relates to a process for preparing the final products of Formula IV which comprises coupling a compound:

$$H-Y^5-(lower-alkylene)^1-\overset{R^{8'}}{\underset{R^{10'}}{\underset{|}{N}}}-R^{9'}$$
$$\oplus \quad An^{\ominus}$$

Formula VIII with the tetrazonium salt obtained by diazotization of a diamine:

In a fifth of its process aspects, the invention relates to the preparation of water-soluble quaternary ammonium azo compounds of Formula I and of Formula II wherein Y is hydrogen, which comprises hydrolyzing a compound of Formula I or of Formula II wherein Y is —COR.

DETAILED DESCRIPTION INCLUSIVE OF THE PREFERRED EMBODIMENTS

In the first of its composition of matter aspects, the invention sought to be patented resides in the novel water-soluble quaternary ammonium azo compounds having the formula

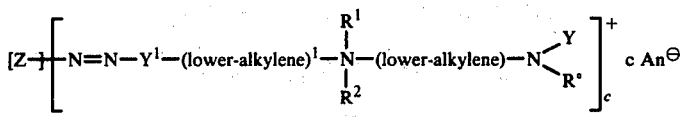

Formula I wherein c is an integer from one to two; $R^\circ$ is hydrogen, lower-alkyl or hydroxy-lower-alkyl; $R^1$ is lower-alkyl, lower-alkenyl, or hydroxy-lower-alkyl; $R^2$ is lower-alkyl, lower-alkenyl, hydroxy-lower-alkyl or -(lower-alkylene)-$NR^\circ Y$ or $R^1$ and $R^2$ together with the nitrogen atom, are pyrrolidino, piperidino or 4-lower-alkanoyl piperazino; Y is hydrogen or

wherein R is hydrogen, lower-alkyl, lower-alkenyl, phenyl or phenyl-lower-alkyl; An is an anion; $Y^1$ is a divalent moiety of the formula

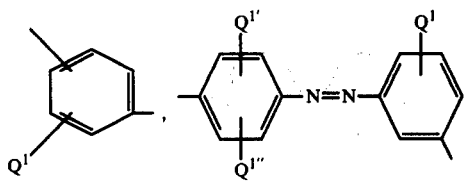

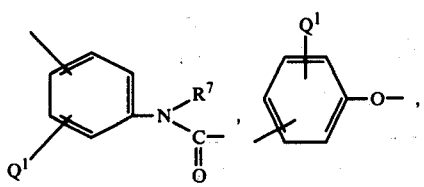

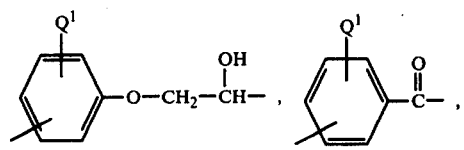

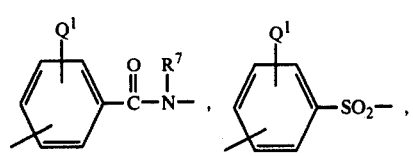

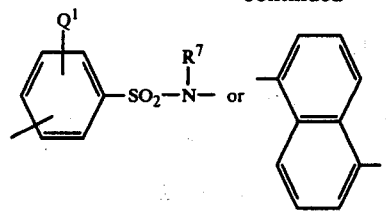

in which $Q^1$, $Q^{1'}$ and $Q^{1''}$ are each hydrogen, lower-alkyl, lower-alkoxy or halogen and $R^7$ is hydrogen, lower-alkyl or cyano-lower-alkyl; and Z is an azoic coupling radical which when c is one, is selected from the class having the formulas

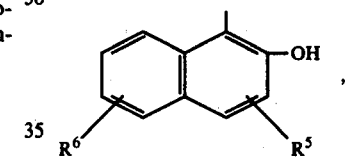

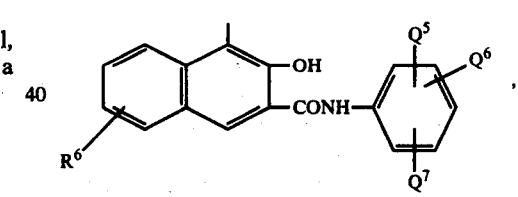

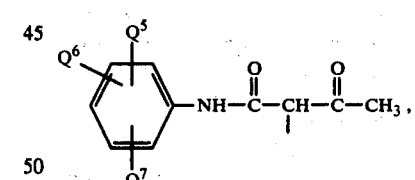

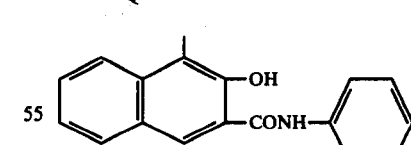

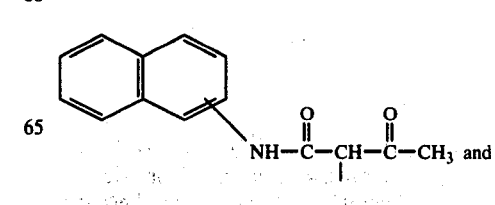

and

-continued

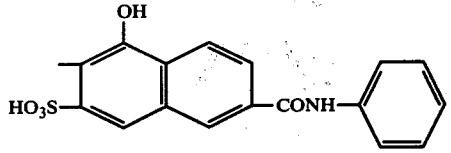

and when c is 2 is selected from the class having the formulas

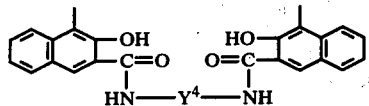

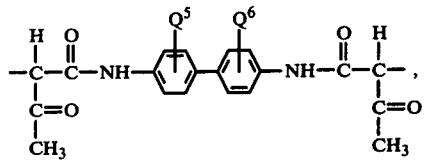

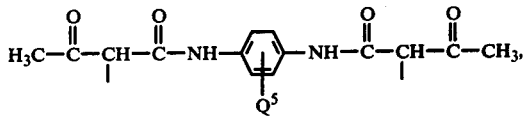

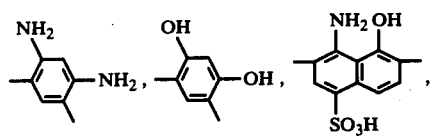

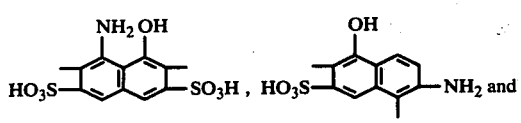

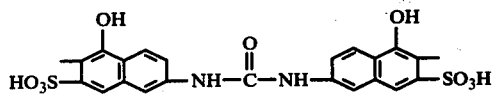

in which $Q^5$ and $Q^6$ are each hydrogen, lower-alkyl, lower-alkoxy or halogen; $Q^7$ is hydrogen, lower-alkyl, lower-alkoxy, nitro or halogen; $R^5$ is hydrogen, lower-alkyl, halogen, benzoxazol-2-yl or benzimidazol-2-yl; $R^6$ is hydrogen, lower-alkyl or halogen; and $Y^4$ is 1,4-phenylene or (lower-alkylene)$^1$.

In a second composition of matter aspect, the invention sought to be patented resides in the novel water-soluble quaternary ammonium azo compounds having the formula

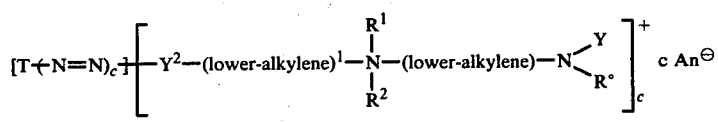

Formula II wherein c is an integer from one to two; R° is hydrogen, lower-alkyl or hydroxy-lower-alkyl; $R^1$ is lower-alkyl, lower-alkenyl or hydroxy-lower-alkyl; $R^2$ is lower-alkyl, lower-alkenyl, hydroxy-lower-alkyl or -(lower-alkylene)-NR°Y or $R^1$ and $R^2$ together with the nitrogen atom are pyrrolidino, piperidino or 4-lower-alkanoyl piperazino; Y is hydrogen or

wherein R is hydrogen, lower-alkyl, lower-alkenyl, phenyl or phenyl-lower-alkyl; An is an anion; $Y^2$ is a divalent moiety of the formula

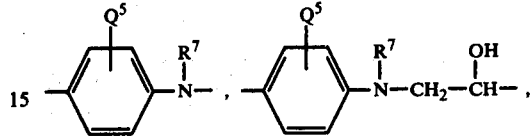

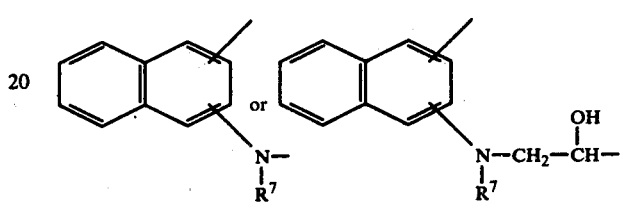

in which the free valence attached to the ring system is bonded to the azo group, and $R^7$ is hydrogen, lower-alkyl or cyano-lower alkyl; and T is either a monovalent residue selected from the group consisting of

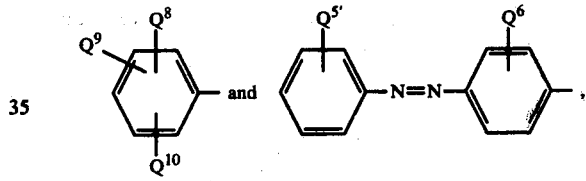

when c is one or a divalent residue when c is two from the group consisting of

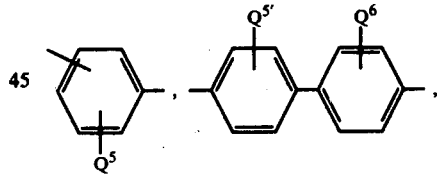

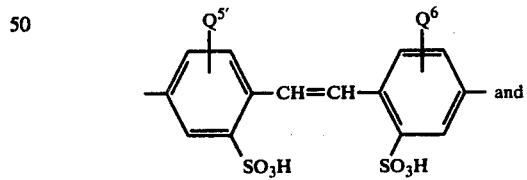

-continued

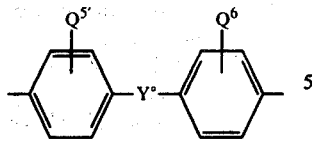

in which $Q^5$, $Q^{5'}$ and $Q^6$ are each hydrogen, lower-alkyl, lower-alkoxy or halogen, $Q^8$ and $Q^{10}$ are each hydrogen, lower-alkyl, nitro or halogen, $Q^9$ is hydrogen, lower-alkyl, acetamido, nitro or halogen and $Y°$ is azo, imino, methylene, —O—, thio, dithio, sulfonyl, carbamoyl, ureylene, benzylidene, lower-alkylmethylene, terephthalamido, isophthalamido,

—O—(lower-alkylene)—O—, —O—CH$_2$—CH(OH)—CH$_2$—O— or

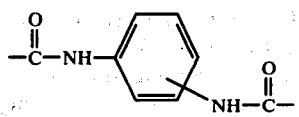

In a third composition of matter aspect, the invention sought to be patented resides in the novel water-soluble quaternary ammonium azo compounds having the formula

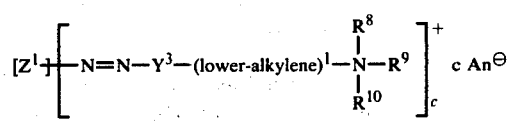

Formula III wherein c is an integer from one to two; $R^8$ is lower-alkyl, lower-alkenyl or hydroxy-lower-alkyl; $R^9$ is lower-alkyl, hydroxy-lower alkyl or NH$_2$; $R^{10}$ is lower-alkyl or lower-alkenyl; An is an anion; $Y^3$ is a divalent moiety of the formula

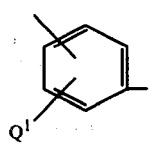

in which $Q^1$ is hydrogen, lower-alkyl, lower-alkoxy or halogen; and $Z^1$ is an azoic coupling radical which when c is one is selected from the class having the formulas

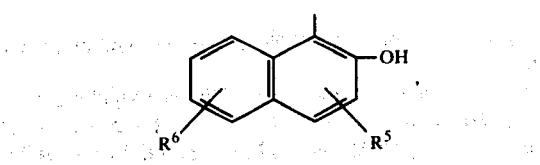

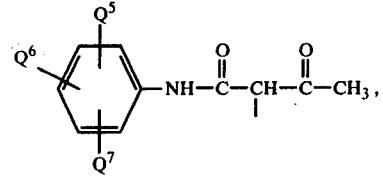

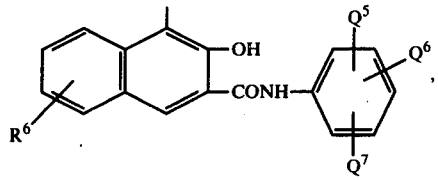

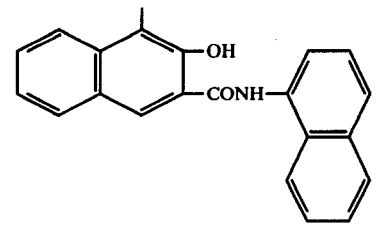

and, when c is two, is selected from the class having the formulas

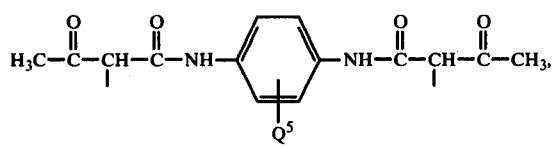

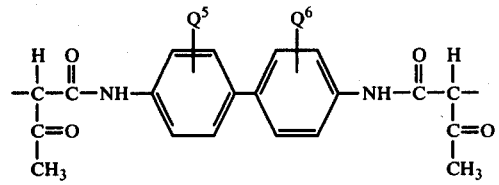

in which $Q^5$ and $Q^6$ are each hydrogen, lower-alkyl, lower-alkoxy or halogen; $Q^7$ is hydrogen, lower-alkyl, lower-alkoxy, nitro or halogen; $R^5$ is hydrogen, lower-alkyl, halogen; benzoxazol-2-yl or benzimidazol-2-yl; and $R^6$ is hydrogen, lower-alkyl or halogen.

In a fourth composition of matter aspect, the invention sought to be patented resides in the novel water-soluble quaternary ammonium azo compounds having the formula

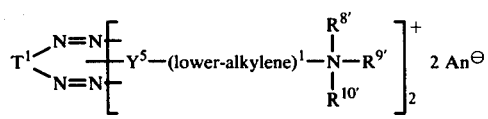

Formula IV wherein $R^{8'}$ is lower-alkyl; $R^{9'}$ and $R^{10'}$ are the same or different and are lower-alkyl, lower-alkenyl, or hydroxy-lower-alkyl or $R^{9'}$ and $R^{10'}$ together with the nitrogen atom are morpholino; An is an anion; $Y^5$ is a divalent moiety of the formula

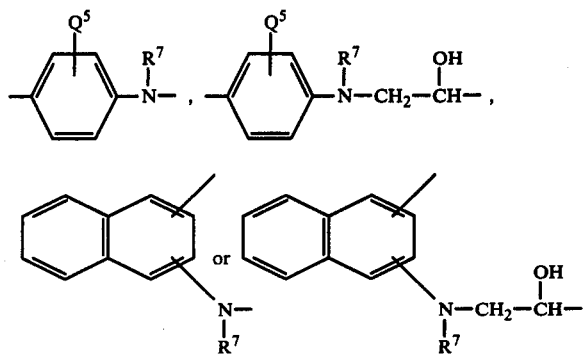

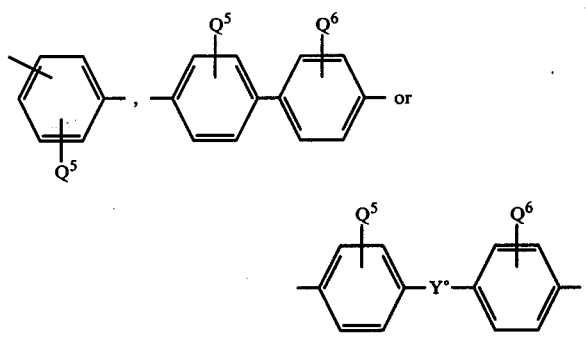

in which the free valence attached to the ring system is bonded to one of the azo groups, and $R^7$ is hydrogen, lower-alkyl or cyano-lower-alkyl; and $T^1$ is a divalent residue from the group consisting of

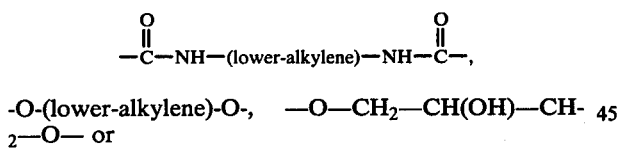

in which $Q^5$ and $Q^6$ are each hydrogen, lower-alkyl, lower-alkoxy or halogen and $Y°$ is azo, imino, methylene, -O-, thio, dithio, sulfonyl, carbamoyl, ureylene, benzylidene, lower-alkylmethylene, terephthalamide, isophthalamido, $$-\overset{O}{\underset{\|}{C}}-NH-\text{(lower-alkylene)}-NH-\overset{O}{\underset{\|}{C}}-,$$

-O-(lower-alkylene)-O-, $-O-CH_2-CH(OH)-CH_2-O-$ or

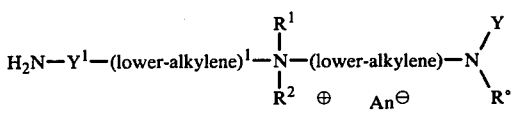

In the first of its process aspects, the invention sought to be patented resides in the process for the preparation of the novel dyestuffs of Formula I which comprises diazotizing an amine of the formula

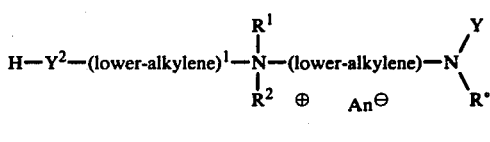

Formula V wherein An, R°, $R^1$, $R^2$, Y and $Y^1$ are as defined above in relation to Formula I, and coupling approximately c molecular proportion of the diazonium salt with one molecular proportion of a coupling component, Z, which has the same meanings given hereinabove in relation to Formula I.

In a second process aspect, the invention sought to be patented resides in the process for preparing the novel dyestuffs of Formula II which comprises coupling approximately c molecular proportions of a compound of the formula $$H-Y^2-\text{(lower-alkylene)}^1-\underset{\underset{R^2 \ \oplus \ An^\ominus}{|}}{\overset{\overset{R^1}{|}}{N}}-\text{(lower-alkylene)}-N\overset{Y}{\underset{R°}{\diagdown}}$$

Formula VI wherein An, R°, $R^1$, $R^2$, Y and $Y^2$ are as defined above in relation to Formula II, with one molecular proportion of the diazonium salt obtained by diazotization of an amine having the formula $$T-(NH_2)_c$$

wherein c and T have the same meanings given hereinbefore in relation to Formula II.

In a third process aspect, the invention sought to be patented resides in the process for preparing the novel dyestuffs of Formula III which comprises diazotizing an amine of the formula

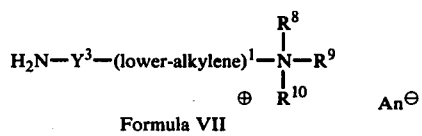

Formula VII wherein $Y^3$, $R^8$, $R^9$, $R^{10}$ and An are as defined above in relation to Formula III, and coupling approximately c molecular proportion of the diazonium salt with one molecular proportion of a coupling component, $Z^1$, which has the same meanings given hereinabove in relation to Formula III.

In a fourth process aspect, the invention sought to be patented resides in the process for preparing the novel dyestuffs of Formula IV which comprises coupling approximately two molecular proportions of a compound of the formula

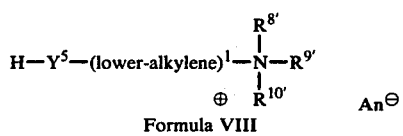

Formula VIII wherein An, $R^{8'}$, $R^{9'}$, $R^{10'}$ and $Y^5$ are as defined above in relation to Formula IV, with one molecular proportion of the tetrazonium salt obtained by diazotization of a diamine having the formula $$T^1-(NH_2)_2$$

wherein $T^1$ has the same meanings given hereinbefore in relation to Formula IV.

As used throughout, the term "lower-alkyl" is a saturated straight- or branched-chain aliphatic radical of from one to six carbon atoms. Lower-alkyl radicals are represented by, for example, methyl, ethyl, propyl, isopropyl, butyl, tert.-butyl, isobutyl, amyl, isoamyl, hexyl and the like.

As used herein, the term "An" represents Anion. By Anion is meant any monovalent ion derived from an organic or inorganic acid, H Anion, by the removal of an acidic hydrogen ion. Exemplary anions are, halide, hydroxy, alkanoate, hydroxy alkanoate, nitrate, phosphate, alkylsulfonate and arylsulfonate. Other monovalent anions are found in the literature for example, Hackh's Chemical Dictionary, 3rd Edition (1946), at pages 12–13, and Chemical Abstracts, vol. 56, Nomenclature, at pages 72n–80n, both incorporated herein by specific reference thereto. As is known, one anion can be changed to another anion by use of conventional ion exchange methods. The halides, i.e., chloride, bromide, fluoride and iodide and in particular chloride and bromide are particularly preferred as the anion for the dyestuffs of this invention because of the generally ready availability of the quaternizing agents containing them. A particularly preferred alkanoate is acetate and a particularly preferred hydroxyalkanoate is glycolate. However, the scope of the compounds herein described and claimed is in no way to be thereto restricted.

As used throughout, the term "lower-alkoxy" means an alkoxy radical in which the aliphatic portion is a saturated straight- or branched-chain of from one to four carbon atoms. Lower-alkoxy radicals are represented by, for example, methoxy, ethoxy, propoxy, butoxy, isopropoxy, tert.-butoxy and the like.

As used throughout, the term "lower-alkenyl" is a straight- or branched-chain aliphatic radical of from two to six carbon atoms containing at least one carbon-to-carbon double bond. Lower-alkenyl radicals are represented by, for example, vinyl, allyl, methallyl, 2-butenyl, 2,4-pentadienyl, 3-hexenyl, and the like.

As used throughout, the term "(lower-alkylene)" means a divalent, saturated straight- or branched-chain aliphatic radical of from two to six carbon atoms having valence bonds attached to different carbon atoms. Thus, radicals represented by the term "(lower-alkylene)" are, for example, $-CH_2-CH_2-$, $-CH_2-CH_2-CH_2-$, $-(CH_2)_4-$, $-(CH_2)_5-$, $-(CH_2)_6-$, $-CH(CH_3)CH_2-$, $-CH_2-CH_2-CH(CH_3)-CH_3-$, $-CH_2-CH_2-CH(C_2H_5)-CH_2-$, and the like.

The benzene ring of phenyl can bear substituents of the kind commonly employed in the dyestuffs art. The presence of such substituents does not ordinarily affect adversely the properties of the resulting dyestuffs, and such substituted compositions are the full equivalents of the compositions claimed herein.

As used throughout, the term "carboxylic-acyl" is a radical derived by the removal of the hydroxy radical from a carboxylic acid. The carboxylic-acyl groups,

(shown alternatively herein as —COR) are represented by lower-alkanoyl, wherein R is lower-alkyl; lower-alkenoyl, wherein R is lower-alkenyl; benzoyl, wherein R is phenyl, which may be substituted on the benzene ring thereof without deleterious effects; and phenyl-lower alkanoyl, wherein R is phenyl-lower-alkyl. Examples of carboxylic-acyl groups include, for example, formyl, acetyl, propionyl, isobutyryl, acrylyl, methacrylyl, benzoyl, p-toluoyl, p-nitrobenzoyl, o-chlorobenzoyl, phthaloyl, phenylacetyl, p-methoxyphenylacetyl, and the like.

As used throughout, the term "(lower-alkylene)$^1$" means a divalent, saturated straight- or branched-chain aliphatic radical of from one to six carbon atoms. Thus, radicals represented by the term "(lower-alkylene)$^1$" have from one to six carbon atoms and are, for example, $-CH_2-$, $-CH_2CH_2-$, $-CH(CH_3)-$, $-CH_2-CH_2-CH_2-$, $-(CH_2)_4-$, $-(CH_2)_5-$, $-(CH_2)_6-$, $-CH(CH_3)CH_2-$, $-CH_2-CH_2-CH(CH_3)-CH_2-$, $-CH_2-CH_2-CH(C_2H_5)-CH_2-$, and the like.

As used throughout, the term "halogen" includes bromine, chlorine, iodine and fluorine.

In the preparation of the compounds of Formula I, and of Formula III the ratio of the quantity of diazonium compound to coupling component is, of course, dependent on the number of coupling sites available in the coupling component. Thus when a single coupling site is present, for example in a 1-phenyl-2-pyrazolin-5-one, there is employed approximately one molecular proportion of the diazonium compound and when two coupling sites are available as, for example, in 4,4'-bi-o-acetoacetotoluidide (Naphthol AS-G), there are employed approximately two molecular proportions of the diazonium compound. In the preparation of those compounds of Formula II and Formula IV wherein two azo linkages are present, there is employed approximately one-half molecular proportion of the tetrazonium compound for reaction with approximately one molecular proportion of the quaternary ammonium coupling component. Since the reaction temperature has some effect on the shade of the resulting water-soluble quaternary ammonium dyestuffs, it is ordinarily desirable to maintain adequate control of the temperature of the reaction mixture in some predetermined manner. It is generally satisfactory to stir the reactants together at a temperature in the approximate range 0°–35° C. to effect only an incomplete coupling reaction, and then heat the mixture at a higher temperature, for instance in the approximate range 40°–60° C., preferably at 50°–55° C., to complete the coupling reaction and develop the dyestuff. The reaction is begun in an alkaline aqueous medium but the pH of the reaction mixture drops during the process to a final value of about 5.0.

In a fifth process aspect, the invention sought to be patented in relation to the preparation of water-soluble quaternary ammonium azo compounds of Formula I and of Formula II wherein Y is hydrogen, resides in the process which comprises hydrolyzing a compound of Formula I or of Formula II wherein Y is —COR in which R is as defined above. The removal of the carboxylic acyl groups is conveniently accomplished through hydrolysis by heating the acylamino-substituted dyestuffs in admixture with dilute aqueous acid. Although the hydrolysis is effectively accomplished by the use of any of the common dilute mineral acids as well as by aqueous strong organic acids such as benzenesulfonic acid, we here also prefer to hydrolyze the acylamine groups with a dilute aqueous acid whose anion is the same as the quaternary anion in order to prevent introduction of extraneous anion constituents. Moreover, the carboxylic-acylamides of Formula I and of Formula II may also be hydrolyzed by aqueous alkali, but of course, with concomitant introduction of the hydroxide ion as an anion constituent.

Alternatively, the compounds of Formula I in which Y is hydrogen, can be prepared by coupling in approximately stoichiometric proportions a coupling component, Z, as defined in relation to Formula I, with a diazotized amino compound of Formula V in which Y is hydrogen. Similarly, an alternate method for preparing the compounds of Formula II in which Y is hydrogen comprises coupling in approximately stoichiometric proportions a compound of Formula VI in which Y is hydrogen with a diazonium compound of the formula T—(N$^+$—NAn$^-$)$_c$ wherein c, T and An have the same meanings as hereinbefore indicated. Although the intermediates of Formula V and VI in which Y is hydrogen can be separately prepared and isolated for use in preparing the compounds of Formula I and Formula II in which Y is hydrogen, it is not necessary to do so. It is particularly convenient to first hydrolyze the acylated intermediates of Formula V or of Formula VI and to then proceed directly with the diazotization and coupling in the same reaction vessel.

When preparing the compounds of Formula I and Formula II in which Y is hydrogen and which contain amide groups, by hydrolysis of the corresponding compound of Formula I or Formula II in which Y is —COR, it is preferred to hydrolyze those compounds in which R is hydrogen or equivalently in which Y is formyl. The formyl group is preferred because it is readily hydrolyzed with minimal concomitant hydrolysis of the remaining amide group. In the same sense and for the same reason, it is preferred to employ those compounds of Formula V and Formula VI in which Y is formyl, and which contain other amide groups, for the preparation of the corresponding intermediates of Formula V and Formula VI in which Y is hydrogen.

The water-soluble quaternary ammonium azo dyestuffs prepared according to this aspect of our invention contain one or more primary amino groups in addition to the quaternary ammonium group which characterizes all of the dyestuffs of our invention. The said amino-basic dyestuffs can, of course, exist either in free base form or in acid-addition salt form. For the purpose of our invention, the two forms are full equivalents, because the dyestuffs are water-soluble in either form, and salt formation is believed not to affect the physical properties of the dyestuffs either adversely or beneficially.

In a fifth composition of matter aspect, the invention sought to be patented resides in the concept of the novel N-R$^1$-N-[(lower-alkylene)$^1$-Y$^1$-NH$_2$]-N-R$^2$-N-[(lower-alkylene)-NR°Y] ammonium halides, the N-R$^1$-N-[(lower-alkylene)$^1$-Y$^2$-H]-N-R$^2$-N-[(lower-alkylene)-NR°Y] ammonium halides, the N-R$^8$-N-[(lower-alkylene)-Y$^3$-NH$_2$]-N-R$^9$-N-R$^{10}$ ammonium halides, and the N-R$_{8'}$-N-[(lower-alkylene)-Y$^5$-H]-N-R$^{9'}$-N-R$^{10'}$ ammonium halides represented and defined by Formulas V, VI, VII, VIII respectively which are useful intermediates in the preparation of the quaternary ammonium azo dyestuffs of the invention.

The manner and process of making and using the quaternary ammonium azo dyestuffs of the invention, and the best mode contemplated by the inventors of carrying out this invention, will now be described so as to enable any person skilled in the art to which it pertains to make and use the same.

The intermediate N-R$^1$-N-[(lower-alkylene)$^1$-Y$^1$-NH$_2$]-N-R$^2$-N-[(lower-alkylene)-NR°Y] ammonium halides of Formula V in which Y is —COR, are conveniently prepared in two steps, firstly by heating the appropriate compound of the formula O$_2$N-Y$^1$-(lower-alkylene)$^1$-X with the appropriate compound of the formula

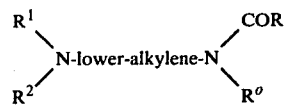

wherein X is halogen and R, R°, R$^1$, R$^2$, R$^7$ and Y$^1$ each have the same respective meanings given hereinbefore, in a suitable medium, for example a polar solvent, to obtain the corresponding nitro-substituted precursor of the amino-substituted intermediates of Formula V, said precursors being of the formula

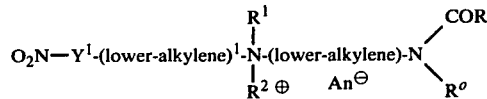

The quaternization is usually complete in from two to forty-eight hours, depending upon the nature of the reactants, the nature of the reaction medium, and the reaction temperature. The reaction generally proceeds readily at temperatures in the range 50°-110° C. It is convenient to employ a reaction medium which boils within the specified range in order that the reaction temperature is maintained by merely refluxing the medium. Convenient media for carrying out the process according to this aspect of the invention include water; the lower-alcohols, for example methanol, ethanol, isopropyl alcohol, and the like; the lower-alkylene glycols, for example, ethylene glycol and propylene glycol; acetonitrile; and dimethylformamide. We generally prefer to use isopropyl alcohol or water as the reaction media because they have suitable boiling points and they are inexpensive. The N-R$^1$-N-[(lower-alkylene)$^1$-Y$^1$-NO$_2$]-N-R$^2$-N-[(lower-alkylene)-NR°COR]ammonium halide thus obtained is then in the second step subjected to reduction of the nitro group to obtain the corresponding amino-substituted intermediates of Formula V in which Y is —COR. Reduction is carried out with powdered iron under essentially neutral conditions. The reduction generally proceeds readily in aqueous media at a temperature in the range 50°-75° C. Alternatively, high-pressure, catalytic reduction is employed. We have found that when the latter method is used, reduction is conveniently and efficiently effected in aqueous media at approximately 600 pounds per square inch hydrogen pressure at a temperature between 60°-80° C. Although any of the known poisoned reduction catalysts may be used, we prefer to use a platinum sulfide on charcoal catalyst.

The intermediates of Formula V in which Y is hydrogen are obtained by the hydrolysis of the corresponding compound of Formula V wherein Y is —COR. The hydrolysis is effectively accomplished by heating the acylamino intermediate in admixture with dilute aqueous acid as hereinbefore described.

Particularly preferred among the novel intermediates of Formula V and their corresponding precursors useful for the preparation of the dyestuffs of Formula I, are those compounds represented by the formula

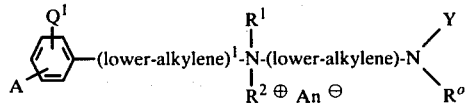

wherein A is nitro or amino; $Q^1$ is hydrogen, lower-alkyl, lower-alkoxy or halogen; $R^\circ$ is hydrogen, lower-alkyl or hydroxy-lower-alkyl; $R^1$ is lower-alkyl, lower-alkenyl or hydroxyl-lower-alkyl; $R^2$ is lower-alkyl, lower-alkenyl, hydroxy-lower-alkyl or -(lower-alkylene)-$NR^\circ Y$; or $R^1$ and $R^2$ together with the nitrogen atom are pyrrolidino, piperidino or 4-lower-alkanoyl piperazino; Y is hydrogen or

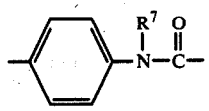

wherein R is hydrogen, lower-alkyl, lower-alkenyl, phenyl or phenyl-lower-alkyl; and An is an anion.

The intermediates represented by the formula directly above wherein $R^2$ is -(lower-alkylene)-$NYR^\circ$ and Y is H are taught and claimed in our U.S. Pat. No. 3,996,282 and the disclosure thereof is hereby incorporated by reference.

A second particularly preferred embodiment among the novel intermediates of Formula V and their corresponding precursors useful for the preparation of the dyestuffs of Formula I are those compounds represented by the formula

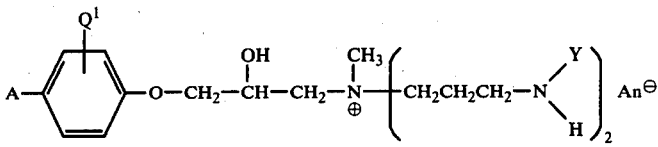

wherein A is nitro or amino; $Q^1$ is hydrogen, lower-alkyl, lower-alkoxy or halogen; Y is hydrogen or formyl; and An is an anion.

The intermediates of Formula V and their corresponding precursors useful for the preparation of the dyestuffs of Formula I wherein $Y^1$ is

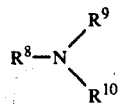

are taught and claimed in our U.S. Pat. No. 3,839,426 and the disclosure thereof is hereby incorporated by reference.

The intermediate N-$R^8$-N-[(lower-alkylene)$^1$-$Y^3$-$NH_2$]-N-$R^9$-N-$R^{10}$ ammonium halides of Formula VII are also conveniently prepared in two steps, firstly by heating the appropriate compound of the formula $O_2$N-$Y^3$-(lower-alkylene)$^1$-X with the appropriate compound of the formula $$R^8-N\begin{matrix}R^9\\\\R^{10}\end{matrix}$$

wherein X is halogen and $R^8$, $R^9$, $R^{10}$ and $Y^3$ each have the same respective meanings given hereinbefore, without other media or in a suitable medium, for example a polar solvent, to obtain the nitro-substituted precursors of the intermediates of Formula VII, said precursors being of the formula

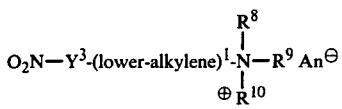

Quaternization is usually complete in from two to forty-eight hours and proceeds readily at temperatures in the range of 50°–110° C. Convenient media for carrying out the process according to this aspect of the invention include water; the lower-alcohols, for example, methanol, ethanol, isopropyl alcohol, and the like; the lower-alkylene glycols, for example, ethylene glycol; acetonitrile and dimethyl formamide. We generally prefer to use water as the reaction medium because it has a suitable boiling point and is inexpensive. The N-$R^8$-N-[(lower-alkylene)$^1$-$Y^3$-$NO_2$]-N-$R^9$-N-$R^{10}$ ammonium halide thus obtained is in the second step subjected to reduction of the nitro group to obtain the corresponding amino-substituted intermediates of Formula VII. Reduction is carried out with powdered iron under essentially neutral conditions. The reduction generally proceeds readily in aqueous media at a temperature in the range 50°–75° C. Alternatively, high-pressure, catalytic reduction of the nitro group is employed in aqueous media at approximately 600 pounds per square inch hydrogen pressure at temperature between 60°–80° C. in the presence of any of the known poisoned reduction catalysts.

Particularly preferred among the novel intermediates of Formula VII and their corresponding precursors useful for the preparation of dyestuffs of Formula III, are those compounds represented by the formula

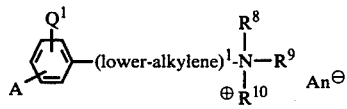

wherein A is nitro or amino; $Q^1$ is hydrogen, lower-alkyl, lower-alkoxy or halogen; $R^8$ is lower-alkyl, lower-alkenyl or hydroxy-lower-alkyl; $R^9$ is lower-alkyl, hydroxy-lower-alkyl or $NH_2$; $R^{10}$ is lower-alkyl or lower-alkenyl; and An is an anion.

The halide quaternizing agents used as starting materials for preparing the intermediate compounds of Formula V and of Formula VII, that is, the starting materials having the formula $O_2$N-$Y^1$-(lower-alkylene)$^1$-X, and the formula $O_2$N-$Y^3$-(lower-alkylene)$^1$-X respectively, are a generally known class of compounds, and are readily prepared by methods well-known in the art. A typical preparative procedure for these compounds which may be mentioned by way of example, is the following procedure. The halogeno-lower-alkylene-substituted nitro-benzenes are prepared by nitration of the appropriate halogeno-lower-alkylene-substituted benzenes which in turn are prepared by the interaction of the corresponding hydroxy-lower-alkylene-substituted benzene with an hydrogen halide or an hydrogen halide-producing reactant, for example phosphorous oxychloride. Said hydroxy-lower-alkylene-substituted benzenes are likewise a generally known class of compounds and are prepared by methods well-known in the art. For example, the Grignard reagent formed from the appropriate aryl halide or the appropriate aralkyl halide is interacted with formaldehyde or an appropriate alkylene oxide for introduction of a hydroxy-alkyl group into the aromatic ring or addition thereof to the alkyl chain. The desired halogeno-lower-alkylene substituted nitrobenzene isomer is separated by conventional techniques from the resultant mixture of nitrated products or alternatively, said mixture can be used per se for quaternization with subsequent separation of the desired quaternary ammonium intermediate. The halogeno-lower-alkylene carboxylic acid N-$R^7$ nitroanilides are prepared, for example, by interaction of a halogen-substituted alkanoyl halide with an N-$R^7$ substituted nitroaniline. Additional specific examples are to be found hereinafter under the section entitled "Preparation of Intermediates". The carboxylic-acylamino-lower-alkylamines are prepared as described in our U.S. Pat. No. 3,709,903 by acylating alkylenediamines in which one of the nitrogen atoms is disubstituted and the other is either unsubstituted or monosubstituted.

The N-$R^8$-N-$R^9$-N-$R^{10}$ amines required for preparing the compounds of Formula VII are, of course, a known class of compounds, the methods of preparation of which are described in the prior art. For example, the direct alkylation of primary and secondary amines with a lower alkyl halide, a lower alkenyl halide or a hydroxy-lower-alkyl halide provides a convenient method for preparing the requisite tertiary amines.

The N-$R^1$-N-[(lower-alkylene)$^1$-$Y^2$-H]-N-$R^2$-N-[(lower-alkylene)-NR°Y] ammonium halides of Formula VI in which Y is —COR, are conveniently prepared by heating the appropriate compound of the formula H-$Y^2$-(lower-alkylene)$^1$-X with the appropriate compound of the formula

wherein X is halogen and R, R°, $R^1$, $R^2$, $R^7$ and $Y^2$ have the same respective meanings given hereinbefore, to obtain the corresponding intermediate of Formula VI. The reaction can be carried out without other media or in a suitable medium for example, a polar solvent. Quaternization is usually complete in from two to forty-eight hours and proceeds readily at temperatures in the range of 50°–110° C. Convenient media for carrying out the process according to this aspect of the invention include water; the lower-alkanols, for example, methanol, ethanol, isopropyl alcohol, and the like; the lower-alkylene glycols, for example, ethylene glycol and propylene glycol; acetonitrile and dimethylformamide.

Those intermediates represented by Formula VI in which Y is hydrogen are conveniently obtained by the hydrolysis of the corresponding acylamino compound of Formula VI wherein Y is —COR. The hydrolysis is accomplished by heating the acylamino intermediate in admixture with dilute aqueous acid as hereinbefore described.

Particularly preferred among the novel intermediates of Formula VI useful for the preparation of the dyestuffs of Formula II, are those compounds represented by the formula

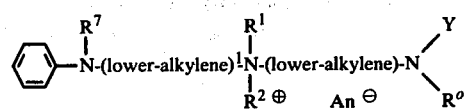

in which R° is hydrogen, lower-alkyl or hydroxy-lower-alkyl; $R^1$ is lower-alkyl, lower-alkenyl or hydroxy-lower-alkyl; $R^2$ is lower-alkyl, lower-alkenyl, hydroxy-lower-alkyl or -(lower-alkylene)-NR°Y; or $R^1$ and $R^2$ together with the nitrogen atom are pyrrolidino, piperidino or 4-lower-alkanoyl piperazino; $R^7$ is hydrogen or lower-alkyl; Y is hydrogen or

wherein R is hydrogen, lower-alkyl, lower-alkenyl, phenyl or phenyl-lower-alkyl; and An is an anion. The intermediates represented by the formula directly above are taught and claimed in our U.S. Patent application Ser. No. 672,428, filed Mar. 31, 1976, and the disclosure thereof is hereby incorporated by reference.

The intermediate N-$R^{8'}$-N-[(lower-alkylene)$^1$-$Y^5$-H]-N-$R^{9'}$-N-$R^{10'}$ ammonium halides of Formula VIII are similarly prepared by the quaternization of the appropriate tertiary amine of the formula

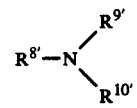

with the appropriate halogeno compound of the formula

wherein X is halogen and $R^{8'}$, $R^{9'}$, $R^{10'}$ and $Y^5$ each have the same respective meanings given hereinbefore, to obtain the corresponding intermediate of Formula VIII. The reaction conditions and media, if used, are the same as those employed for the quaternizations to obtain the intermediates of Formulas V, VI and VII above.

Particularly preferred among the novel intermediates of Formula VIII useful for the preparation of the dyestuffs of Formula IV, are those compounds represented by the formula

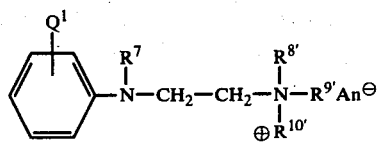

in which $Q^1$ is hydrogen, lower-alkyl, lower-alkoxy or halogen; $R^8$ is lower-alkyl; $R^9$ and $R^{10}$ are the same or different and are lower-alkyl, lower-alkenyl or hydroxy-lower-alkyl; $R^9$ and $R^{10}$ together with the nitrogen atom are morpholino; $R^7$ is hydrogen, lower-alkyl or cyano-lower-alkyl; and An is an anion.

The halide quaternizing agents required for preparing the intermediate compounds of Formula VI and Formula VIII are generally-known classes of compounds and are conveniently prepared by methods well-known in the art. For example, the N-R$^7$-N-(halo-lower-alkylene)-substituted anilines are prepared by causing an N-R$^7$-N-(hydroxy-lower-alkylene)-substituted aniline to react with an hydrogen halide. The carboxylic-acylamino-lower-alkylamines are prepared as hereinbefore described.

The new water-soluble quaternary ammonium-substituted dyestuffs of Formulas I, II, III and IV disclosed herein are useful dyestuffs which can be applied to natural fibers, to fiber-forming synthetic materials and to cellulosic materials by methods conventional in the dyeing art since it has been found that the dyestuffs of this invention are substantive to wool, silk, nylon, rayon, polyacrylonitrile, cotton and paper. The dyed products thus obtained are stable to ultra-violet light and to washing. The novel dyes are especially valuable for imparting various shades of a stable turquoise, red or yellow color to cotton and to paper, both sized and unsized. For use in the paper trade, our dyes have several outstanding advantages over quaternary ammonium dyes in the prior art. First, our dyes are less prone to "bleed" when paper impregnated with the dyes is wet and placed in contact with moist white paper. This is a particularly desirable property for dyes designed for coloring paper to be used in facial tissues, napkins and the like, wherein it can be foreseen that the colored paper, while wet, may come in contact with other surfaces, such as textiles, paper and the like, which should be protected from stain. Another advantageous property of our new dyes for use in the paper trade is found in their high degree of color discharge when bleached with hypochlorite or "chlorine" bleach. This property of dyes is particularly desired by papermakers in order that dyed paper may be completely bleached prior to reprocessing. Still another advantageous property of our dyestuffs is found in their high resistance to a change of shade when used to color cellulosic materials, which have either previously been treated with or are treated subsequent to dyeing, with wet-strength resin.

The carboxylic-acylamino compounds and the free amino compounds of the instant invention are substantially equal with respect to their bleachability. With respect to shade, in general, the free amino compounds have slightly deeper shades than the carboxylic acylamino compounds. Presumably because of the availability of the free amine group to bond with the fiber and wet-strength resin or similar paper additives, the free amino compounds are, in general, less prone to bleed than are the carboxylic acylamino compounds both when wet with water alone and in the presence of soap.

Yet another advantage of the dyes of this invention is their property of being absorbed by cellulosic fibers from aqueous solution to a very high degree and at a very rapid rate. This property is advantageous to the paper industry, because it allows the dye to be added to the pulp just prior to formation of the sheet.

The structures of the novel compounds herein disclosed were established by their mode of synthesis and analysis of their infra-red absorption spectra, and were corroborated by the correspondence of calculated and found values of elemental analyses of representative samples.

Our invention is further illustrated by the following procedures and Examples, which are given for the purpose of illustration only, and not to limit the invention thereto. All parts are parts by weight.

PREPARATION OF INTERMEDIATES

A. Carboxylic-acylamino lower-alkylamines

The following N-R$^1$-N-R$^2$-N-[(lower-alkylene)-NR°COR]amines were prepared by interaction of the indicated unsymmetrically disubstituted alkylene diamine and acylating agent using procedures well-known in the art for acylation.

1. N-(3-Dimethylaminopropyl)formamide from 327 parts of N,N-dimethyl-1,3-propanediamine and 180 parts of 90 percent formic acid;
2. N,N-Bis(3-formamidopropyl)methylamine from 218 parts of N,N-bis(3-aminopropyl)methylamine and 203 parts of 90 percent formic acid;
3. N-(3-Diethylaminopropyl)formamide from N,N-diethyl-1,3-propanediamine and 90 percent formic acid;
4. N-(3-Dimethylaminopropyl)benzamide from 107 parts of N,N-dimethyl-1,3-propanediamine and 141 parts of benzoyl chloride;
5. N-(3-Dimethylaminopropyl)acetamide from N,N-dimethyl-1,3-propanediamine and acetyl chloride;
6. N-(4-Diethylamino-1-methylbutyl)formamide from N,N-diethyl-4-methyl-1,4-diaminobutane and 90 percent formic acid;
7. N-(3-Dimethylaminopropyl)phthalamic acid from 102 parts of N,N-dimethyl-1,3-propane diamine and 141 parts of phthalic anhydride;
8. N-(3-Diethanolaminopropyl)formamide from N-(3-aminopropyl)diethanolamine and 90 percent formic acid;
9. N-[2-(4-Formylpiperazino)ethyl]formamide from 2-(4-formylpiperazine)ethylamine and 90 percent formic acid; and
10. N-(2-Dimethylaminoethyl)formamide from 2-dimethylaminoethylamine and 90 percent formic acid.

The following carboxylic-acylamino lower-alkylamines which are within the purview of this invention, are prepared using art-known procedures by acylation of the indicated unsymmetrically substituted diamine with the indicated acylating reagent:

N-[2-(N-Ethyl-N-1-methylbutyl)aminoethyl]propionamide from 2-(N-ethyl-N-1-methylbutylamino)ethylamine and propionic anhydride;
N-(6-Dimethylaminohexyl)iso-butyramide from 6-(dimethylamino)hexylamine and iso-butyryl chloride;
N-[2-(N-Allyl-N-ethyl)aminoethyl]p-chlorobenzamide from 2-(N-allyl-N-ethylamino)ethylamine and p-chlorobenzoyl chloride;
N-[2-(N-Ethyl-N-methyl)aminoethyl]propionamide from 2-(N-methyl-N-ethylamino)ethylamine and propionyl chloride;
N-(2-Piperidinoethyl)acrylamide from 2-piperidinoethylamine and ethyl acrylate;
N-[2-(N-n-Butyl-N-isopropyl)aminoethyl]phenylacetamide from 2-(N-butyl-N-isopropylamino)ethylamine and ethyl phenylacetate;
N-(3-Pyrrolidinylpropyl)valeramide from 3-pyrrolidinopropylamine and valeryl chloride;
N-(2-Diallylaminoethyl)phenylpropionamide from 2-(diallylamino)ethylamine and ethyl phenylpropionate;
N-(2-Diethylaminopentyl)-2-methylacrylamide from 5-(diethylamino)pentylamine and methyl methacrylate;

N-(2-Diisopropylaminoethyl)p-methoxybenzamide from 2-(diisopropylamino)ethylamine and p-methoxybenzoylchloride;

N-(2-Diisopentylaminoethyl)butyramide from 2-(diisopentylamino)ethylamine and butyryl chloride;

N-(2-Dihexylaminoethyl)n-caproamide from 2-dihexylaminoethylamine and caproyl chloride;

N-(6-Diisobutylaminohexyl)acetamide from 6-(diisobutylamino)hexylamine and acetic anhydride;

N-(1-Methyl-3-diethylaminopropyl)acrylamide from 3-amino-N,N-diethylaminobutylamine and ethyl acrylate;

N-(2-Di-n-propylamino-2-methylethyl)-p-nitrobenzamide from 2-methyl-2-di-n-propylaminoethylamine and ethyl p-nitrobenzoate;

N-(2-Hydroxyethyl)-N-(3-dimethylaminopropyl)formamide from N'-(2-hydroxyethyl)-N,N-dimethyl-1,2-ethylenediamine and 90 percent formic acid;

N-[3-(N-Methyl-N-2-acetamidoethyl)aminopropyl]acetamide from N-methyl-N-2-aminoethyl-1,3-propanediamine and acetyl chloride;

N-Methyl-N-[2-(N-ethyl-N-methyl)aminoethyl]propionamide from N-methyl-2-(N-methyl-N-ethylamino)ethylamine and propionyl chloride;

N-(3-Hydroxypropyl)-N-(3-dimethylaminopropyl)formamide from N'-(3-hydroxypropyl)-N,N-dimethyl-1,3-propanediamine and 90 percent formic acid;

N,N-Bis[3-(N-methylformamido)propyl]methylamine from N,N-bis[3-(N-methylamino)propyl]methylamine and 90 percent formic acid;

N-Isopropyl-N-(2-piperidinoethyl)acrylamide from N-isopropyl-2-piperidinoethylamine and ethyl acrylate;

N-n-Hexyl-N-[2-(N-ethyl-N-methyl)aminoethyl]propionamide from N-n-hexyl-2-(N-methyl-N-ethylamino)ethylamine and propionic anhydride;

N-Ethyl-N-(2-di-n-propylamino-2-methylethyl)-p-nitrobenzamide from N-ethyl-2-methyl-2-di-n-propylaminoethylamine and ethyl p-nitrobenzoate;

N-(2-Hydroxyethyl)-N-(4-diethylamino-1-methylbutyl)formamide from N'-(2-hydroxyethyl)-N,N-diethyl-4-methyl-1,4-diaminobutane and 90 percent formic acid;

N-n-Butyl-N-[2-(4-formylpiperazino)ethyl]acetamide from N-n-butyl-2-(4-formylpiperazino)ethylamine and acetic anhydride;

N-[3-(N-Methylacetamido)propyl]-N-[2-(N-methylacetamido)ethyl]methylamine from N-[3-(N-methylamino)propyl]-N-[2-(N-methylamino)ethyl]-methylamine and acetyl chloride;

N-Methyl-N-(3-pyrrolidinylpropyl)valeramide from N-methyl-3-pyrrolidinylpropylamine and valeryl chloride;

N-(2-Diethanolamino-1,1-dimethylethyl)phenylacetamide from 2-diethanolamino-1,1-dimethylethylamine and ethyl phenylacetate;

N-[3-(N-Isopropyl-N-methyl)aminopropyl]salicylamide from 3-(N-isopropyl-N-methylamino)propylamine and methyl salicylate.

B.

N-R$^1$-N-[(lower-alkylene)$^1$-Y$^1$NH$_2$]-N-R$^2$-N-[(lower-alkylene)-NR°Y]quaternary ammonium intermediates (Formula V)

1.

N,N-Dimethyl-N-(3-amino-4-methoxybenzyl)-N-3-formamidopropylammonium chloride a. To a refluxing solution of 35.4 parts of N-(3-dimethylaminopropyl)formamide in 40 parts of isopropyl alcohol there was added over a two hour period 50.4 parts of 4-methoxy-3-nitrobenzyl chloride. Refluxing was continued for four hours after which the reaction mixture was diluted with 100 parts of isopropyl alcohol and cooled to 20° C. The solid that separated was collected and washed with a small amount of fresh isopropyl alcohol and then dried in a vacuum oven to yield 71.1 parts of N,N-dimethyl-N-(3-nitro-4-methoxybenzyl)-N-3-formamidopropylammonium chloride, as a cream colored solid which melted at 180°–183° C.

b. A mixture of 30.0 parts of iron powder, 6.0 parts of sodium acetate, and 120 parts of water was heated to 50° C. Heating was stopped and 33.1 parts of N,N-dimethyl-N-3-(nitro-4-methoxybenzyl)-N-3-formamidopropylammonium chloride was added over a period of two and a half hours at a rate such as to maintain the temperature at 50°–55° C. At the end of the addition, heating was resumed at 50°–55° C. for two hours. The reaction mixture was cooled to 25° C. and filtered with the aid of diatomaceous earth to obtain a pale yellow solution. A sample of the solution was analyzed for free amine content by diazotization using a standardized sodium nitrite solution. The analytical results indicated that N,N-dimethyl-N-(3-amino-4-methoxybenzyl)-N-3-formamidopropylammonium chloride was obtained in nearly quantitative yield. The product was used directly in the form of its aqueous solution without isolation.

c. A mixture of 166 parts of N,N-dimethyl-N-(3-nitro-4-methoxybenzyl)-N-3-formamidopropylammonium chloride, 200 parts of water, and 3 parts of a 5 percent platinum sulfide on charcoal mixture was subjected to 600 pounds per square inch of hydrogen at 70°–75° C. After two and one-third hours, when the total up take of hydrogen was approximately 92% of theory, absorption of hydrogen ceased. The reaction mixture was cooled and filtered with the aid of diatomaceous earth. A sample of the filtrate was analyzed for free amine content by diazotization using a standardized sodium nitrite solution. The results indicated that N,N-dimethyl-N-(3-amino-4-methoxybenzyl)-N-3-formamidopropylammonium chloride was obtained in nearly quantitative yield. The product was used directly in the form of an aqueous solution without isolation.

2.

N,N-Dimethyl-N-(3-amino-4-methoxybenzyl)-N-3-benzamidopropylammonium chloride a. Proceeding in a manner similar to that described above in 1a, and using N-(3-dimethylaminopropyl)benzamide, and 3-nitro-4-methoxybenzyl chloride, there was obtained N,N-dimethyl-N-(3-nitro-4-methoxybenzyl)-N-3-benzamidopropylammonium chloride, as an off white solid which melted at 133°–136° C.

b. When the N,N-dimethyl-N-(3-nitro-4-methoxybenzyl)-N-3-benzamidopropylammonium chloride thus obtained was subjected to reduction by either of the methods of 1b or 1c above, there was obtained N,N-dimethyl-N-(3-amino-4-methoxybenzyl)-N-3-benzamidopropylammonium chloride 3. N-Methyl-N-(3-amino-4-methoxybenzyl)-N,N-bis(3-formamidopropyl)ammonium chloride a. A mixture of 54.0 parts of N,N-bis(3-formamidopropyl)methylamine, 50.4 parts of 4-methoxy-3-nitrobenzyl chloride, and 78 parts of acetonitrile was stirred at reflux for seven and a half hours. An additional 78 parts of acetonitrile was added to the reaction mixture causing an oil to separate. Heating at reflux was continued for an additional two hours and the 140 parts of acetonitrile was distilled away and 200 parts of water was added. The remaining acetonitrile was removed by distillation and the cooled reaction mixture was filtered with the aid of diatomaceous earth to obtain an aqueous solution of N-methyl-N-(3-nitro-4-methoxybenzyl)-N,N-bis(3-formamidopropyl)ammonium chloride. The solution was used directly for reduction of the nitro group.

Proceeding in a manner similar to that described above in 1b, and using 75 parts of iron powder and 15.0 parts of sodium acetate, the N-methyl-N-(3-nitro-4-methoxybenzyl)-N,N-bis(3-formamidopropyl)ammonium chloride obtained in the form of its aqueous solution from 3a above was reduced to obtain 61 parts of N-methyl-N-(3-amino-4-methoxybenzyl)-N,N-bis(3-formamidopropyl)ammonium chloride in the form of an aqueous solution.

4.
N-Methyl-N-(3-amino-4-methoxybenzyl)-N,N-bis(3-aminopropyl)ammonium chloride trihydrochloride N-Methyl-N-(3-amino-4-methoxybenzyl)-N,N-bis(3-formamidopropyl)ammonium chloride obtained in 3b above was hydrolyzed by heating in a refluxing solution of 63 parts of water containing 24 parts of concentrated hydrochloric acid during two hours to obtain N-methyl-N-3-(amino-4-methoxybenzyl)-N,N-bis(3-aminopropyl)ammonium chloride trihydrochloride.

5.
N,N-Dimethyl-N-(4-aminophenyl)carbamylmethyl-N-3-formamidopropylammonium chloride a. In a manner similar to that described above in 1a, using 14.2 parts of N-(3-dimethylaminopropyl)formamide, 20.0 parts of 2-chloro-4'-nitroacetanilide, and 78 parts of isopropyl alcohol there was obtained 27.4 parts of N,N-dimethyl-N-(4-nitrophenyl)carbamylmethyl-N-3-formamidopropylammonium chloride as a white solid which melted at 195°-196° C.

b. Proceeding in a manner similar to that described above in 1b, and using 68.8 parts of N,N-dimethyl-N-(4-nitrophenyl)carbamylmethyl-N-3-formamidopropylammonium chloride obtained above in 3a, 60.0 parts of iron powder, 12.0 parts of sodium acetate, and 250 parts of water there was obtained 33.0 parts of N,N-dimethyl-N-(4-aminophenyl)carbamylmethyl-N-3-formamidopropylammonium chloride.

c. Following the procedure described in 1c above, N,N-dimethyl-N-(4-nitrophenyl)carbamylmethyl-N-3-formamidopropylammonium chloride was catalytically hydrogenated in aqueous solution at 70°-75° C. and at 600 pounds per square inch in the presence of a 5 percent platinum sulfide on charcoal mixture to obtain N,N-dimethyl-N-(4-aminophenyl)carbamylmethyl-N-3-formamidopropylammonium chloride.

6.
N,N-Dimethyl-N-(4-aminophenyl)carbamylmethyl-N-3-aminopropylammonium chloride hydrochloride A solution of 10.0 parts of N,N-dimethyl-N-(4-nitrophenyl)carbamylmethyl-N-3-formamidopropylammonium chloride in 100 parts of water containing 6.0 parts of concentrated hydrochloric acid was heated for about two hours. The reaction mixture was rendered slightly alkaline by the addition of 50 percent aqueous sodium hydroxide and stored in the refrigerator for two days. The reaction mixture was then filtered to remove a small amount of solid and the filtrate was acidified with 48 parts of concentrated hydrochloric acid. Acetone was slowly added to the acidified filtrate until precipitation started. When precipitation of the product was complete, the solid was collected on a filter, washed with acetone, and dried at 75° C. to obtain 8.2 parts of N,N-dimethyl-N-(4-nitrophenyl)carbamylmethyl-N-3-aminopropylammonium chloride as the mono-hydrochloride salt, a white solid which melted at 244°-245° C.

When the N,N-dimethyl-N-(4-nitrophenyl)carbamylmethyl-N-3-aminopropylammonium chloride hydrochloride thus obtained is neutralized with dilute alkali and then subjected to reduction according to the procedure of 1b above, there is obtained N,N-dimethyl-N-(4-aminophenyl)carbamylmethyl-N-3-aminopropylammonium chloride.

7.
N,N-Dimethyl-N-(3-amino-4-methoxybenzyl)-N-3-aminopropylammonium chloride

When N,N-dimethyl-N-(3-amino-4-methoxybenzyl)-N-3-formamidopropylammonium chloride obtained in 1b or 1c above is hydrolyzed by heating in a dilute aqueous solution of hydrochloric acid according to the procedure of 4 above, there is obtained N,N-dimethyl-N-(3-amino-4-methoxybenzyl)-N-3-aminopropylammonium chloride as the dihydrochloride salt.

8.
N,N-Dimethyl-N-(3-amino-4-methoxybenzyl)-N-2-formamidoethylammonium chloride (a) A stirred solution of 24.6 parts of N-(2-dimethylaminoethyl)formamide and 30 parts of water was heated to 60° and over a period of one hour there was added 40.3 parts of 4-methoxy-3-nitrobenzylchloride. Heating between 60° and 65° C. was continued for three and one-half hours at which time the pH of the mixture stabilized above 7.0. To the cooled mixture was added 20 parts of water and the resulting mixture was clarified by filtration. An aqueous solution of N,N-dimethyl-N-(3-nitro-4-methoxybenzyl)-N-2-formamidoethylammonium chloride was obtained. This solution was used directly for reduction of the nitro group.

(b) The aqueous solution of N,N-dimethyl-N-(3-nitro-4-methoxybenzyl)-N-2-formamidoethylammonium chloride obtained in 8a above was made slightly acidic to a pH of 4.5 with acetic acid. The solution was heated to approximately 85° C. Then 66.8 parts of iron powder was added at a rate sufficient to maintain a temperature in the range of 85°-95° without further external heating. At the end of the addition, heating was resumed at 85°-90° for two hours. Without cooling the pH was adjusted to above 8.0 by the addition of aqueous sodium hydroxide. The mixture was filtered with the aid of diatomaceous earth. A sample of the clear solution was analyzed for free amine content by diazotization using a standardized sodium nitrite solution. The analytical results showed that the solution contained 45 parts of the product, N,N-dimethyl-N-(3-amino-4-methoxybenzyl)-N-2-formamidoethylammonium chloride. The product was used directly in the form of its aqueous solution without isolation.

9.
N,N-Diethyl-N-(3-amino-4-methoxybenzyl)-N-4-formamido-4-methylbutylammonium chloride (a) Proceeding in a manner similar to that described above in B-8a, 41.5 parts of N-(4-diethylamino-1-methylbutyl) formamide and 40.3 parts of 4-methoxy-3-nitrobenzyl chloride were interacted in 35 parts of water to obtain N,N-diethyl-N-(3-nitro-4-methoxybenzyl)-N-4-formamido-4-methylbutylammonium chloride. The product was not isolated but was used directly in solution for reduction of the nitro group.

(b) Following a procedure similar to that described above in B-8b, and using acetic acid and 66.8 parts of iron powder the N,N-diethyl-N-(3-nitro-4-methoxybenzyl)-N-4-formamido-4-methylbutylammonium chloride obtained in the form of its aqueous solution from 9a above was reduced to obtain 65.5 parts of N,N-diethyl-N-(3-amino-4-methoxybenzyl)-N-4-formamido-4-methylbutylammonium chloride in the form of an aqueous solution.

10.
N-Methyl-N-(5-amino-2-methoxybenzyl)-N,N-bis(3-formamidopropyl)ammonium chloride (a) Proceeding in a manner similar to that described above in B-8a, 142 parts of N,N-bis(3-formamidopropyl)methylamine and 141 parts of 5-nitro-2-methoxybenzyl chloride were interacted in 115 parts of water to obtain N-methyl-N-(5-nitro-2-methoxybenzyl)N,N-bis(3-formamidopropyl)ammonium chloride. The product was not isolated but was used directly in solution for reduction of the nitro group.

(b) Following a procedure similar to that described above in B-8b, and using acetic acid and 233.8 parts of iron powder the, N-methyl-N-(5-nitro-2-methoxybenzyl)-N,N-bis(3-formamidopropyl)ammonium chloride obtained in the form of its aqueous solution from 10a above was reduced to obtain 164.5 parts of N-methyl-N-(5-amino-2-methoxybenzyl)-N,N-bis(3-formamidopropyl)ammonium chloride.

11.
N,N-Dimethyl-N-(5-amino-2-methoxyphenyl)carbamylmethyl-N-3-formamidopropylammonium chloride (a) In a manner similar to that described above in B-1a, and using 27.3 parts of N-(3-dimethylaminopropyl)formamide, 48 parts of 2-chloro-2'-methoxy-5'-nitroacetanilide, and 157 parts of isopropyl alcohol there was obtained 52.6 parts of N,N-dimethyl-N-(5-nitro-2-methoxyphenyl)carbamylmethyl-N-3-formamidopropylammonium chloride as a white solid, m.p. 86°-88°.

(b) Proceeding in a manner similar to that described in B-8b, using 44.4 parts of N,N-dimethyl-N-(5-nitro-2-methoxyphenyl)carbamylmethyl-N-3-formamidopropylammonium chloride obtained in 11a, 125 parts of water, enough acetic acid to give a pH of 4.5, 22.8 parts of iron powder there was obtained 34.5 parts of N,N-dimethyl-N-(5-amino-2-methoxyphenyl)carbamylmethyl-N-3-formamidopropylammonium chloride.

12.
N-Methyl-N-3-(p-aminophenoxy)-2-hydroxy-1-propyl-N,N-bis(3-formamidopropyl)ammonium chloride (a) A stirred mixture of 141 parts of N,N-bis(3-formamidopropyl)methylamine, 105 parts xylene, 106 parts of water and 59.2 parts of concentrated hydrochloric acid (37%) was heated to between 55° and 60° C. Over a period of one hour there was added 113.1 parts of 1-(p-nitrophenoxy)-2,3-epoxypropane. Heating at 60° C. was continued for four and one-half hours after which, the mixture was cooled. The two-phase mixture was allowed to stand and then the water layer was separated. An aqueous solution of N-methyl-N-3-(p-nitrophenoxy)-2-hydroxy-1-propyl-N,N-bis(3-formamidopropyl)ammonium chloride was obtained. This solution was used directly for reduction of the nitro group.

(b) Following a procedure similar to that described above in B-8b, and using acetic acid and 200.4 parts of iron powder the N-methyl-N-3-(p-nitrophenoxy)-2-hydroxy-1-propyl-N,N-bis(3-formamidopropyl)ammonium chloride obtained in the form of its aqueous solution from 12a above was reduced to obtain 116 parts of N-methyl-N-3-(p-aminophenoxy)-2-hydroxy-1-propyl-N,N-bis(3-formamidopropyl)ammonium chloride in the form of an aqueous solution.

13.
N,N-Dimethyl-N-(p-aminophenacyl)-N-3-aminopropylammonium chloride

To a stirred solution of 143.5 parts of N-(3-dimethylaminopropyl)formamide and 700 parts of water is added 249 parts of p-acetamidophenacyl chloride. The mixture is stirred at room temperature for 16 hours and then at 60°–65° C. for two hours. Insoluble material is removed by filtration. The filtrate is combined with one-half its volume of concentrated hydrochloric acid (36% by weight) and the resulting solution is heated at the boil for two hours. The aqueous solution of N,N-dimethyl-N-(p-aminophenacyl)-N-3-aminopropylammonium chloride is used as such in the preparation of dyes.

Proceeding in a manner similar to that described above in B-13, the following aminophenacyl-substituted intermediates are produced:

N-methyl-N-(p-aminophenacyl)-N,N-bis(3-aminopropyl)ammonium chloride from N,N-bis(3-formamidopropyl)methylamine and p-acetamidophenacyl chloride.

N,N-dimethyl-N-(3-amino-4-methoxyphenacyl)-N-3-aminopropylammonium chloride from N-(3-dimethylaminopropyl)formamide and 3-acetamido-4-methoxyphenacyl chloride.

N,N-diethyl-N-(4-amino-2-chlorophenacyl)-N-4-amino-4-methylbutylammonium chloride from N-(4-diethylamino-1-methylbutyl)formamide and 4-acetamido-2-chlorophenacyl chloride.

N,N-dimethyl-N-(4-amino-3-bromophenacyl)-N-2-aminoethylammonium chloride from N-(2-dimethylaminoethyl)formamide and 4-acetamido-3-bromophenacyl chloride.

1-[2-(3-Amino-4-methylbenzoyl)ethyl]-1-[2-(N-n-butylamino)ethyl]piperazinium chloride from N-n-butyl-N-[2-(4-formylpiperazino)ethyl]acetamide and 2-(3-acetamido-4-methylbenzoyl)ethyl chloride.

14.
N,N-Dimethyl-N-(5-amino-1-naphthylmethyl)-N-3-formamidopropylammonium chloride (a) Proceeding in a manner similar to that described above in B-8a, 29.9 parts of N-(3-dimethylaminopropyl)formamide and 44.3 parts of 5-nitro-1-chloromethylnaphthalene were interacted in 30 parts of water to obtain N,N-dimethyl-N-(5-nitro-1-naphthylmethyl)-N-3-formamidopropylammonium chloride. The product was not isolated but was used directly in solution for reduction of the nitro group.

(b) Following a procedure similar to that described above in B-1b, and using 60 parts of iron powder and 14 parts sodium acetate, the N,N-dimethyl-N-(5-nitro-1-naphthylmethyl)-N-3-formamidopropylammonium chloride obtained in the form of its aqueous solution from 15a above was reduced to obtain 56.1 parts of N,N-dimethyl-N-(5-amino-1-naphthylmethyl)-N-3-formamidopropylammonium chloride.

In addition to those for which detailed preparations are given above, the following N-R$^1$-N-[(lower-alkylene)$^1$-Y$^1$NH$_2$]-N-R$^2$-N-[(lower-alkylene)-NR°Y]-quaternary ammonium intermediates are obtained when the indicated nitrophenyl-substituted quaternizing agent is interacted with the indicated tertiary amino compound according to a procedure similar to those given under section B, 1a, 2, 3a, 5a, 8a, 12a and 13 and the resulting nitro-substituted compound is reduced by a procedure similar to those given under section B, 1b, 1c and 8b.

N,N-Dimethyl-N-2-(3-amino-4-methylphenyl)ethyl-N-3-formamidopropylammonium chloride starting with N-(3-dimethylaminopropyl)formamide and 2-(4-methyl-3-nitrophenyl)ethyl chloride;

N-Methyl-N-3-(4-aminophenyl)propyl-N,N-bis(3-formamidopropyl)ammonium chloride starting with N,N-bis(3-formamidopropyl)methylamine and 3-(4-nitrophenyl)propyl chloride;

N,N-Diethyl-N-6-(3-amino-4-methoxyphenyl)hexyl-N-3-formamidopropylammonium chloride starting with N-(3-diethylaminopropyl)formamide and 6-(4-methoxy-3-nitrophenyl)hexyl chloride;

N,N-Dimethyl-N-2-ethyl-4-(3-amino-5-chlorophenyl)butyl-N-3-benzamidopropylammonium chloride starting with N-(3-dimethylaminopropyl)benzamide and 2-ethyl-4-(3-chloro-5-nitrophenyl)butyl chloride;

N,N-Dimethyl-N-1-methyl-3-(4-amino-3-bromophenyl)propyl-N-3-acetamidopropylammonium chloride starting with N-(3-dimethylaminopropyl)acetamide and 1-methyl-3-(3-bromo-4-nitrophenyl)propyl chloride;

N,N-Diethyl-N-3-(4-amino-2-chlorophenylcarbamyl)propyl-N-4-methyl-4-formamidobutylammonium chloride starting with N-(4-diethylamino-1-methylbutyl)formamide and 2',4-dichloro-4'-nitrobutyranilide;

N,N-Dimethyl-N-(N-methyl-4-amino-2-chlorophenylcarbamyl)methyl-N-3-phthalamidopropylammonium chloride starting with N-(3-dimethylaminopropyl)phthalamic acid and 2,2'-dichloro-N-methyl-4'-nitroacetanilide;

N,N-Bis(2-hydroxyethyl)-N-(3-amino-4-methoxybenzyl)-N-3-formamidopropylammonium chloride starting with N-(3-diethanolaminopropyl)formamide and 4-methoxy-3-nitrobenzyl chloride;

1-[2-(3-Amino-4-methylphenyl)ethyl]-1-(2-formamidoethyl)-4-formylpiperazinium chloride starting with N-[2-(4-formylpiperazinoethyl]formamide and 2-(4-methyl-3-nitrophenyl)ethyl chloride;

N-Ethyl-N-1-methylbutyl-N-[2-(2-ethyl-4-aminophenylcarbamyl)ethyl]-N-2-propionamidoethylammonium chloride starting with N-[2-(N-ethyl-N-1-methylbutyl)aminoethyl]propionamide and 3-chloro-2'-ethyl-4'-nitropropionoanilide;

N,N-Dimethyl-N-3-(4-aminophenyl)propyl-N-6-isobutyramidohexylammonium chloride starting with N-(6-dimethylaminohexyl)iso-butyramide and 3-(4-nitrophenyl)propyl chloride;

N-Methyl-N-ethyl-N-3-(4-aminophenyl)propyl-N-2-(N-methylpropionamido)ethylammonium bromide starting with N-methyl-N-[2-(N-ethyl-N-methyl)aminoethyl]propionamide and 3-(4-nitrophenyl)propyl bromide;

N,N-Dimethyl-N-(3-amino-4-methoxybenzyl)-N-3-[N-(3-hydroxypropyl)formamido]propylammonium iodide starting with N-(3-hydroxypropyl)-N-(3-dimethylaminopropyl)formamide and 3-nitro-4-methoxybenzyl iodide;

N-Methyl-N-2-(4-methyl-3-aminophenyl)ethyl-N,N-bis[3-(N-methylformamido)propyl]ammonium bromide starting with N,N-bis[3-(N-methylformamido)propyl]methylamine and 2-(4-methyl-3-nitrophenyl)ethyl bromide;

N-(3-Amino-4-methoxybenzyl)-N-2-(N-isopropylacrylamido)ethylpiperidinium chloride starting with N-isopropyl-N-(2-piperidinoethyl)acrylamide and 4-methoxy-3-nitrobenzyl chloride;

N,N-Di-n-propyl-N-(4-amino-N-methyl-2-chlorophenylcarbamyl)methyl-N-1-methyl-2-(N-ethyl-p-nitrobenzamido)ethylammonium chloride starting with 2,2'-dichloro-N-methyl-4'-nitroacetanilide and N-ethyl-N-(2-di-n-propylamino-2-methylethyl)p-nitrobenzamide;

N-Methyl-N-2-(N-methylacetamido)ethyl-N-2-ethyl-4-(3-chloro-4-aminophenyl)butyl-N-3-(N-methylacetamido)propylammonium chloride starting with N-[3-(N-methylacetamido)propyl]-N-[2-(N-methylacetamido)ethyl]methylamine and 2-ethyl-4-(3-chloro-5-nitrophenyl)butyl chloride;

N-(4-Amino-N-methyl-2-chlorophenylcarbamyl)methyl-N-3-(N-methyl-n-valeramido)propylpyrrolidinium chloride starting with N-methyl-N-(3-pyrrolidinylpropyl)valeramide and 2,2'-dichloro-N-methyl-4'-nitroacetanilide;

N-Allyl-N-ethyl-N-6-(N-ethyl-4-aminophenylcarbamyl)hexyl-N-2-(4-chlorobenzamido)ethylammonium chloride starting with N-[2-(N-allyl-N-ethyl)aminoethyl]p-chlorobenzamide and 7-chloro-N-ethyl-4'-nitroheptanoanilide;

N-Methyl-N-2-(N-n-propyl-4-aminophenylcarbamyl)-2-n-propylethyl-N-2-acetamidoethyl-N-3-acetamidopropylammonium chloride starting with N-[3-(N-methyl-N-2-acetamidoethyl)aminopropyl]acetamide and 3-chloro-,2-di(n-propyl)-4'-nitropropionanilide;

N-(3-Amino-4-methoxybenzyl)-N-2-acrylamidoethylpiperidinium chloride starting with N-(2-piperidinoethyl)acrylamide and 4-methoxy-3-nitrobenzyl chloride;

N-n-Butyl-N-isopropyl-N-[4-(3-amino-4-isobutylphenylcarbamyl)]n-butyl-N-phenylacetamidoethylammonium chloride starting with N-[2-(N-n-butyl-N-isopropyl)aminoethyl]phenylacetamide and 5-chloro-4'-iso-butyl-3'-nitrovalerylanilide;

N-(4-Amino-N-methyl-2-chlorophenylcarbamyl)methyl-N-3-n-valeramidopropylpyrrolidinium chloride starting with N-(3-pyrrolidinylpropyl)valeramide and 2,2'-dichloro-N-methyl-4'-nitroacetanilide;

N,N-Diallyl-N-1-methyl-3-(4-amino-3-bromophenyl)propyl-N-2-phenylpropionamidoethyl ammonium chloride starting with N-(2-diallylaminoethyl)- phenylpropionamide and 1-methyl-3-(3-bromo-4-nitrophenyl)propyl chloride;

N,N-Diethyl-N-2,2-dimethyl-2-(4-amino-2-n-butoxyphenylcarbamyl)ethyl-N-5-(2-methylacrylamidopentylammonium chloride starting with N-(2-diethylaminopentyl)-2-methylacrylamide and 3-chloro-2,2-dimethyl-2'-n-butoxy-4'-nitropropionanilide;

N,N-Diisopropyl-N-2-ethyl-4-(5-amino-3-chlorophenyl)butyl-N-2-(4-methoxybenzamido)ethylammonium chloride starting N,N-Diisopropyl-N-2-ethyl-4-(5-amino-3-chlorophenyl)butyl-N-2-(4-methoxybenzamido)ethylammonium chloride starting with N-(2-diisopropylaminoethyl)-p-methoxybenzamide and 2-ethyl-4-(3-chloro-5-nitrophenyl)butyl chloride;

N,N-Diisopentyl-N-5-(5-amino-2-propoxyphenylcarbamyl)pentyl-N-2-butyramidoethylammonium chloride starting with N-(2-diisopentylaminoethyl)butyramide and 6-chloro-2'-n-propoxy-5'-nitrohexanoanilide;

N,N-Dihexylamino-N-6-(3-amino-4-methoxyphenyl)hexyl-N-2-n-caproamidoethylammonium chloride starting with N-(2-dihexylaminoethyl)-n-caproamide and 6-(4-methoxy-3-nitrophenyl)hexyl chloride;

N,N-Diisobutyl-N-2-(3-amino-4-methylphenyl)ethyl-N-6-acetamidohexylammonium chloride starting with N-(6-diisobutylaminohexyl)acetamide and 2-(4-methyl-3-nitrophenyl)ethyl chloride;

N,N-Diethyl-N-1-methyl-3-(3-bromo-4-aminophenyl)propyl-N-3-methyl-3-acrylamidopropylammonium chloride starting with N-(1-methyl-3-diethylaminopropyl)acrylamide and 1-methyl-3-(3-bromo-4-nitrophenyl)propyl chloride;

N,N-Di-n-propyl-N-(3-amino-4-methoxybenzyl)-N-1-methyl-2-(p-nitrobenzamido)ethylammonium chloride starting with N-(2-di-n-propylamino-2-methylethyl)-p-nitrobenzamide and 4-methoxy-3-nitrobenzyl chloride;

N-Methyl-N-(4-amino-2-iodobenzyl)-N,N-bis(3-formamidopropyl)ammonium chloride starting with N,N-bis(3-formamidopropyl) methylamine and 4-nitro-2-iodobenzyl bromide;

N,N-Diethyl-N-6-(3-amino-4-butoxyphenyl)hexyl-N-3-formamidopropylammonium chloride starting with N-(3-diethylaminopropyl)formamide and 6-(4-butoxy-3-nitrophenyl)hexyl chloride;

N-Ethyl-N-1-methylbutyl-N-1-methyl-3-(4-amino-3-bromophenyl)propyl-N-2-propionamidoethylammonium chloride starting with N-[2-(N-ethyl-N-1-methylbutyl)aminoethyl]propionamide and 1-methyl-3-(3-bromo-4-nitrophenyl)propyl chloride;

N-2-(4-amino-3-n-butylphenyl)ethyl-N-2-(N-isopropylacrylamido)ethylpiperidinium bromide starting with N-isopropyl-N-(2-piperidinoethyl)acrylamide and 2-(3-n-butyl-4-nitrophenyl) ethyl bromide;

N,N-Diallyl-N-4-amino-3-fluorobenzyl-N-2-phenylpropionamidoethylammonium chloride starting with N-(2-diallylaminoethyl) phenylpropionamide and 3-fluoro-4-nitrobenzyl chloride;

N-Methyl-N-ethyl-N-3-amino-5-ethylbenzyl-N-2-(N-methylpropionamido)ethylammonium chloride starting with N-methyl-N-[2-(N-ethyl-N-methyl)aminoethyl]propionamide and 2-ethyl-5-nitrobenzyl chloride;

N,N-Bis(2-hydroxyethyl)-N-2-(N-n-propyl-4-aminophenylcarbamyl)-2-n-propylethyl-N-2,2-dimethyl-2-benzamidoethylammonium chloride starting with N-(2-diethanolamino-1,1-dimethylethyl)phenylacetamide and 3-chloro-N,2-di(n-propyl)-4'-nitropropionanilide;

N,N-dimethyl-N-(3-amino-4-methoxybenzyl)-N-3-[N-(2-hydroxyethyl)formamido]propylammonium chloride starting with N-(2-hydroxyethyl)-N-(3-dimethylaminopropyl)formamide and 4-methoxy-3nitrobenzyl chloride;

N-Methyl-N-isopropyl-N-2-ethyl-4-(3-chloro-4-aminophenyl)butyl-N-3-salicylamidopropylammonium chloride starting with N-[3-(N-isopropyl-N-methyl)aminopropyl]salicylamide and 2-ethyl-4-(3-chloro-5-nitrophenyl)butyl chloride; and N,N-Dimethyl-N-2-(p-aminophenoxy)ethyl-N-3-formamidopropylammonium chloride starting with N-(3-dimethylaminopropyl)formamide and 2-(p-nitrophenoxy)ethyl chloride.

N-Methyl-N-2-(4-methyl-3-aminophenoxy)ethyl-N,N-bis-(3-formamidopropyl)ammonium chloride starting with N,N-bis(3-formamidopropyl)methylamine and 2-(4-methyl-3-nitrophenoxy)ethyl chloride.

N,N-Diethyl-N-2-(N'-methyl-p-aminobenzamido)ethyl-N-3-formamidopropylammonium chloride starting with N-(3-diethylaminopropyl)formamide and N-methyl-N-(2-chloroethyl)-p-nitrobenzamide.

N,N-Dimethyl-N-2-(N'-ethyl-4-chloro-3-aminobenzamido)ethyl-N-2-acetamidoethylammonium chloride starting with N-(2-dimethylaminoethyl)acetamide and N-ethyl-N-(2-chloroethyl)-4-chloro-3-nitrobenzamide.

N-Methyl-N-2(p-aminobenzenesulfamido)ethyl-N,N-bis-(3-formamidopropyl)ammonium chloride starting with N,N-bis(3-formamidopropyl)methylamine and N-(2-chloroethyl)-p-nitrobenzenesulfonamide.

N,N-Diethyl-N-2-(N'-methyl-3-amino-p-toluenesulfamido)ethyl-N-4-formamido-4-methylbutylammonium chloride starting with N-(4-diethylamino-1-methylbutyl)formamide and N-methyl-N-(2-chloroethyl)-3-nitro-p-toluenesulfonamide.

N,N-Dimethyl-N-2-(p-aminobenzenesulfonyl)ethyl-N-3-formamidopropylammonium chloride starting with N-(3-dimethylaminopropyl)formamide and 2-(p-nitrobenzenesulfonyl)ethyl chloride.

N,N-Diethyl-N-2-(3-amino-4-methoxybenzenesulfonyl)ethyl-N-2-acetamidoethylammonium chloride starting with N-(2-diethylaminoethyl)formamide and 2-(3-nitro-4-methoxybenzenesulfonyl)ethyl chloride.

The foregoing N-R$^1$-N-[(lower-alkylene)$^1$-Y$^1$NH$_2$]-N-R$^2$-N-[(lower-alkylene)-NR°COR]ammonium halide intermediates are of course, useful for preparing the compounds of Formula I in which Y is —COR. In addition, they may be hydrolyzed by a procedure similar to that in C-4 hereinabove to obtain the corresponding N-R$^1$-N-[(lower-alkylene)$^1$-Y$^1$NH$_2$]-N-R$^2$-N-[(lower-alkylene)-NR°H]ammonium halide intermediates which are useful for and afford an alternate method for preparing the final products of Formula I in which Y is hydrogen.

C.

N-R$^1$-N-[(lower-alkylene)$^1$-Y$^2$-H]-N-R$^2$-N-[(lower-alkylene)-NR°Y]quaternary ammonium intermediates (Formula VI)

1.

N,N-Dimethyl-N-2-(N'-ethylanilino)ethyl-N-3-formamidopropylammonium chloride.

A stirred mixture of 157 parts of N-(3-dimethylaminopropyl)formamide in 20.0 parts of water was heated to 80° C. and over a period of one and one half hours there was added 171 parts of N-ethyl-N-(2-chloroethyl)aniline. The reaction mixture was heated at 95°-100° C. until a small sample when diluted with water gave a clear solution. After about seven hours of heating at 95°-100° C. there was obtained N,N-dimethyl-N-2-(N'-ethylanilino)ethyl-N-3-formamidopropylammonium chloride in the form of an aqueous solution.

2.
N,N-Dimethyl-N-2-(N'-ethylanilino)ethyl-N-3-aminopropylammonium chloride Dilute hydrochloric acid hydrolysis of N,N-dimethyl-N-2-(N'-ethylanilino)ethyl-N-3-formamidopropylammonium chloride following a procedure similar to that of B-4 above gives N,N-dimethyl-N-2-(N'-ethylanilino)ethyl-N-3-aminopropylammonium chloride.

3.
N-Methyl-N-2-(N'-ethylanilino)ethyl-N,N-bis(3-formamidopropylammonium chloride Proceeding in a manner similar to that described in C-1, 185.5 parts of N,N-bis(3-formamidopropyl)methylamine and 171 parts of N-ethyl-N-(2-chloroethyl)aniline were interacted in 140 parts of water to obtain a nearly quantitative yield of N-methyl-N-2-(N'-ethylanilino)ethyl-N,N-bis(3-formamidopropyl)ammonium chloride in the form of an aqueous solution.

4.
N-Methyl-N-2-(N'-ethylanilino)ethyl-N,N-bis(3-aminopropyl)ammonium chloride Dilute hydrochloric acid hydrolysis of N-methyl-N-2-(N'-ethylanilino)ethyl-N,N-bis(3-formamidopropyl)ammonium chloride following a procedure similar to that of B-4 above gave N-methyl-N-2-(N'-ethylanilino)ethyl-N,N-bis(3-aminopropyl)ammonium chloride.

5.
N,N-Dimethyl-N-3-(N'-ethylanilino)-2-hydroxy-1-propyl-N-3-formamidopropylammonium chloride Proceeding in a manner similar to that described in 1, N-(dimethylaminopropyl)formamide and N-ethyl-N-(3-chloro-2-hydroxy-1-propyl)aniline are interacted in water to obtain N,N-dimethyl-N-3-(N'-ethylanilino)-2-hydroxy-1-propyl-N-3-formamidopropylammonium chloride.

6.
N,N-Dimethyl-N-3-(N'-ethylanilino)-2-hydroxy-1-propyl-N-3-aminopropylammonium chloride Dilute hydrochloric acid hydrolysis of N,N-dimethyl-N-3-(N'-ethylanilino)-2-hydroxy-1-propyl-N-3-formamidopropylammonium chloride following a procedure similar to that of C-4 above gives N,N-dimethyl-N-3-(N'-ethylanilino)-2-hydroxy-1-propyl-N-3-aminopropylammonium chloride.

7.
N-Methyl-N-3-(N'-ethyl-1-naphthylamino)-2-hydroxy-1-propyl-N,N-bis(3-formamidopropyl)ammonium chloride Proceeding in a manner similar to that described in 1, N,N-bis(3-formamidopropyl)methylamine and N-ethyl-N-(3-chloro-2-hydroxy-1-propyl)-1-naphthylamine are interacted in water to obtain N-methyl-N-3-(N'-ethyl-1-naphthylamino)-2-hydroxy-1-propyl-N,N-bis(3-formamidopropyl)ammonium chloride.

8.
N-Methyl-N-3-(N'-ethyl-1-naphthylamino)-2-hydroxy-1-propyl-N,N-bis(3-aminopropyl)ammonium chloride Dilute hydrochloric acid hydrolysis of N-methyl-N-3-(N'-ethyl-1-naphthylamino)-2-hydroxy-1-propyl-N,N-bis(3-formamidopropyl)ammonium chloride following a procedure similar to that of C-4 above gives N-methyl-N-3-(N'-ethyl-1-naphthylamino)-2-hydroxy-1-propyl-N,N-bis(3-aminopropyl)ammonium chloride.

When the indicated tert. amino compound is quaternized with the indicated N-R$^7$-N-(halo-lower-alkylene)-substituted aniline or aminonaphthalene according to a procedure similar to that of C-1 above, the following N-R$^1$-N-[(lower-alkylene)$^1$Y$^2$-H]-N-R$^2$-N-[(lower-alkylene)NR°COR-]ammonium halide intermediates are obtained:

N-Ethyl-N-1-methylbutyl-N-4-(N-ethylanilino)butyl-N-2-(N-propylpropionamido)ethylammonium chloride from N-[2-N-ethyl-N-1-methylbutyl)aminoethyl]propionamide and N-ethyl-N-(4-chlorobutyl)aniline;

N,N-Dimethyl-N-3-ethyl-4-(N-methylanilino)butyl-N-6-iso-butyramidohexylammonium chloride from N-(6-dimethylaminohexyl)iso-butyramide and N-methyl-N-(2-ethyl-4-chlorobutyl)aniline;

N-6-(N-Propylanilino)hexyl-N-2-acrylaminoethylpiperidinium chloride from N-(2-piperidinoethyl)acrylamide and N-n-propyl-N-(6-chlorohexyl)aniline;

N-2-(N-Ethylanilino)ethyl-N-3-valeramidopropylpyrrolidinium chloride from N-(3-pyrrolidinylpropyl)valeramide and N-ethyl-N-(2-chloroethyl)aniline;

N,N-Diallyl-N-2,2-dimethyl-3-anilinopropyl-N-2-phenylpropionamidoethylammonium chloride from N-(2-diallylaminoethyl)phenylpropionamide and N-(2,2-dimethyl-3-chloropropyl)aniline;

N,N-Diethyl-N-3-(2-naphthylamino)propyl-N-3-methyl-3-acrylamidopropylammonium chloride from N-(1-methyl-3-diethylaminopropyl)acrylamide and N-(3-chloropropyl)-2-naphthylamide;

N,N-Bis(2-hydroxyethyl)-N-5-(N-isopentylanilino)pentyl-N-2,2-dimethyl-2-phenylacetamidoethylammonium chloride from N-(2-diethanolamino-1,1-dimethylethyl)phenylacetamide and N-isopentyl-N-(5-chloropentyl)aniline;

N-Methyl-N-isopropyl-N-5-(N-methyl-1-naphthylamino)pentyl-N-3-salicylamidopropylammonium chloride from N-[3-(N-isopropyl-N-methyl)aminopropyl]salicylamide and N-methyl-N-(5-chloropentyl)-1-naphthylamine;

N-Methyl-N-3-formamidopropyl-N-2-(N-tert.-butyl-2-naphthylamino)ethyl-N-3-formamidopropylammonium chloride from N,N-bis(3-formamidopropyl)methylamine and N-tert.-butyl-N-(2-chloroethyl)-2-naphthylamine;

N-Methyl-N-4-(N-ethylanilino)butyl-N-2-acetamidoethyl-N-3-acetamidopropylammonium chloride from N-[3-(N-methyl-N-2-acetamidoethyl)aminopropyl]acetamide and N-ethyl-N-(4-chlorobutyl)aniline;

N,N-Dimethyl-N-4-(N-ethylanilino)butyl-N-3-[N-(3-hydroxypropyl)formamido]propylammonium chloride from N-(3-hydroxypropyl)-N-(3-dimethylaminopropyl)formamide and N-ethyl-N-(4-chlorobutyl)aniline;

N-Methyl-N-3-ethyl-4-(N-methylanilino)butyl-N,N-bis-[3-(N-methylformamido)propyl]ammonium chloride from N,N-bis[3-(N-methylformamido)propyl]methylamine and N-methyl-N-(2-ethyl-4-chlorobutyl)aniline; and N,N-Di-n-propylamino-N-2,2-dimethyl-3-anilinopropyl-N-1-methyl-2-(N-ethyl-p-nitrobenzamido)ethylammonium bromide from N-ethyl-N-(2-di-n-propylamino-2-methylethyl)p-nitrobenzamide and N-(2,2-dimethyl-3-chloropropyl)aniline.

N,N-dimethyl-N-2-(N'-ethyl-m-toluidino)ethyl-N-2-formamidoethylammonium chloride from N-(2-dimethylaminoethyl)formamide and N-ethyl-N-(2-chloroethyl)-m-toluidine.

N,N-Diethyl-N-2-(N'-2-cyanoethylanilino)ethyl-N-3-formamidopropylammonium chloride from N-(3-diethylaminopropyl)formamide and N-(2-cyanoethyl)-N-(2-chloroethyl)aniline.

N-Methyl-N-2-(N'-methyl-m-chloroanilino)ethyl-N,N-bis-(3-acetamidopropyl)ammonium chloride from N,N-bis(3-acetamidopropyl)methylamine and N-methyl-N-(2-chloroethyl)-m-chloroaniline.

N-Methyl-N-(2-hydroxyethyl)-N-2-(N'-ethyl-o-anisidino)ethyl-N-3-formamidopropylammonium chloride from N-(2-hydroxyethyl)-N-(3-formamidopropyl)methylamine and N-ethyl-N-(2-chloroethyl)-o-anisidine.

N,N-Diethyl-N-3-(N'-ethyl-m-toluidino)-2-hydroxy-1-propyl-N-(3-formamidopropyl)ammonium chloride from N-(3-diethylaminopropyl)formamide and N-ethyl-N-(3-chloro-2-hydroxy-1-propyl)-m-toluidine.

N-Methyl-N-(2-hydroxyethyl)-N-3-(N'-methyl-o-anisidino)-2-hydroxy-1-propyl-N-3-formamidopropylammonium chloride from N-(2-hydroxyethyl)-N-(3-formamidopropyl)methylamine and N-methyl-N-(3-chloro-2-hydroxy-1-propyl)-o-anisidine.

The foregoing N-R$^1$-N-[(lower-alkylene)$^1$-Y$^2$-H]-N-R$^2$-N-[(lower-alkylene)NR°COR]ammonium halide intermediates can of course, be used directly to produce the compounds of Formula VIII in which Y is —COR. Additionally, they may be hydrolyzed by a procedure similar to that described in C-4 hereinabove to obtain the corresponding N-R$^1$-N-[(lower-alkylene)$^1$-Y$^2$-H]-N-R$^2$-N-[(lower-alkylene)NR°H]ammonium halide intermediates which are useful for and afford an alternate method for preparing the final products of Formula II in which Y is hydrogen.

D. N-R$^8$-N-[(lower-alkylene)-Y$^3$-NH$_2$]-N-R$^9$-N-R$^{10}$ quaternary ammonium intermediates (Formula VII)

1.
N-(3-amino-4-methoxybenzyl)-N,N,N-trimethylammonium chloride a. To a stirred solution of 35.0 parts of trimethylamine in 105 parts of water there was added over a one and one-half hour period 100.8 parts of 4-methoxy-3-nitrobenzyl chloride. The reaction mixture was heated at approximately 50° C. for three and a half hours and was then diluted with an additional 50 parts of water. The solution was allowed to cool to about 25° C. and the pH was adjusted to 4.9 by the addition of dilute acetic acid. The solution was clarified by filtration and was used directly for reduction of the thus obtained N-(3-nitro-4-methoxybenzyl)-N,N,N-trimethylammonium chloride dissolved therein.

b. The aqueous solution of N-(3-nitro-4-methoxybenzyl)-N,N,N-trimethylammonium chloride obtained in (a) was heated to approximately 85° C. Then 110 parts of iron powder was added at a rate sufficient to maintain a temperature in the range 85°–90° C. without further external heating. At the end of the addition, heating was resumed at 85°–90° C. for one hour and then the reaction was set aside at room temperature overnight. The reaction mixture was heated to 80° C. and the pH adjusted to approximately 8.0 by the addition of a dilute aqueous solution of sodium carbonate. The mixture was allowed to cool to approximately 45° C. and was then filtered with the aid of 3 parts of decolorizing charcoal. A sample of the clear solution was analyzed for free amine content by diazotization using a standardized sodium nitrite solution. The analytical results showed that N-(3-amino-4-methoxybenzyl)-N,N,N-trimethylammonium chloride was obtained in nearly quantitative yield. The product was used directly in the form of its aqueous solution without isolation.

2.
N-(3-amino-4-methoxybenzyl)-N-(2-hydroxyethyl)-N,N-dimethylammonium chloride a. A stirred solution of 46.4 parts of dimethylaminoethanol in 50 parts of water was heated to 50° C. and over a period of two hours there was added 100.8 parts of 4-methoxy-3-nitrobenzyl chloride. The reaction mixture was heated at 50°–55° C. for three hours longer and then set aside at room temperature overnight. The mixture was filtered and the clear filtrate containing the product, N-(3-nitro-4-methoxybenzyl)-N-(2-hydroxyethyl)N,N-dimethylammonium chloride, was used directly for reduction of the nitro group.

b. A mixture of 150 parts of iron powder, 80 parts of water and 10 parts of concentrated hydrochloric acid was stirred vigorously and heated to 90° C. Heating was stopped and 259.1 parts of the aqueous solution of N-(3-nitro-4-methoxybenzyl)-N-(2-hydroxyethyl)-N,N-dimethylammonium chloride obtained in (a) above was added at a rate sufficient to maintain the temperature at 85°–90° C. After the addition was complete, heating at 85°–90° C. was continued for one hour. Then 6.0 parts of sodium carbonate was added and the mixture was cooled to 40° C. and filtered. A sample of the solution was analyzed for free amine content by diazotization using a standardized sodium nitrite solution. The analytical results showed that the solution contained 113.6 parts of the product, N-(3-amino-4-methoxybenzyl)-N-(2-hydroxyethyl)-N,N-dimethylammonium chloride. The product was used directly in the form of its aqueous solution without isolation.

3.
N-(3-amino-4-methoxybenzyl)-N,N-bis(2-hydroxyethyl)-N-methylammonium chloride a. A stirred solution of 61.9 parts of N-methyl diethanolamine in 100 parts of water was heated to 50° C. and over a period of one and a half hours there was added 201.6 parts of 4-methoxy-3-nitrobenzyl chloride. The reaction mixture was heated at 55°–60° C. for approximately six hours while adding in small amounts a total of 23.1 parts of N-methyl diethanolamine as needed in order to keep the reaction slightly alkaline. At the end of the heating period, the reaction mixture was diluted with 100 parts of water and was set aside at room temperature overnight. The next day the resulting slurry was filtered. The solid removed by filtration was dried to recover 61.2 parts of unreacted 4-methoxy-3-nitrobenzyl chloride. The clear filtrate containing the product, N-(3-nitro-4-methoxybenzyl)-N,N-bis(2-hydroxyethyl)-N-methylammonium chloride, was used directly for reduction of the nitro group.

b. The aqueous solution of N-(3-nitro-4-methoxybenzyl)-N,N-bis(2-hydroxyethyl)-N-methylammonium chloride obtained in D-3a above was made slightly alkaline by the addition of a small amount of 5 percent aqueous sodium hydroxide. Then 42 parts of sodium acetate were added to the solution and the mixture was heated to 65° C. Heating was stopped and 210 parts of iron powder were added to the stirred reaction mixture at a rate such as to maintain the temperature at 65°–70° C. without external heating. At the end of the addition, heating was resumed at 65°–70° C. for four hours. The reaction mixture was then treated with 7 parts of decolorizing charcoal and filtered to obtain an amber solution. A sample of the solution was analyzed for free amine content by diazotization using a standardized sodium nitrite solution. The analytical results showed that the solution contained 165 parts of N-(3-amino-4-methoxybenzyl)-N,N-bis(2-hydroxyethyl)-N-methylammonium chloride. The product was used directly in the form of its aqueous solution without isolation.

4.
N-(3-amino-4-methoxybenzyl)-N-(2-hydroxypropyl)-N,N-dimethylammonium chloride a. Proceeding in a manner similar to that described above in D-1a, 16 parts of 1-dimethylamino-2-propanol and 32 parts of 4-methoxy-3-nitrobenzyl chloride were interacted in 14 parts of water to obtain N-(3-nitro-4-methoxybenzyl)-N-(2-hydroxypropyl)-N,N-dimethylammonium chloride. The product was not isolated but was used directly in solution for reduction of the nitro group.

b. Following a procedure similar to that described above in D-1b, and using 33 parts of iron powder and 6 parts of acetic acid, the N-(3-nitro-4-methoxybenzyl)-N-(2-hydroxypropyl)-N,N-dimethylammonium chloride obtained in the form of its aqueous solution from D-4a above was reduced to obtain 39.6 parts of N-(3-amino-4-methoxybenzyl)-N-(2-hydroxypropyl)-N,N-dimethylammonium chloride in the form of an aqueous solution.

In addition to those for which detailed preparations are given above, the following N-$R^8$-N-[(lower-alkylene)-$Y^3$-$NH_2$]N-$R^9$-N-$R^{10}$ quaternary ammonium intermediates are obtained when the indicated nitrophenyl-substituted quaternizing agent is interacted with the indicated tertiary amino compound according to a procedure similar to those given under section D, 1a, 2a, and 3a and the resulting nitro-substituted compound is reduced by a procedure similar to those given under section D, 1b, 2b and 3b:

N-(4-amino-2-iodobenzyl)-N,N,N-tri-n-hexylammonium bromide starting with trihexylamine and 4-nitro-2-iodobenzyl bromide;

N-Methyl-N-n-propyl-N-6-(3-amino-4-butoxyphenyl)-hexyl-N-n-hexylammonium chloride starting with N-methyl-N-propylhexylamine and 6-(4-butoxy-3-nitrophenyl)hexyl chloride;

N,N-Diethyl-N-allyl-N-1-methyl-3-(4-amino-3-bromophenyl)propylammonium chloride starting with N,N,-diethylallylamine and 1-methyl-3-(3-bromo-4-nitrophenyl)propyl chloride;

N,N-Di-n-butyl-N-3-hydroxypropyl-N-2-(4-amino-3-n-butylphenyl)ethylammonium bromide starting with 3-di-n-butylamino-1-propanol and 2-(3-n-butyl-4-nitrophenyl)ethyl bromide;

N-Methyl-N-allyl-N-6-n-hydroxyhexyl-N-4-amino-3-fluorobenzylammonium chloride starting with 6-methylallylamino-1-hexanol and 3-fluoro-4-nitrobenzyl chloride;

N,N-Di(3-hexenyl)-N-2-hydroxyethyl-N-3-amino-5-ethylbenzylammonium chloride starting with 2-[N,N-di(3-hexenyl)]aminoethanol and 3-ethyl-5-nitrobenzyl chloride;

N,N-Di(3-hexenyl)-N-2-hydroxyethyl-N-5-amino-2-ethylbenzylammonium chloride starting with 2-di(3-hexenyl)aminoethanol and 2-ethyl-5-nitrobenzyl chloride;

N-(2-Butenyl)-N-n-pentyl-N-vinyl-N-1-methyl-3-(4-amino-3-bromophenyl)propylammonium bromide starting with N-2-butenyl-N-vinyl-n-pentylamine and 1-methyl-3-(3-bromo-4-nitrophenyl)propyl bromide;

N-n-Propyl-N-2-hydroxyethyl-N-3-hydroxypropyl-N-4-(4-aminophenyl)butylammonium chloride starting with 3-(N-n-propyl-N-2-hydroxyethyl)amino-1-propanol and 4-(4-nitrophenyl)butyl chloride;

N,N-Di(2-hydroxyethyl)-N-allyl-N-2-ethyl-4-(3-amino-5-chlorophenyl)butylammonium chloride starting with N-allyl diethanolamine and 2-ethyl-4-(3-chloro-5-nitrophenyl)butyl chloride;

N,N-Di-n-butyl-N-2-hydroxypropyl-N-2-(3-amino-4-methylphenyl)ethylammonium chloride starting with 3-dibutylamino-2-propanol and 2-(4-methyl-3-nitrophenyl)ethyl chloride;

N-Methyl-N-isobutyl-N-3-hydroxybutyl-N-4-aminobenzylammonium iodide starting with N-3-hydroxybutyl-N-isobutylmethylamine and 4-nitrobenzyl iodide;

N-Methyl-N-tert.-butyl-N-methallyl-N-3-amino-4-methoxybenzylammonium chloride starting with N-methallyl-N-methyl-tert.-butylamine and 4-methoxy-3-nitrobenzyl chloride;

N-(3-Amino-4-methoxybenzyl)-N,N-bis(2-hydroxypropyl)-N-methylammonium chloride starting with N-methyl-diisopropanolamine and 4-methoxy-3-nitrobenzyl chloride;

N-(3-Amino-4-methoxybenzyl)-N,N-dimethylhydrazinium chloride starting with 1,1-dimethylhydrazine and 4-methoxy-3-nitrobenzyl chloride.

E. N-$R^{8'}$-N-[(lower-alkylene)$^1$-$Y^5$-H]-N-$R^{9'}$-N$^{10'}$ quaternary ammonium intermediates (Formula VIII)

1.
N,N-Dimethyl-N-2-(N'-ethylanilino)ethyl-N-2-hydroxyethylammonium chloride

A stirred mixture of 35.6 parts of dimethylaminoethanol in 60 parts of water was heated to 90° and 73.6 parts of N-ethyl-N-(2-chloroethyl)aniline was gradually added. The mixture was heated at 90°–95°. After two and one-half hours there are obtained N,N-dimethyl-N-2-(N'-ethylanilino)ethyl-N-2-hydroxyethylammonium chloride in the form of an aqueous solution.

When the indicated tert. amino compound is quaternized with the indicated halide according to a procedure similar to that of E-1 above, the following N-$R^{8'}$-N-[(lower-alkylene)'-$y^5$-H]-N-$R^{9'}$-N-$R^{10'}$ ammonium halide intermediates are obtained.

N,N,N-Trimethyl-N-2-(N'-ethyl-m-toluidino)ethylammonium chloride from trimethylamine and N-ethyl-N-(2-chloroethyl)-m-toluidine.

N-Methyl-N-2-(N'-2-cyanoethylanilino)ethyl-N,N-bis(2-hydroxyethyl)ammonium chloride from N-methyldiethanolamine and N-(2-cyanoethyl)-N-(2-chloroethyl)aniline.

N,N-Dimethyl-N-2-(N'-ethyl-1-naphthylamino)ethyl-N-2-hydroxypropylammonium chloride from 1-dimethylamino-2-propanol and N-ethyl-N-(2-chloroethyl)-1-naphthylamine.

N,N-Dimethyl-N-2-(N'-methyl-m-chloroanilino)ethyl-N-hexylammonium chloride from 6-dimethylaminohexane and N-methyl-N-(2-chloroethyl)-m-chloroaniline.

N,N-Diethyl-N-2-(N'-ethyl-o-anisidino)ethyl-N-allylammonium chloride from N,N-diethylallylamine and N-ethyl-N-(2-chloroethyl)-o-anisidine.

N-Methyl-N-3-(N'-ethylanilino)-2-hydroxy-1-propyl-N,N-bis(2-hydroxypropyl)ammonium chloride from N-methyldiisopropanolamine and N-ethyl-N-(3-chloro-2-hydroxy-1-propyl)aniline.

N-Methyl-N-isobutyl-N-3-(N'ethyl-1-naphthylamino)-2-hydroxy-1-propyl-N-3-hydroxybutylammonium chloride from N-3-hydroxybutyl-N-isobutylmethylamine and N-ethyl-N-(3-chloro-2-hydroxy-1-propyl)-1-naphthylamine.

PREPARATION OF THE AROMATIC AZO DYESTUFFS

EXAMPLE 1

A. To a solution of 30.8 parts of N,N-dimethyl-N-(3-amino-4-methoxybenzyl)-N-3-formamidopropylammonium chloride in 130 parts of water at 0° C., there was added with stirring, 30 parts of concentrated hydrochloric acid. The amine was then diazotized at a temperature between 0°–5° C. by adding 7.0 parts of solid sodium nitrite in small portions. The reaction mixture was stirred at less then 5° C. for ten minutes. The excess nitrite was then removed by the addition of an aqueous solution of sulfamic acid until nitrite ion could no longer be detected by testing with starch-iodide paper, and the mixture was made slightly alkaline to Congo red test paper by the addition of 20.0 parts of sodium acetate.

In a separate container, 13.4 parts of N,N'-diacetoacet-p-phenylenediamine, was mixed with sufficient 2-ethoxy ethanol to form a paste. The paste was slurried in 300 parts of water at 70° C. and to the slurry there was added with stirring 6.0 parts of a 50 percent aqueous solution of sodium hydroxide. A solution resulted which was then added in a thin stream to the cold diazonium solution. The reaction mixture was stirred for four hours at 20° C. and then the resulting clear yellow solution was evaporated to dryness to obtain chiefly a highly water-soluble yellow dyestuff having the formula

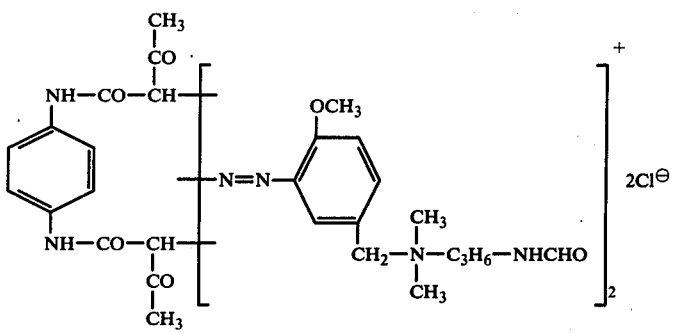

The visible absorption spectrum of an aqueous solution of this dyestuff, containing 0.10 g. of dye per liter of solution, showed a maximum at 399 millimicrons, A = 1.275.

In the bleach test described below, paper dyed with this dyestuff was found to be highly bleachable. The dye was found to bleed slightly in the water-bleed test and in the soap bleed test when tested in accord with the procedures described below.

B. A mixture of 6.0 parts of concentrated hydrochloric acid, 250 parts of water and 35 parts of the above product from A was heated at reflux for three hours. The mixture was cooled to 25° C. and the pH adjusted to 7.0 with aqueous alkali. Thus there was obtained in the form of an aqueous solution a yellow, highly water-soluble dyestuff of the formula

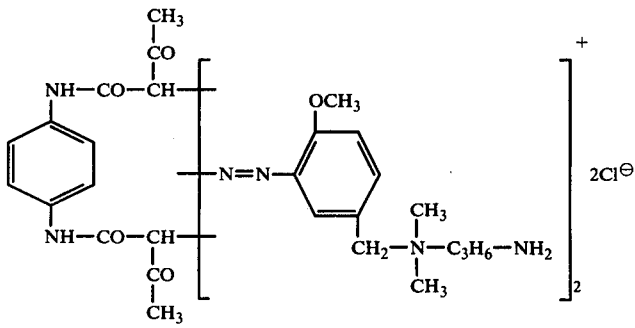

An aqueous solution of this dyestuff, containing 0.06 g. of dye per liter of solution, showed a maximum at 393.5 millimicrons, A = 1.01.

The bleachability properties of this dye were found to be essentially the same as for the formyl-substituted dyestuff of A. However, compared to said formyl-substituted dyestuff, this dyestuff exhibited significantly superior resistance to bleed in both the water bleed and the soap bleed tests.

Testing Procedures

The following test procedures were employed to determine the resistance of the dyestuffs to bleed in moist paper, bleed from paper in the presence of soap, and to bleaching with hypochlorite bleach.

Water "Bleed" Test

This procedure is a modification of the AATCC Standard Test Method 15-1962, "Colorfastness to Perspiration".

Test pieces 1⅛ inch in diameter (approximately one square inch area) are cut from the dyed paper to be tested and marked, with lead pencil, to indicate sample and wire (or felt) side. One or more dyed papers of known dye migration quality are included in the test series as standards.

The absorbent material consists of filter paper having at least one side with smooth finish (Eaton-Dikeman No. 613, or equivalent) cut to 2 inch by 3 inch rectangles. In addition, smooth, flat, glass or clear plastic plates of adequate stiffness, measuring 2½ inches wide and 3 to 4½ inches long, are required as separating plates. A 500 gram weight serves as a dead weight loading.

Two filter paper absorbent pieces are used for each dyed paper test circle, one for each side. These are marked on the smoother surface (with lead pencil) prior to beginning the test to indicate the sample and the sample surface (wire or felt) which it will contact.

The migration test "sandwich" is constructed as follows. A separating plate is placed on a horizontal support and one piece of the filter paper placed centrally on this plate with the smoother side up. The circular dyed paper test piece, held by tweezers, is immersed in water at room temperature for 3 seconds, drained for 3 seconds, and immediately centered on the filter paper, making sure that side (wire or felt) identifications are correct. Immediately, the second piece of filter paper, smoother side downward, is centered on the test circle and followed at once by another separating plate. This "sandwich" is pressed for a moment with the fingers, after which, without delay, a piece of filter paper is positioned on the top separating plate as before to receive a second test circle of wetted dyed paper. The above procedure is then repeated as rapidly as possible and without interruption, stacking one "sandwich" on the other, until all dyed paper test pieces have been put under test.

As soon as a stack is completed a 500 gram weight is centered on the top separating plate, and the assembly shrouded with moisture vapor resistant film to avoid undue drying. The stack is allowed to stand at room temperature for 4 hours, during which time ambient temperatures are occasionally recorded.

At the end of the migration period the stack is disassembled, and each dyed paper test circle and its two filter paper absorbents clipped to a supporting card. A separate card is used for each test circle. The dyed paper test circles and filter papers are air dried at room temperature for at least two hours before ranking. Relative degrees of dye migration, as compared to that from standard samples, are determined by visual ratings, under Macbeth Northlight, of the intensity of dye stain on the filter paper surface which had been in contact with the test circle. Migration from the wire and felt sides are ranked separately.

Soap Bleed Test

This test compares the degree to which dyed papers will discolor a soap solution in which the paper is immersed.

A stock supply of soap solution containing 0.5% soap by weight is prepared by adding neutral white soap flakes (a mixture of 80 percent sodium soap and 20 percent potassium soap produced from 70 percent tallow and 30 percent coconut oil glyceride blend; "Ivory" brand, Proctor and Gamble Co.) slowly with stirring to hot tap water and then heated further with occasional stirring to 70°–75° C.

Portions of 400 ml. of this solution are measured into 1,000 ml. beakers (one beaker for each test), covered with a watch glass, and allowed to cool to 60°–65° C. At this point approximately 1.5 grams of the dyed paper (one half of a 3.0 gram, 8 inch square handsheet) is crumpled and immersed in its soap test solution.

Soaking is allowed to continue for 20 to 24 hours, with gradual cooling to room temperature. During this period the paper is squeezed by hand while submerged (or stirred vigorously with a glass rod) on at least three occasions during the first five hours, and again about one hour before ending the test period.

At the end of the immersion period the beaker contents are stirred and enough immediately screened through a double screen of 100 mesh stainless steel screening to nearly fill a two ounce, square clear glass bottle, which is then capped. These filtrates ae then visually rated for color intensity under laboratory ceiling fluorescent tube lights.

Bleach Test

This procedure compares the degree to which the color of dyed or shaded papers would be discharged in a waste paper recovery operation employing hypochlorite bleach.

Test pieces measuring ¾ inch by 1½ inch are die cut from the papers to be compared and identified, using lead pencil markings.

A stock supply of hypochlorite bleach is prepared by diluting commercial hypochlorite bleach (nominal available chlorine content, 5.0%) with distilled water to a concentration of 0.09 grams available chlorine per 100 ml. solution. Before diluting this solution to final volume the pH is adjusted with dilute sulfuric acid to pH 4.0 to 4.5.

Portions of 20 ml. each of the hypochlorite stock solution, at room temperature, are measured into test tubes 1 inch in diameter and 7 to 8 inches long, one tube for each test specimen. An extra such tube is prepared, fitted with a thermometer extending into the bleach solution, to follow the rise in bleach temperature.

One paper test piece is then dropped into each tube and submerged in the bleach liquor, adding all pieces as quickly as possible. The tubes are immediately stoppered and all simultaneously placed in a water bath previously heated to 54° to 56° C. (129° to 133° F.).

The test pieces are observed, especially during the very early minutes of bleaching, for obvious differences in the rate of color discharge. The temperature of the bleach liquors rises rapidly during the first 5 minutes.

While maintaining the water bath temperature in the 54° to 56° C. range, the bleach tubes remain, without agitation of the test pieces, in the water bath for 30 minutes. Occasional readings of the temperature of the "blank" bleach tube during this period are recorded.

At the end of this time all tubes are removed from the water bath, immediately filled with cold tap water, and the test pieces rinsed as quickly as possible, with cold tap water, into a large Buchner funnel (with no filter paper disk) where they are thoroughly washed with running cold tap water. The washed test pieces ae finally placed on a blotter and air dried at room temperature.

The relative degree of bleaching is judged by visually ranking, under Macbeth Northlight, the intensity of residual color in the dry test pieces.

EXAMPLE 2

Following the procedure described above in Example 1, 16.7 parts of N-methyl-N-(3-amino-4-methoxybenzyl)-N,N-bis(3-formamidopropyl)ammonium chloride in a solution of 135 parts of water and 19 parts of concentrated hydrochloric acid was diazotized with 3.5 parts of sodium nitrite at 0° C. In a separate container, 9.1 parts of 4,4'-bi-o-acetoacetotoluidide (Naphthol AS-G) was mixed with sufficient 2-ethoxyethanol to form a paste. The paste was slurried in 150 parts of water at 70° C. and to the slurry there was added with stirring 6 parts of a 50 percent aqueous solution of sodium hydroxide. A solution resulted which was then added in a thin stream to the cold diazonium solution. The reaction mixture was allowed to warm to 30° C. and was then stirred for one hour after which it was heated to 60° C. for one hour. The reaction mixture, now a solution, was used directly for hydrolysis which was accomplished by the addition of 11.9 parts of concentrated hydrochloric acid followed by heating at reflux for three hours. The reaction mixture was then cooled and neutralized with 50 percent aqueous sodium hydroxide. There was thus obtained an aqueous solution of a bright yellow, water-soluble dyestuff having the formula

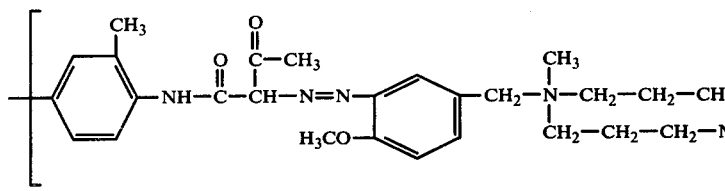

The visible absorption spectrum of an aqueous solution of this dyestuff containing 0.375 g. of dye per liter of solution had a maximum at 390 millimicrons, A = 1.236.

Paper dyed with this dyestuff in the bleach test hereinbefore described, was found to be readily bleachable. The dye was found to bleed slightly in the soap bleed and to about the same extent in the water bleed test.

EXAMPLE 3

A solution of 7.5 parts of N,N-dimethyl-N-(3-amino-4-methoxybenzyl)-N-3-formamidopropylammonium chloride in 40 parts of water containing 10 parts of concentrated hydrochloric acid was heated at refux for two hours. To the solution which was chilled in an ice bath, there was then added an additional 1.2 parts of concentrated hydrochloric acid followed by the gradual addition of 1.75 parts of sodium nitrite. After stirring for ten minutes, excess nitrite was removed by the addition of an aqueous solution of sulfamic acid, and the solution was made neutral to Congo Red by the addition of sodium acetate. In a separate container there was prepared a coupler solution consisting of 6.4 parts of 2'-chloro-4'-nitroacetoacetanilide dissolved in a mixture of 6.3 parts of isopropyl alcohol, 0.8 parts of sodium hydroxide and 81 parts of hot water. The coupler solution was added in a thin stream to the cold, stirred diazonium solution. Stirring was continued for two hours while allowing the mixture to warm to 25° C. The mixture was then heated at 50° C. for thirty minutes and then stirred for fifteen hours at 25° C. The pH was adjusted to 6.0 by the addition of 50 percent aqueous solution of sodium hydroxide and the reaction mixture then poured into 785 parts of stirred isopropyl alcohol. After stirring the mixture for two hours, the separated yellow solid was collected, washed with fresh isopropyl alcohol, and dried in vacuo to obtain the yellow, water-soluble dyestuff of the formula

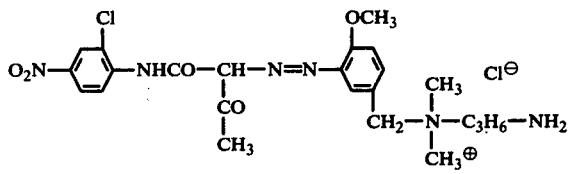

The visible absorption spectrum of an aqueous solution of this dyestuff, containing 0.02 g. of dye per liter of solution, showed a maximum at 400 millimicrons, A = 0.975.

EXAMPLE 4

Proceeding in a manner similar to that described above in Example 1, part A, for diazotizing N,N-dimethyl-N-(3-amino-4-methoxybenzyl)-N-3-formamidopropylammonium chloride and coupling with 2-naphthol, there was obtained the bright red dyestuff having the formula

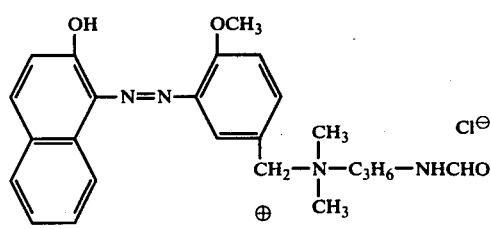

The visible absorption spectrum of an aqueous solution of this dyestuff, containing 0.03 g. of dye per liter of solution, showed a maximum at 494 millimicrons, A = 1.192.

Hydrolysis of the formamido moiety in the above-shown product according to the procedure described in Example 1, part B, yielded the corresponding —NH$_2$ substituted compound, a red, water-soluble dyestuff. An aqueous solution of this dyestuff, containing 0.04 g. of dye per liter of solution, showed a maximum at 497 millimicrons, A = 0.995.

EXAMPLE 5

Proceeding in a manner similar to that described above in Example 3, N,N-dimethyl-N-(3-amino-4-methoxybenzyl)-N-3-formamidopropylammonium chloride was hydrolyzed and the resulting N,N-dimethyl-N-(3-amino-4-methoxybenzyl)-N-3-aminopropylammonium chloride was diazotized and coupled with 3-(benzoxazol-2-yl)-2-naphthol to obtain the red-brown, water-soluble dyestuff having the formula

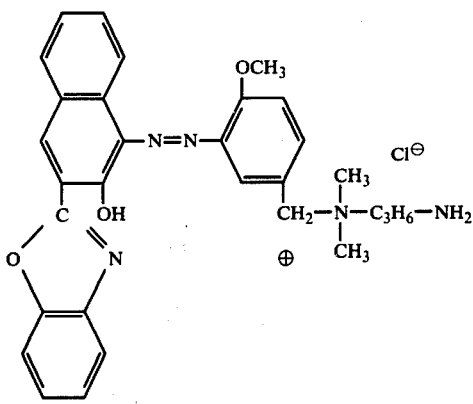

The visible absorption spectrum of an aqueous solution of this dyestuff, containing 0.16 g. of dye per liter of solution, showed two maxima: at 520 millimicrons, A = 0.96; and at 546 millimicrons, A = 0.94.

In the bleach test described above, paper dyed with this dyestuff was found to be highly bleachable. The dye was found to bleed slightly and to approximately the same extent each in the water bleed test and the soap bleed test.

EXAMPLE 6

Proceeding in a manner similar to that described above in Example 3, N,N-dimethyl-N-(3-amino-4-methoxybenzyl)-N-3-formamidopropylammonium chloride was hydrolyzed and the resulting N,N-dimethyl-N-(3-amino-4-methoxybenzyl)-N-3-aminopropylammonium chloride was diazotized and coupled with 3-(benzimidazol-2-yl)-2-naphthol to obtain the red, water-soluble dyestuff having the formula

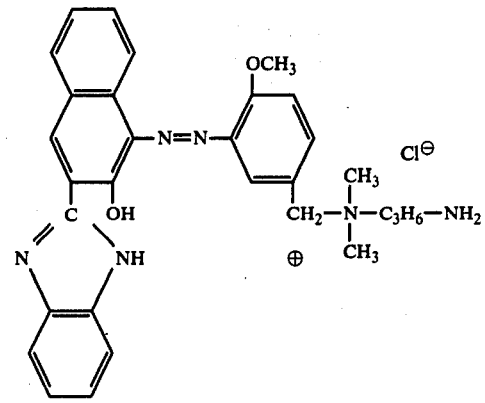

The visible absorption spectrum of an aqueous solution of this dyestuff, containing 0.75 g. of dye per liter of solution, showed a maximum at 520 millimicrons, A = 1.138.

EXAMPLE 7

Proceeding in a manner similar to that described above in Example 2, N,N-dimethyl-N-(3-amino-4-methoxybenzyl)-N-3-formamidopropylammonium chloride was diazotized and coupled with 4'-chloro-2',5'-dimethyoxyacetoacetanilide (Naphthol AS-I3GH) and the product hydrolyzed to obtain the yellow water-soluble dyestuff having the formula

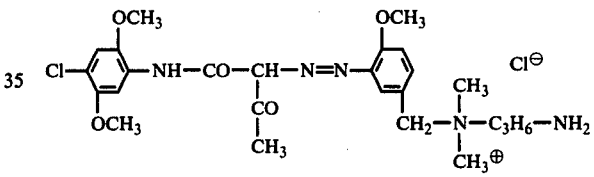

An aqueous solution of this dyestuff, containing 0.10 g. of dye per liter of solution, showed a maximum at 395 millimicrons, A = 1.082.

This dyestuff was found to bleed slightly in the soap bleed test and the water bleed test.

EXAMPLE 8

When a procedure similar to that described in Example 1, part A, is followed for diazotization of 1-[2-(3-amino-4-methylphenyl)ethyl]-1-(2-formamidoethyl)-4-formylpiperazinium chloride and coupling with 2'-nitro-4'-butoxyacetoacetanilide, there is obtained the dyestuff having the formula

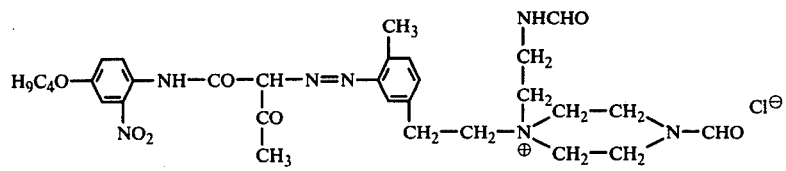

Hydrolysis of the N-formyl moieties in the above-shown product according to the procedure described in Example 1, part B, yields the corresponding N-(2-aminoethyl)piperazinium compound.

EXAMPLE 9

Proceeding in a manner similar to that described above in Example 1, part A, for diazotizing N,N-dimethyl-N-(3-amino-4-methoxybenzyl)-N-3-formamidopropylammonium chloride and coupling with 4,4'-bi-o-acetoacetotoluidide (Naphthol AS-G) there was obtained the yellow dyestuff having the formula

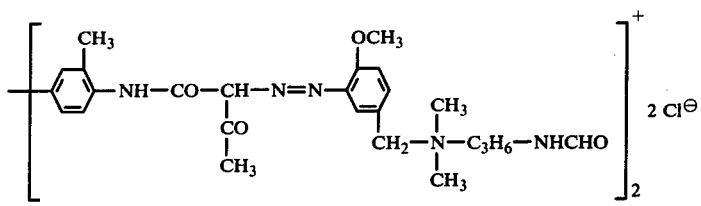

The visible absorption spectrum of an aqueous solution of this dyestuff, containing 0.03 g. of dye per liter of solution, showed a maximum at 399 millimicrons, A = 1.175.

Hydrolysis of the formamido moieties in the above-shown product according to the procedure described in Example 1, part B, yielded the corresponding di-(—NH₂) substituted compound, an orange, highly water-soluble dyestuff. An aqueous solution of this dyestuff, containing 1.0 g. of dye per liter of solution, showed a maximum at 392 millimicrons, A = 1.32.

This dyestuff was found to bleed slightly in the water bleed test and somewhat less in the soap bleed test.

EXAMPLE 10

Proceeding in a manner similar to that described above in Example 1, part A, for diazotizing N,N-dimethyl-N-(3-amino-4-methoxybenzyl)-N-3-formamidopropylammonium chloride and coupling with 4,4'-bi-o-acetoacetanisidide, there was obtained the yellow dyestuff having the formula

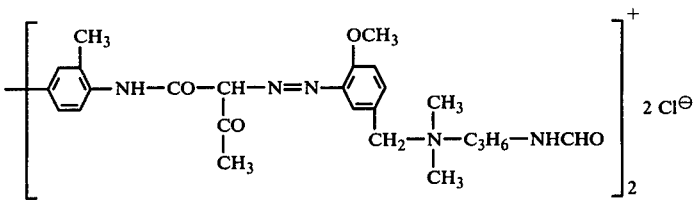

The visible absorption spectrum of an aqueous solution of this dyestuff, containing 0.03 g. of dye per liter of solution, showed a maximum at 406 millimicrons, A = 1.2224.

Hydrolysis of the formamido moieties in the above-shown product according to the procedure described in Example 1, part B, yielded the corresponding di-(—NH₂) substituted compound, an orange, highly water-soluble dyestuff. An aqueous solution of this dyestuff, containing 0.04 g. of dye per liter of solution, showed a maximum at 386 millimicrons, A = 0.92.

In the bleach test described above, paper dyed with this dyestuff was found to be highly bleachable. The dye was found to bleed slightly in the soap bleed test but substantially less in the water bleed test.

EXAMPLE 11

When a procedure similar to that described above in Example 1, part A, is followed for diazotization of N,N-dimethyl-N-2-(3-amino-4-methylphenyl)ethyl-N-3-formamidopropylammonium chloride and coupling with 2',2'''-diethoxy-4',4'''-biacetoacetanilide, there is obtained the dyestuff having the formula

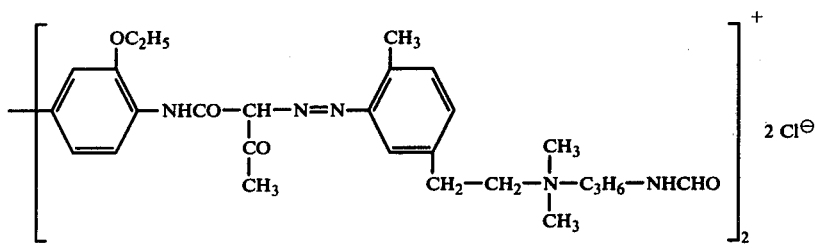

Hydrolysis of the formamido moieties in the above-shown product according to the procedure described in Example 1, part B, yields the corresponding di(—NH₂) substituted compound.

EXAMPLE 12

When a procedure similar to that described above in Example 1, part A, is followed for diazotization of N,N-diallyl-N-1-methyl-3-(4-amino-3-bromophenyl)propyl-N-2-phenylpropionamidoethylammonium chloride and coupling with 2',2'''-dichloro-4',4'''-biacetoacetanilide, there is obtained the dyestuff having the formula

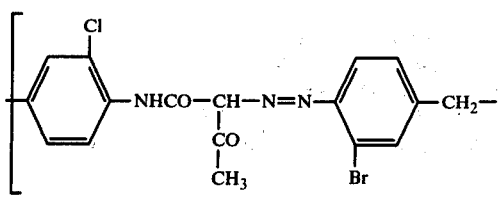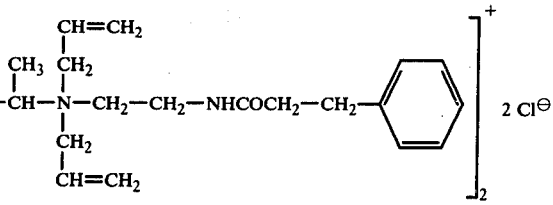

Hydrolysis of the phenylpropionamido moieties in the above-shown product according to the procedure described in Example 1, part B, yields the corresponding di(—$NH_2$) substituted compound.

EXAMPLE 13

Proceeding in a manner similar to that described above in Example 1, part A, for diazotizing N,N-dimethyl-N-(3-amino-4-methoxybenzyl)-N-3-formamidopropylammonium chloride and coupling with 3-hydroxy-2-naphthanilide (Naphthol AS), there was obtained the orange-red dyestuff having the formula

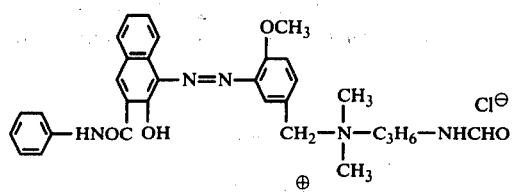

The visible absorption spectrum of an aqueous solution of this dyestuff, containing 0.04 g. of dye per liter of solution, showed a maximum at 514 millimicrons, A = 0.838.

Hydrolysis of the formamido moiety in the above-shown product according to the procedure described in Example 1, part B, yielded the corresponding —$NH_2$ substituted compound, a red, water-soluble dyestuff. An aqueous solution of this dyestuff, containing 0.06 g. of dye per liter of solution, showed a maximum at 514 millimicrons, A = 1.223.

EXAMPLE 14

Proceeding in a manner similar to that described above in Example 1, part A, for diazotizing N,N-dimethyl-N-(3-amino-4-methoxybenzyl)-N-3-formamidopropylammonium chloride and coupling with 3-hydroxy-2-naphtho-o-toluidide (Naphthol AS-D), there was obtained the dark red dyestuff having the formula

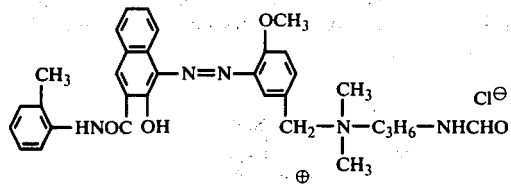

The visible absorption spectrum of an aqueous solution of this dyestuff, containing 0.06 g. of dye per liter of solution, showed a maximum at 518 millimicrons, A = 1.285.

Hydrolysis of the formamido moiety in the above-shown product according to the procedure described in Example 1, part B, yielded the corresponding —$NH_2$ substituted compound, a red, water-soluble dyestuff. An aqueous solution of this dyestuff, containing 0.10 g. of dye per liter of solution, showed a maximum of 520 millimicrons, A = 0.995.

EXAMPLE 15

Proceeding in a manner similar to that described above in Example 1, part A, for diazotizing N,N-dimethyl-N-(3-amino-4-methoxybenzyl)-N-3-formamidopropylammonium chloride and coupling with 3-hydroxy-2-naphth-p-anisidide (Naphthol AS-RL), there was obtained the red, water-soluble dyestuff having the formula

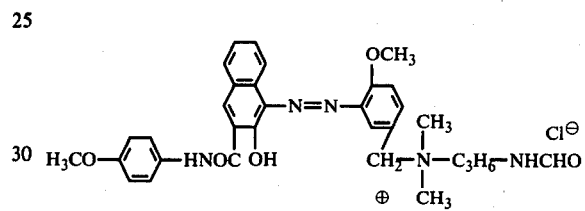

The visible absorption spectrum of an aqueous solution of this dyestuff, containing 0.06 g. of dye per liter of solution, showed a maximum at 515 millimicrons, A = 1.14.

Hydrolysis of the formamido moiety in the above-shown product according to the procedure described in Example 1, part B, yielded the corresponding —$NH_2$ substituted compound, a red, water-soluble dyestuff. An aqueous solution of this dyestuff, containing 0.05 g. of dye per liter of solution, showed a maximum at 517 millimicrons, A = 0.90.

EXAMPLE 16

Proceeding in a manner similar to that described above in Example 1, part A, for diazotizing N,N-dimethyl-N-(3-amino-4-methoxybenzyl)-N-3-formamidopropylammonium chloride and coupling with 3-hydroxy-2-naphth-o-anisidide (Naphthol AS-OL), there was obtained the dark red, water-soluble dyestuff having the formula

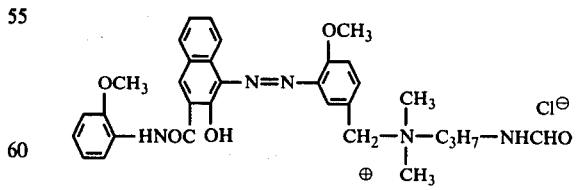

The visible absorption spectrum of an aqueous solution of this dyestuff, containing 0.04 g. of dye per liter of solution, showed a maximum at 514 millimicrons, A = 0.995.

Hydrolysis of the formamido moiety in the above-shown product according to the procedure described in Example 1, part B, yielded the corresponding —NH$_2$ substituted compound, a red, water-soluble dyestuff. An aqueous solution of this dyestuff, containing 0.04 g. of dye per liter of solution, showed a maximum at 517 millimicrons, A = 0.895.

EXAMPLE 17

Proceeding in a manner similar to that described above in Example 1, part A, for diazotizing N,N-dimethyl-N-(3-amino-4-methoxybenzyl)-N-3-formamidopropylammonium chloride and coupling with 3-hydroxy-2-naphtho-o-phenetidide (Naphthol AS-PH), there was obtained the red, water-soluble dyestuff having the formula

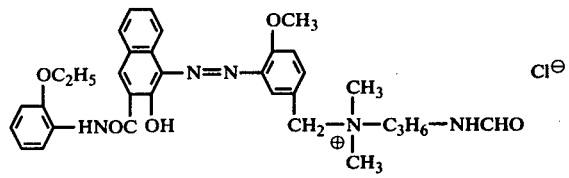

The visible absorption spectrum of an aqueous solution of this dyestuff, containing 0.05 g. of dye per liter of solution, showed a maximum at 512.5 millimicrons, A = 1.1.

EXAMPLE 18

Proceeding in a manner similar to that described above in Example 3, N,N-dimethyl-N-(3-amino-4-methxoybenzyl)-N-3-formamidopropylammonium chloride was hydrolyzed and the resulting N,N-dimethyl-N-(3-amino-4-methoxybenzyl)-N-3-aminopropylammonium chloride was diazotized and coupled with 3-hydroxy-2-naphtho-2,4-xylidide (Naphthol AS-MX), to obtain the red, water-soluble dyestuff having the formula

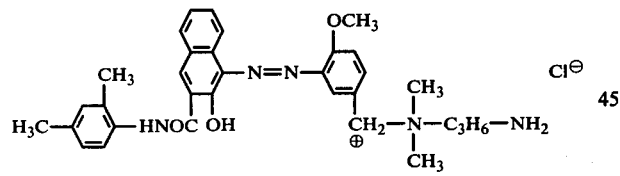

The visible absorption spectrum of an aqueous solution of this dyestuff, containing 0.06 g. of dye per liter of solution, showed two maxima: at 518 millimicrons, A = 1.03; and at 545 millimicrons, A = 1.02.

In the bleach test described above, paper dyed with this dyestuff was found to be readily bleachable. The dye was found to bleed slightly in the water bleed test with substantially less bleeding in the soap bleed test.

EXAMPLE 19

Proceeding in a manner similar to that described above in Example 3, N,N-dimethyl-N-(3-amino-4-methoxybenzyl)-N-3-formamidopropylammonium chloride was hydrolyzed and the resulting N,N-dimethyl-N-(3-amino-4-methoxybenzyl)-N-3-aminopropylammonium chloride was diazotized and coupled with 5'-chloro-3-hydroxy-2'-methyl-2-naphthanilide (Naphthol AS-KB), to obtain the red, water-soluble dyestuff having the formula

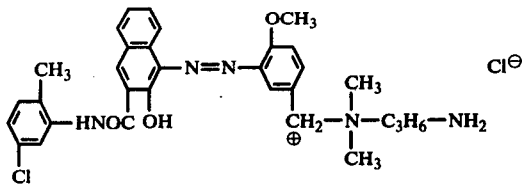

The visible absorption spectrum of an aqueous solution of this dyestuff, containing 0.05 g. of dye per liter of solution, showed two maxima: at 521 millimicrons, A = 1.283; and at 548 millimicrons, A = 1.32.

EXAMPLE 20

Proceeding in a manner similar to that described above in Example 3, N,N-dimethyl-N-(3-amino-4-methoxybenzyl)-N-3-formamidopropylammonium chloride was hydrolyzed and the resulting N,N-dimethyl-N-(3-amino-4-methoxybenzyl)-N-3-aminopropylammonium chloride was diazotized and coupled with 3-hydroxy-3'-nitro-2-naphthanilide (Naphthol AS-BS), to obtain the red, water-soluble dyestuff having the formula

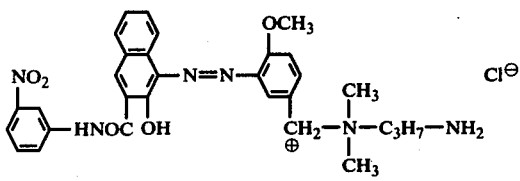

The visible absorption spectrum of an aqueous solution of this dyestuff, containing 0.06 g. of dye per liter of solution, showed two maxima: at 521 millimicrons, A = 1.385; and at 545 millimicrons, A = 1.39.

In the bleach test described above, paper dyed with this dyestuff was found to be readily bleachable. The dye was found to bleed slightly and to approximately the same extent each in the water bleed test and the soap bleed test.

EXAMPLE 21

Proceeding in a manner similar to that described above in Example 3, N,N-dimethyl-N-(3-amino-4-methoxybenzyl)-N-3-formamidopropylammonium chloride was hydrolyzed and the resulting N,N-dimethyl-N-(3-amino-4-methoxybenzyl)-N-3-aminopropylammonium chloride was diazotized and coupled with 3-hydroxy-2',5'-dimethoxy-2-naphthanilide (Naphthol AS-BG), to obtain the red, water-soluble dyestuff having the formula

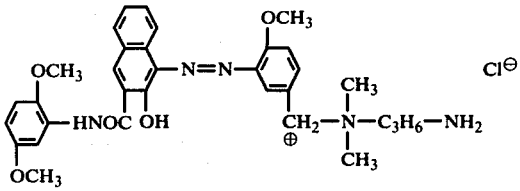

The visible absorption spectrum of an aqueous solution of this dyestuff, containing 0.04 g. of dye per liter of solution, showed two maxima: at 517.5 millimicrons, A = 1.25; and at 543 millimicrons, A = 1.23.

In the bleach test described above, paper dyed with this dyestuff was found to be readily bleachable. The dye was found to bleed slightly and to approximately the same extent each in the water bleed test and the soap bleed test.

EXAMPLE 22

Proceeding in a manner similar to that described above in Example 3, N,N-dimethyl-N-(3-amino-4-methoxybenzyl)-N-3-formamidopropylammonium chloride was hydrolyzed and the resulting N,N-dimethyl-N-(3-amino-4-methoxybenzyl)-N-3-aminopropylammonium chloride was diazotized and coupled with 5'-chloro-3-hydroxy-2'-methoxy-2-naphthanilide (Naphthol AS-EL) to obtain the red, water-soluble dyestuff having the formula

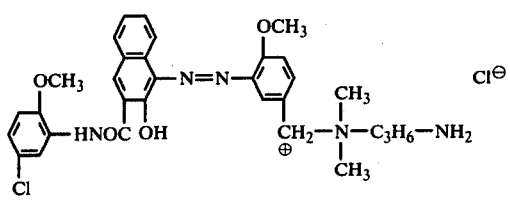

The visible absorption spectrum of an aqueous solution of this dyestuff, containing 0.06 g. of dye per liter of solution, showed two maxima: at 518 millimicrons, A = 1.07; and at 545 millimicrons, A = 1.08.

In the bleach test described above, paper dyed with this dyestuff was found to be readily bleachable. The dye was found to bleed slightly in the soap bleed test but significantly less in the water bleed test.

EXAMPLE 23

Proceeding in a manner similar to that described above in Example 3, N,N-dimethyl-N-(3-amino-4-methoxybenzyl)-N-3-formamidopropylammonium chloride was hydrolyzed and the resulting N,N-dimethyl-N-(3-amino-4-methoxybenzyl)-N-3-aminopropylammonium chloride was diazotized and coupled with 5'-chloro-3-hydroxy-2',4'-dimethoxy-2-naphthanilide (Naphthol AS-ITR), to obtain the red, water-soluble dyestuff having the formula

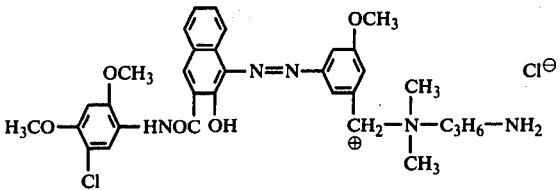

The visible absorption spectrum of an aqueous solution of this dyestuff, containing 0.05 g. of dye per liter of solution, showed two maxima: at 519 millimicrons, A = 0.885; and at 545 millimicrons, A = 0.86.

EXAMPLE 24

Proceeding in a manner similar to that described above in Example 3, N,N-dimethyl-N-(3-amino-4-methoxybenzyl)-N-3-formamidopropylammonium chloride was hydrolyzed and the resulting N,N-dimethyl-N-(3-amino-4-methoxybenzyl)-N-3-aminopropylammonium chloride was diazotized and coupled with 3-hydroxy-N-1-naphthyl-2-naphthamide (Naphthol AS-BO), to obtain the red, water-soluble dyestuff having the formula

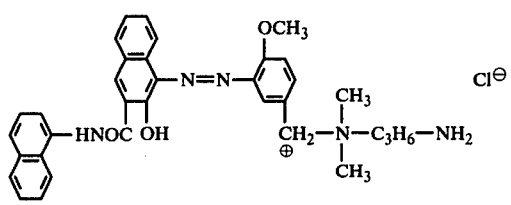

The visible absorption spectrum of an aqueous solution of this dyestuff, containing 0.08 g. of dye per liter of solution, showed two maxima: at 521 millimicrons, A = 1.478; and at 547 millimicrons, A = 1.434.

In the bleach test described above, paper dyed with this dyestuff was found to be readily bleachable. The dye was found to bleed slightly in the soap bleed test but significantly less in the water bleed test.

EXAMPLE 25

Proceeding in a manner similar to that described above in Example 2, N,N-dimethyl-N-(3-amino-4-methoxybenzyl)-N-3-formamidopropylammonium chloride was diazotized and coupled with N,N'-p-phenylenebis(3-hydroxy-2-naphthamide) and the product hydrolyzed to obtain the maroon, water-soluble dyestuff having the formula

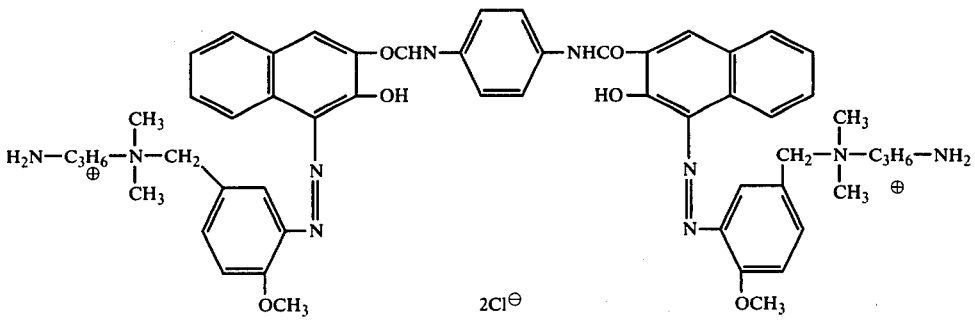

EXAMPLE 26

Proceeding in a manner similar to that described above in Example 2, N-methyl-N-(3-amino-4-methoxybenzyl)-N,N-bis(3-formamidopropyl)ammonium chloride was diazotized and coupled with 2-naphthol, and the product hydrolyzed to obtain the red, water-soluble dyestuff having the formula

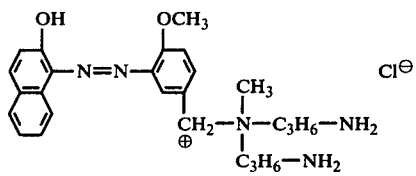

An aqueous solution of this dyestuff, containing 0.04 g. of dye per liter of solution, showed a maximum at 500 millimicrons, A = 0.912.

EXAMPLE 27

Proceeding in a manner similar to that described above in Example 3, N-methyl-N-(3-amino-4-methoxybenzyl)-N,N-bis(3-formamidopropyl)ammonium chloride was hydrolyzed and the resulting N-methyl-N-(3-amino-4-methoxybenzyl)-N,N-bis(3-aminopropyl)ammonium chloride was diazotized and coupled with 3-(benzimidazol-2-yl)-2-naphthol, to obtain the red, water-soluble dyestuff having the formula

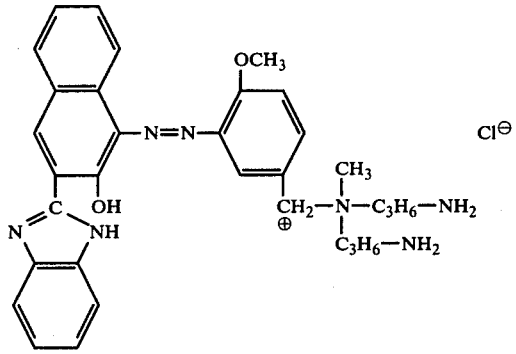

The visible absorption spectrum of an aqueous solution of this dyestuff, containing 1.0 g. of dye per liter of solution, showed a maximum at 526 millimicrons, A = 1.05.

EXAMPLE 28

Proceeding in a manner similar to that described aove in Example 2, N-methyl-N-(3-amino-4-methoxybenzyl)-N,N-bis(3-formamidopropyl)ammonium chloride was diazotized and coupled with 4'-chloro-2',5'-dimethoxyacetoacetanilide (Naphthol AS-I3GH), and the product hydrolyzed to obtain the yellow, water-soluble dyestuff having the formula

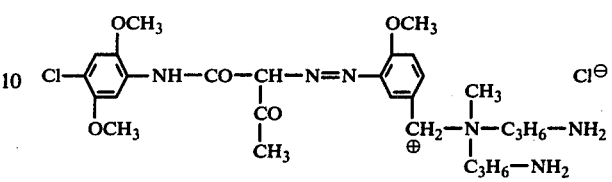

An aqueous solution of this dyestuff, containing 0.25 g. of dye per liter of solution, showed a maximum at 395.3 millimicrons, A = 0.954.

In the bleach test described above, paper dyed with this dyestuff was found to be readily bleachable. The dye was found to bleed slightly and to approximately the same extent each in the water bleed test and the soap bleed test.

EXAMPLE 29

Proceeding in a manner similar to that described above in Example 2, N-methyl-N-(3-amino-4-methoxybenzyl)-N,N-bis(3-formamidopropyl)ammonium chloride was diazotized and coupled with N,N'-diacetoacet-p-phenylenediamine and the product hydrolyzed to obtain the yellow, water-soluble dyestuff having the formula

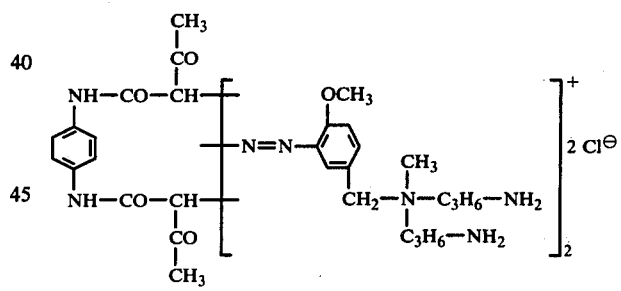

An aqueous solution of this dyestuff, containing 0.2 g. of dye per liter of solution, showed a maximum at 394 millimicrons, A = 0.9.

In the bleach test described above, paper dyed with this dyestuff was found to be highly bleachable. The dye was found to bleed slightly in the water bleed test with substantially less bleeding in the soap bleed test.

EXAMPLE 30

Proceeding in a manner similar to that described above in Example 1, part A, for diazotizing N-methyl-N-(3-amino-4-methoxybenzyl)-N,N-bis(3-formamidopropyl)ammonium chloride and coupling with 4',4'''-bio-acetoacetanisidide, there was obtained the orange, water-soluble dyestuff having the formula

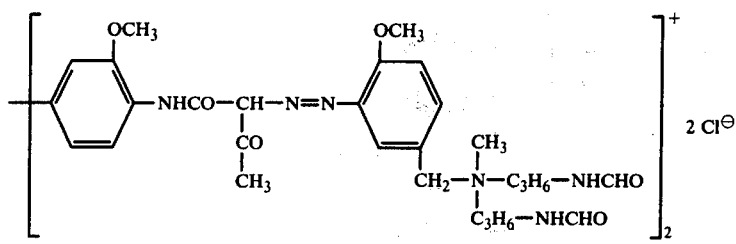

The visible absorption spectrum of an aqueous solution of this dyestuff, containing 0.03 g. of dye per liter of solution, showed a maximum at 412 millimicrons, A = 1.255.

Hydrolysis of the four formamido moieties in the above-shown product according to the procedure described in Example 1, part B, yielded the corresponding tetra(—$NH_2$) substituted compound, a yellow, highly water-soluble dyestuff. An aqueous solution of this dyestuff, containing 0.75 g. of dye per liter of solution, showed a maximum at 400 millimicrons, A = 0.975.

In the bleach test described above, paper dyed with this dyestuff was found to be readily bleachable. The dye was found to bleed slightly in the soap bleed test with substantially less bleeding in the water bleed test.

EXAMPLE 31

Proceeding in a manner similar to that described above in Example 2, N-methyl-N-(3-amino-4-methoxybenzyl)-N,N-bis(3-formamidopropyl)ammonium chloride was diazotized and coupled with 3-hydroxy-2-naphth-o-anisidide (Naphthol AS-OL), and the product hydrolyzed to obtain the red, water-soluble dyestuff having the formula

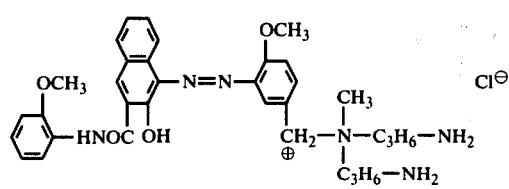

An aqueous solution of this dyestuff, containing 0.4 g. of dye per liter of solution, showed a maximum at 517 millimicrons, A = 0.997.

EXAMPLE 32

Proceeding in a manner similar to that described above in Example 2, N-methyl-N-(3-amino-4methoxybenzyl)-N,N-bis(3-formamidopropyl)ammonium chloride was diazotized and coupled with N,N'-p-phenylenebis(3-hydroxy-2-naphthamide), and the product hydrolyzed to obtain the dyestuff having the formula

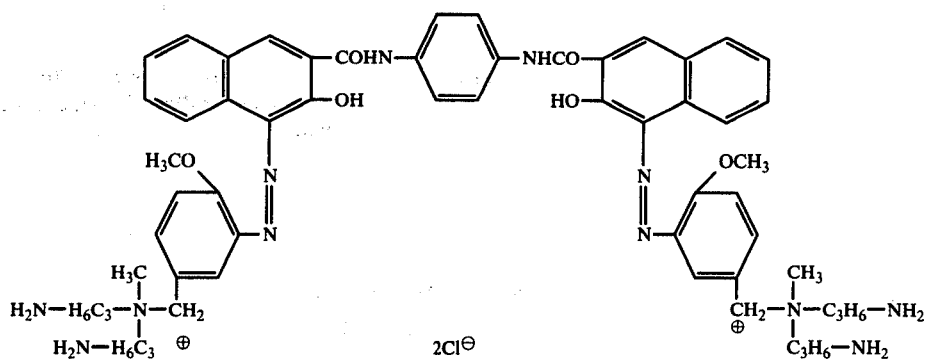

An aqueous solution of this dyestuff, containing 0.06 g. of dye per liter of solution, showed a maximum at 517 millimicrons, A = 0.78.

EXAMPLE 33

Proceeding in a manner similar to that described above in Example 3, N,N-dimethyl-N-(3-amino-4-methoxybenzyl)-N-3-formamidopropylammonium chloride was hydrolyzed and the resulting N,N-dimethyl-N-(3-amino-4-methoxybenzyl)-N-3-aminopropylammonium chloride was diazotized and coupled with N,N'-ethylenebis(3-hydroxy-2-naphthamide) to obtain the red-brown water-soluble dyestuff having the formula

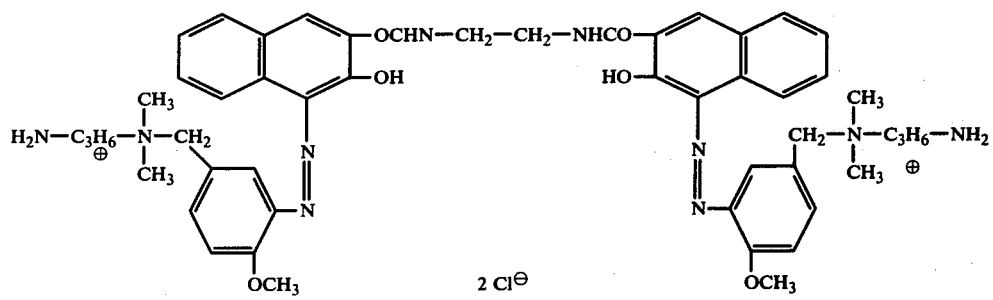

An aqueous solution of this dyestuff, containing 0.04 g. of dye per liter of solution, showed a maximum at 511 millimicrons, A = 1.025.

EXAMPLE 34

Proceeding in a manner similar to that described above in Example 3, N-(3-amino-4-methoxybenzyl)-N,N,N-trimethylammonium chloride was diazotized and coupled with 4,4'-bi-o-acetoacetotoluidide (Naphthol AS-G) to obtain the orange, water-soluble dyestuff having the formula

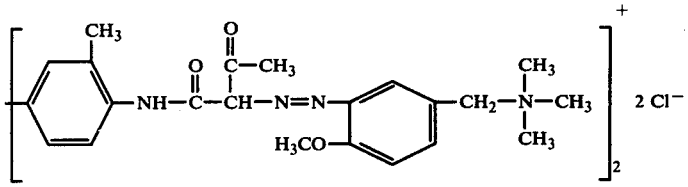

An aqueous solution of this dyestuff, containing 0.02 g. of dye per liter of solution, showed a maximum at 402 millimicrons, A = 0.990.

EXAMPLE 35

Proceeding in a manner similar to that described above in Example 3, N-(3-amino-4-methoxybenzyl)-N-(2-hydroxypropyl)-N,N-dimethylammonium chloride was diazotized and coupled with 4,4'-bi-o-acetoacetotoluidide (Naphthol AS-G) to obtain the yellow, water-soluble dyestuff having the formula

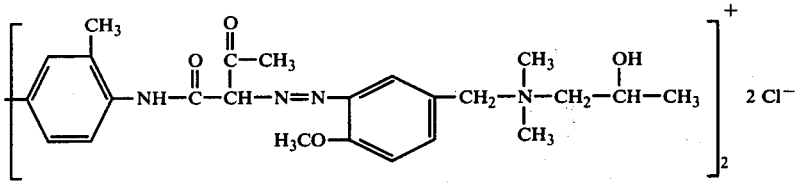

An aqueous solution of this dyestuff, containing 0.02 g. of dye per liter of solution, showed a maximum at 402 millimicrons, A = 1.095.

EXAMPLE 36

Proceeding in a manner similar to that described above in Example 3, N-(3-amino-4-methoxybenzyl)-N,N-bis(2-hydroxyethyl)-N-methylammonium chloride was diazotized and coupled with 4,4'-bi-o-acetoacetotoluidide (Naphthol AS-G) to obtain the yellow, water-soluble dyestuff having the formula

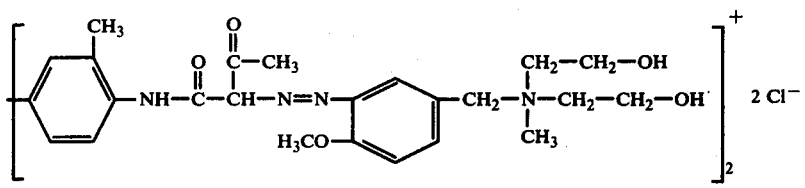

An aqueous solution of this dyestuff, containing 0.02 g. of dye per liter of solution, showed a maximum at 402 millimicrons, A = 0.9.

EXAMPLE 37

Proceeding in a manner similar to that described above in Example 3, N-(3-amino-4-methoxybenzyl)-N,N,N-trimethylammonium chloride was diazotized and coupled with 3-hydroxy-3'-nitro-2-naphthanilide (Naphthol AS-BS) to obtain the red, water-soluble dyestuff having the formula

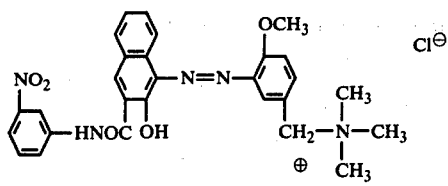

EXAMPLE 39

When a procedure similar to that described in Example 1, part A, is followed for diazotization of N-methyl-N-allyl-N-6-n-hydroxyhexyl-N-4-amino-3-florobenzylammonium chloride and coupling with 3',3'''-dibutoxy-4',4'''-biacetoacetanilide, there is obtained the dyestuff having the formula

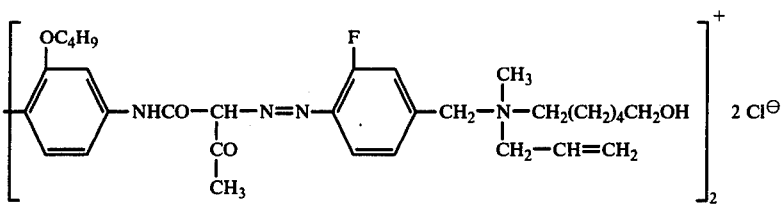

An aqueous solution of this dyestuff, containing 0.04 g. of dye per liter of solution showed two maxima: at 517 millimicrons, A = 1.18; at 540 millimicrons, A = 1.17.

EXAMPLE 38

Proceeding in a manner similar to that described above in Example 3, N-(3-amino-4-methoxybenzyl)-N-(2-hydroxyethyl)-N,N-dimethylammonium chloride was diazotized and coupled with 3-hydroxy-2-naphtho-anisidide (Naphthol AS-OL) to obtain the red, water-soluble dyestuff having the formula

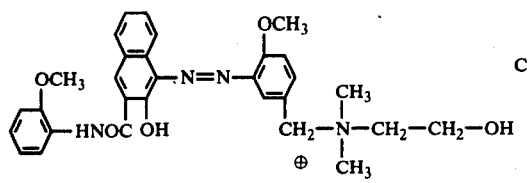

An aqueous solution of this dyestuff, containing 0.2 g. of dye per liter of solution, showed two maxima: at 515 millimicrons, A = 1.545; at 543 millimicrons, A = 1.51.

EXAMPLE 40

When a procedure similar to that described in Example 2, is followed for diazotization of N,N-di-n-propyl-N-(3-amino-4-methoxybenzyl)-N-1-methyl-2-(p-nitrobenzamido)ethylammonium chloride and coupling with o-bromo-N,N'-diacetoacet-p-phenylenediamine, there is obtained the dyestuff having the formula

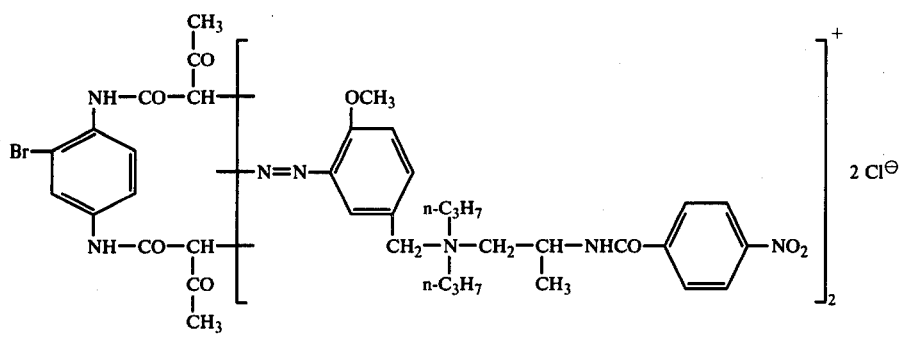

Hydrolysis of the p-nitrobenzamido moieties in the above-shown product according to the procedure described in Example 1, part B, yields the corresponding di(—NH$_2$) substituted compound.

EXAMPLE 41

Proceeding in a manner similar to that described above in Example 3, N-(3-amino-4-methoxybenzyl)-N,N-dimethylhydrazinium chloride was diazotized and coupled with 4,4'-bi-o-acetotoluidide (Naphthol AS-G) to obtain the orange, water-soluble dyestuff having the formula

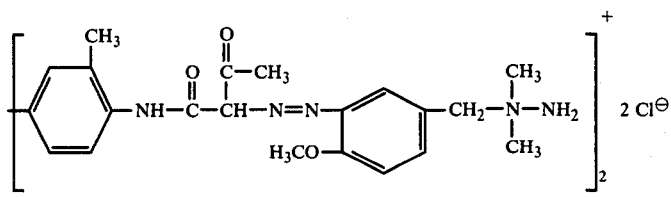

The visible absorption spectrum of an aqueous solution of this dyestuff, containing 0.125 g. of dye per liter of solution, showed a maximum at 399 millimicrons, A = 0.624.

EXAMPLE 42

Proceeding in a manner similar to that described above in Example 3, N,N-dimethyl-N-(3-amino-4-methoxybenzyl)-N-3-(2-hydroxyethylamino)propylammonium chloride was diazotized and coupled with 4,4'-bi-o-acetotoluidide(Naphthol AS-G) to obtain the yellow water-soluble dyestuff having the formula

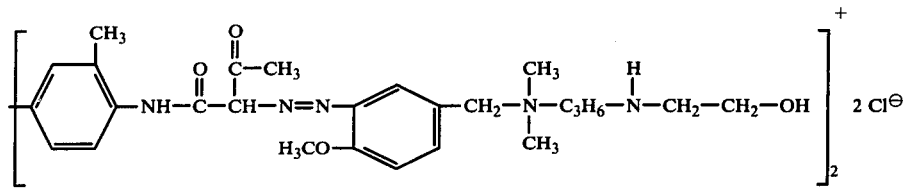

The visible absorption spectrum of an aqueous solution of this dyestuff, containing 0.2 g. of dye per liter of solution, showed a maximum at 403 millimicrons, A = 1.04.

EXAMPLE 43

Proceeding in a manner similar to that described above in Example 3, N,N-dimethyl-N-(3-amino-4-methoxybenzyl)-N-3-formamidopropylammonium chloride was hydrolyzed and the resulting N,N-dimethyl-N-(3-amino-4-methoxybenzyl)-N-3-aminopropylammonium chloride was diazotized and coupled with meta-toluidine to obtain N,N-dimethyl-N-[3-(4-amino-2-methylphenyl)azo-4-methoxybenzyl]-N-3-aminopropylammonium chloride in aqueous solution. This product was diazotized in situ and coupled with 4'-methylacetoacetanilide to obtain the orange, water-soluble dyestuff having the formula

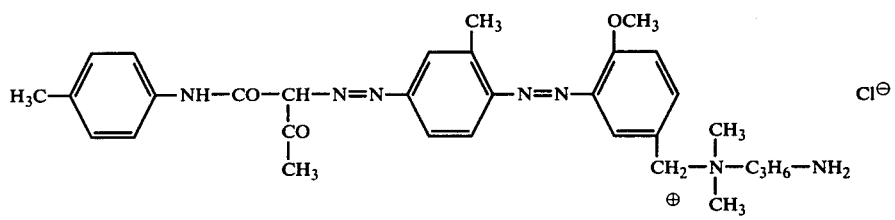

The visible absorption spectrum of an aqueous solution of this dyestuff, containing 0.032 g. of dye per liter of solution, showed a maximum at 415 millimicrons, A = 1.175.

EXAMPLE 44

Proceeding in a manner similar to that described above in Example 3, N,N-dimethyl-N-(3-amino-4-methoxybenzyl)-N-3-formamidopropylammonium chloride was hydrolyzed and the resulting N,N-dimethyl-N-(3-amino-4-methoxybenzyl)-N-3-aminopropylammonium chloride was diazotized and coupled with 2-amino-4-methylanisole to obtain N,N-dimethyl-N-[3-(4-amino-5-methoxy-2-methylphenyl)azo-4-methoxybenzyl]-N-3-aminopropylammonium chloride in aqueous solution. This product was diazotized in situ and coupled with acetoacetanilide to obtain the brown, water-soluble dyestuff having the formula

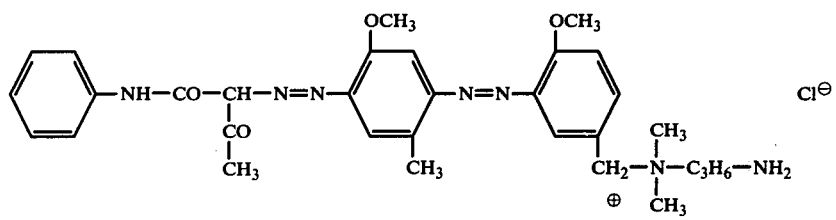

The visible absorption spectrum of an aqueous solution of this dyestuff, containing 0.024 g. of dye per liter of solution, showed a maximum at 453 millimicrons, A = 0.865.

EXAMPLE 45

Proceeding in a manner similar to that described above in Example 3, N,N-dimethyl-N-(3-amino-4-methoxybenzyl)-N-3-formamidopropylammonium chloride was hydrolyzed and the resulting N,N-dimethyl-N-(3-amino-4-methoxybenzyl)-N-3-aminopropylammonium chloride was diazotized and coupled with meta-toluidine to obtain N,N-dimethyl-N-[3-(4-amino-2-methylphenyl)azo-4-methoxybenzyl]-N-3-aminopropylammonium chloride in aqueous solution. This product was diazotized in situ and coupled with 4'-chloroacetoacetanilide to obtain the yellow, water-soluble dyestuff having the formula

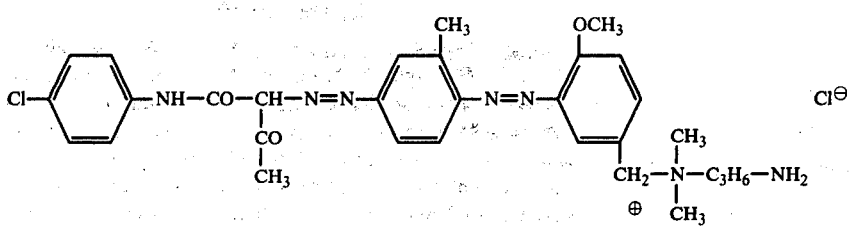

The visible absorption spectrum of an aqueous solution of this dyestuff, containing 0.12 g. of dye per liter of solution, showed a maximum at 414 millimicrons, A = 0.800.

EXAMPLE 46

Proceeding in a manner similar to that described above in Example 3, N-methyl-N-(5-amino-2-methoxybenzyl)-N,N-bis(3-formamidopropyl)ammonium chloride was hydrolyzed and the resulting N-methyl-N-(5-amino-2-methoxybenzyl)-N,N-bis(3-aminopropyl)ammonium chloride was diazotized and coupled with 3-hydroxy-5'-chloro-2-naphth-o-anisidide (Naphthol AS-EL) to obtain the red, water-soluble dyestuff having the formula

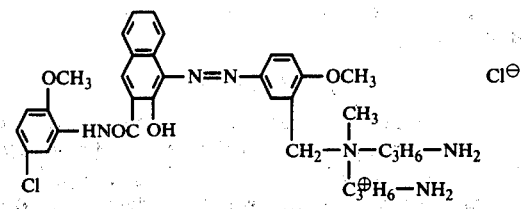

An aqueous solution of the dyestuff, containing 0.1 g. of dye per liter of solution, showed a maximum at 522 millimicrons, A = 0.575.

EXAMPLE 47

Proceeding in a manner simular to that described above in Example 3, N-methyl-N-(5-amino-2-methoxybenzyl)-N,N-bis(3-formamidopropyl)ammonium chloride was hydrolyzed and the resulting N-methyl-N-(5-amino-2-methoxybenzyl)-N,N-bis(3-aminopropyl)ammonium chloride was diazotized and coupled with 3-hydroxy-3'-nitro-2-naphthanilide (Naphthol AS-BS) to obtain the red, water-soluble dyestuff having the formula

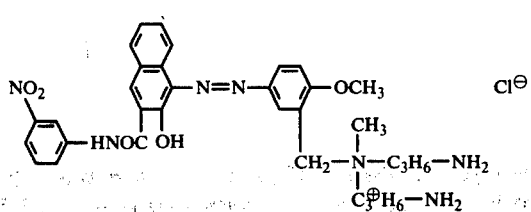

An aqueous solution of the dyestuff, containing 0.1 g. of dye per liter of solution, showed a maximum at 525 millimicrons, A = 0.451.

EXAMPLE 48

Proceeding in a manner similar to that described above in Example 3, N-methyl-N-(3-amino-4-methoxybenzyl)-N,N-bis(3-formamidopropyl)ammonium chloride was hydrolyzed and the resulting N-methyl-N-(3-amino-4-methoxybenzyl)-N,N-bis(3-aminopropyl)ammonium chloride was diazotized and coupled with 3-hydroxy-3'-nitro-2-naphthanilide (Naphthol AS-BS) to obtain the red, water-soluble dyestuff having the formula

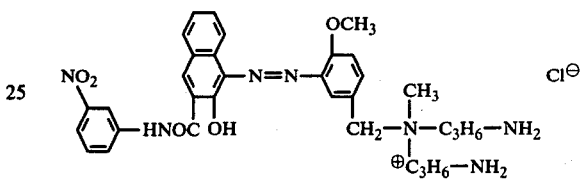

An aqueous solution of the dyestuff, containing 0.25 g. of dye per liter of solution, showed two maxima at 520 millimicrons, A = 0.475; at 542 millimicrons, A = 0.472.

EXAMPLE 49

Proceeding in a manner similar to that described above in Example 3, N-methyl-N-(5-amino-2-methoxybenzyl)-N,N-bis(3-formamidopropyl)ammonium chloride was hydrolyzed and the resulting N-methyl-N-(5-amino-2-methoxybenzyl)-N,N-bis(3-aminopropyl)ammonium chloride was diazotized and coupled with 3-hydroxy-2-naphtho-o-phenetidide (Naphthol AS-PH) to obtain the red, water-soluble dyestuff having the formula

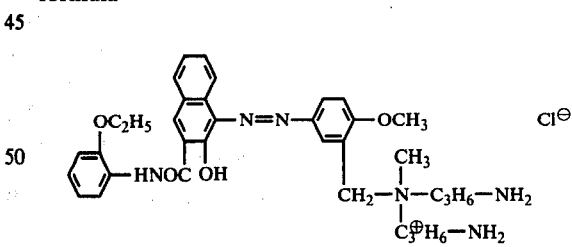

An aqueous solution of the dyestuff, containing 0.1 g. of dye per liter of solution, showed a maximum at 519.5 millimicrons, A = 0.475.

EXAMPLE 50

Proceeding in a manner similar to that described above in Example 3, N-methyl-N-(5-amino-2-methoxybenzyl)-N,N-bis(3-formamidopropyl)ammonium chloride was hydrolyzed and the resulting N-methyl-N-(5-amino-2-methoxybenzyl)-N,N-bis(3-aminopropyl)ammonium chloride was diazotized and coupled with 3-hydroxy-2-naphth-o-anisidide (Naphthol AS-OL) to obtain the red, water-soluble dyestuff having the formula

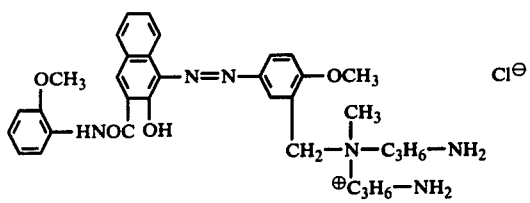

An aqueous solution of the dyestuff, containing 0.1 g. of dye per liter of solution, showed a maximum at 520 millimicrons, A = 2.39.

EXAMPLE 51

Proceeding in a manner similar to that described above in Example 3, N,N-diethyl-N-(3-amino-4-methoxybenzyl)-N-4-formamido-4-methylbutylammonium chloride was hydrolyzed and the resulting N,N-diethyl-N-(3-amino-4-methoxybenzyl)-N-4-amino-4-methylbutylammonium chloride was diazotized and coupled with 3-hydroxy-2-naphth-o-anisidide (Naphthol AS-OL) to obtain the red, water-soluble dyestuff having the formula

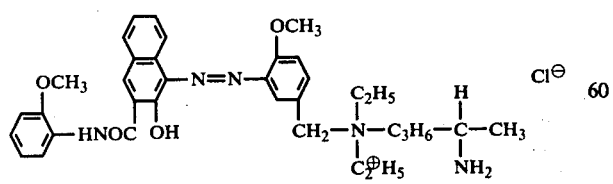

The visible absorption spectrum of an aqueous solution of this dyestuff, containing 0.1 g. of dye per liter of solution, showed two maxima: at 515 millimicrons, A = 0.813; and at 543 millimicrons, A = 0.774.

EXAMPLE 52

Proceeding in a manner similar to that described above in Example 3, N-methyl-N-(3-amino-4-methoxybenzyl)-N,N-bis(3-formamidopropyl)ammonium chloride was hydrolyzed and the resulting N-methyl-N-(3-amino-4-methoxybenzyl)-N,N-bis(3-aminopropyl)ammonium chloride was diazotized and coupled with 7-benzamido-4-hydroxy-2-naphthalene sulfonic acid to obtain the red water-soluble dyestuff having the formula

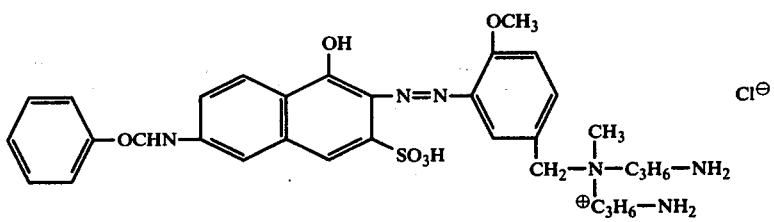

An aqueous solution of the dyestuff, containing 0.1 g. of dye per liter of solution, showed a maximum at 494 millimicrons, A = 1.54.

EXAMPLE 53

Proceeding in a manner similar to that described above in Example 3, N-[3-(p-aminophenoxy)-2-hydroxy-1-propyl]-N,N-bis(3-formamidopropyl)-N-methylammonium chloride was hydrolyzed and the resulting N-[3-(p-aminophenoxy)-2-hydroxy-1-propyl]-N,N-bis(3-aminopropyl)-N-methylammonium chloride was diazotized and coupled with 3-hydroxy-2-naphth-o-anisidide (Naphthol AS-OL) to obtain the red, water-soluble dyestuff having the formula

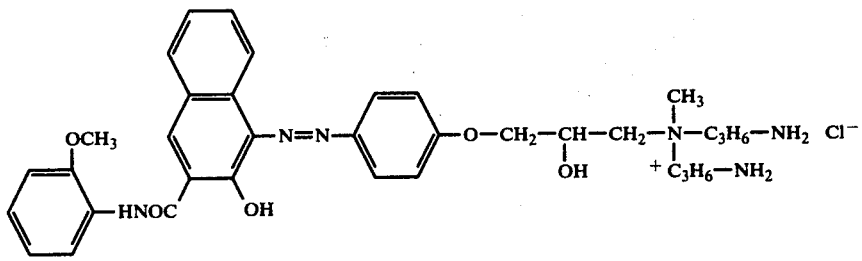

An aqueous solution of the dyestuff, containing 0.04 g. of dye per liter of solution, showed a maximum at 525 millimicrons, A = 1.094.

EXAMPLE 54

Proceeding in a manner similar to that described above in Example 1, part A, for diazotizing N,N-dimethyl-N-(3-amino-4-methoxybenzyl)-N-benzamidopropylammonium chloride and coupling with 3-hydroxy-2-naphth-o-anisidide (Naphthol AS-OL), there was obtained the red dyestuff having the formula

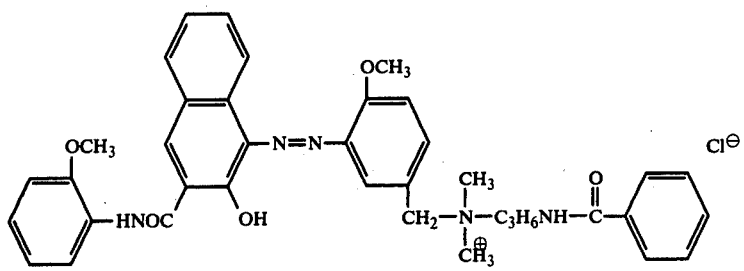

The visible absorption spectrum of an aqueous solution of this dyestuff, containing 0.1 g. of dye per liter of solution, showed two maxima: at 513 millimicrons, A = 2.498; at 543 millimicrons, A = 2.458.

EXAMPLE 55

Proceeding in a manner similar to that described above in Example 3, N,N-dimethyl-N-(3-amino-4-methoxybenzyl)-N-2-formamidoethylammonium chloride was hydrolyzed and the resulting N,N-dimethyl-N-(3-amino-4-methoxybenzyl)-N-2-aminoethylammonium chloride was diazotized and coupled with 3-hydroxy-2-naphth-o-anisidide (Naphthol AS-OL) to obtain the red, water-soluble dyestuff having the formula

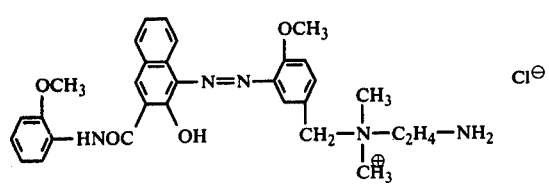

The visible absorption spectrum of an aqueous solution of this dyestuff, containing 0.1 g. of dye per liter of solution, showed two maxima: at 516 millimicrons, A = 1.002; and at 544 millimicrons, A = 1.007.

EXAMPLE 56

Proceeding in a manner similar to that described above in Example 3, N,N-dimethyl-N-(5-amino-1-naphthyl)-N-3-formamidopropylammonium chloride was hydrolyzed and the resulting N,N-dimethyl-N-(5-amino-1-naphthyl)-N-3-aminopropylammonium chloride was diazotized and coupled with acetoacetanilide to obtain the yellow water-soluble dyestuff having the formula

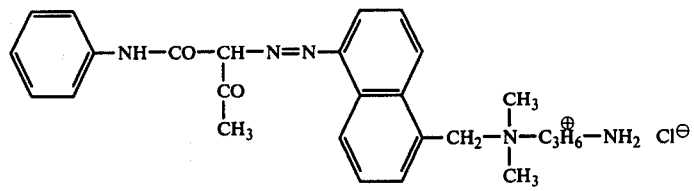

An aqueous solution of the dyestuff, containing 0.032 g. of the dye per liter of solution, showed a maximum at 400 millimicrons, A = 1.305.

EXAMPLE 57

Proceeding in a manner similar to that described above in Example 3, N,N-dimethyl-N-(5-amino-1-naphthyl)-N-3-formamidopropylammonium chloride was hydrolyzed and the resulting N,N-dimethyl-N-(5-amino-1-naphthyl)-N-3-aminopropylammonium chloride was diazotized and coupled with acetoacet-o-anisidide to obtain the yellow water-soluble dyestuff having the formula

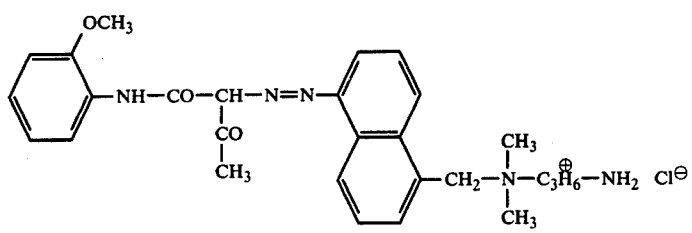

An aqueous solution of the dyestuff, containing 0.04 g. of the dye per liter of solution, showed a maximum at 407 millimicrons, A = 1.28.

EXAMPLE 58

Proceeding in a manner similar to that described above in Example 3, N-[3-(p-aminophenoxy)-2-hydroxy-1-propyl]-N,N-bis(3-formamidopropyl)-N-methylammonium chloride was hydrolyzed and the resulting N-[3-(p-aminophenoxy)-2-hydroxy-1-propyl]-N,N-bis(3-aminopropyl)-N-methylammonium chloride was diazotized and coupled with 4,4'-bi-o-acetoacetotoluidide (Naphthol AS-G) to obtain the yellow, water-soluble dyestuff having the formula

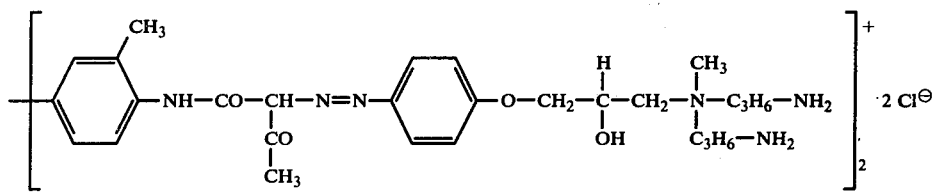

An aqueous solution of the dyestuff, containing 0.16 g. of dye per liter of solution, showed a maximum at 404 millimicrons, A = 0.855.

EXAMPLE 59

Proceeding in a manner similar to that described above in Example 3, N-methyl-N-(5-amino-2-methoxybenzyl)-N,N-bis(3-formamidopropyl)ammonium chloride was hydrolyzed and the resulting N-methyl-N-(5-amino-2-methoxybenzyl)-N,N-bis(3-aminopropyl)ammonium chloride was diazotized and coupled with 4,4′-bi-o-acetoacet-o-toluidide (Naphthol AS-G) to obtain the yellow water-soluble dyestuff having the formula An aqueous solution of the dyestuff, containing 0.03 g. of dye per liter of solution, showed a maximum at 455 millimicrons, A = 1.16.

EXAMPLE 61

Proceeding in a manner similar to that described above in Example 3, N-methyl-N-(3-amino-4-methoxybenzyl)-N,N-bis(3-formamidopropyl)ammonium chloride was hydrolyzed and the resulting N-methyl-N-(3-amino-4-methoxybenzyl)-N,N-bis(3-aminopropyl)ammonium chloride was diazotized and coupled with m-phenylenediamine to obtain the brown water-soluble dyestuff having the formula

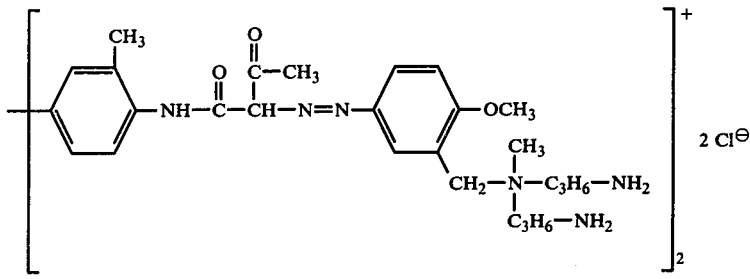

An aqueous solution of the dyestuff, containing 0.1 g. of dye per liter of solution, showed a maximum at 399 millimicrons, A = 3.09.

EXAMPLE 60

Proceeding in a manner similar to that described above in Example 3, N-methyl-N-(3-amino-4-methoxybenzyl)-N,N-bis(3-formamidopropyl)ammonium chloride was hydrolyzed and the resulting N-methyl-N-(3-amino-4-methoxybenzyl)-N,N-bis(3-aminopropyl)ammonium chloride was diazotized and coupled with resorcinol to obtain the brown water-soluble dyestuff having the formula

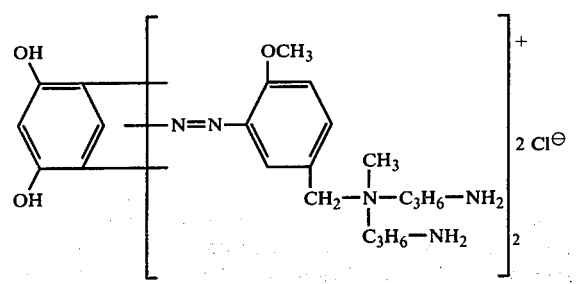

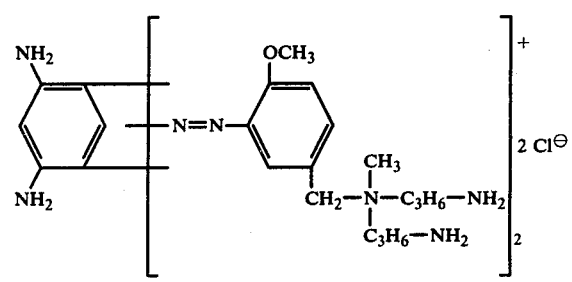

An aqueous solution of the dyestuff, containing 0.1 g. of dye per liter of solution, showed a maximum at 455 millimicrons, A = 0.207.

EXAMPLE 62

Proceeding in a manner similar to that described above in Example 3, N-methyl-N-(3-amino-4-methoxybenzyl)-N,N-bis(3-formamidopropyl)ammonium chloride was hydrolyzed and the resulting N-methyl-N-(3-amino-4-methoxybenzyl)-N,N-bis(3-aminopropyl)ammonium chloride was diazotized and coupled with 8-amino-1-naphthol-5-sulfonic acid (S acid) to obtain the black water-soluble dyestuff having the formula

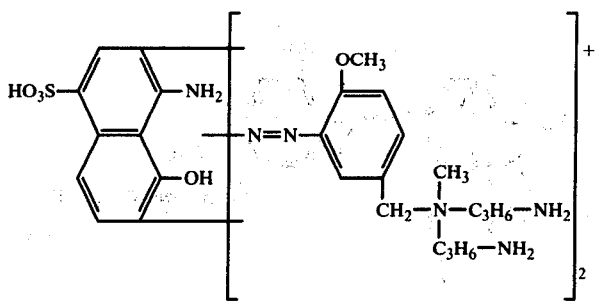

An aqueous solution of the dyestuff, containing 0.2 g. of dye per liter of solution, showed a maximum at 563 millimicrons, A = 0.90.

EXAMPLE 63

Proceeding in a manner similar to that described above in Example 3, N-methyl-N-(3-amino-4-methoxybenzyl)-N,N-bis(3-formamidopropyl)ammonium chloride was hydrolyzed and the resulting N-methyl-N-(3-amino-4-methoxybenzyl)-N,N-bis(3-aminopropyl)ammonium chloride was diazotized and coupled with 6-amino-1-naphthol-3-sulfonic acid (J acid) to obtain the red water-soluble dyestuff having the formula An aqueous solution of the dyestuff, containing 0.1 g. of dye per liter of solution, showed a maximum at 513 millimicrons, A = 0.23.

EXAMPLE 64

Proceeding in a manner similar to that described above in Example 3, N-methyl-N-(3-amino-4-methoxybenzyl)-N,N-bis(3-formamidopropyl)ammonium chloride was hydrolyzed and the resulting N-methyl-N-(3-amino-4-methoxybenzyl)-N,N-bis(3-aminopropyl)ammonium chloride was diazotized and coupled with 6,6'-ureylenebis(1-naphthol-3-sulfonic acid) (J acid urea) to obtain the red water-soluble dyestuff having the formula

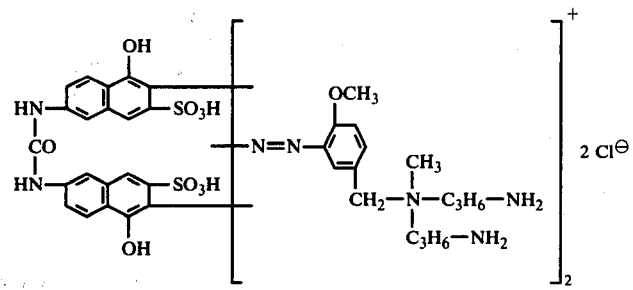

An aqueous solution of the dyestuff, containing 0.02 g. of dye per liter of solution, showed a maximum at 516 millimicrons, A = 0.70.

EXAMPLE 65

Proceeding in a manner similar to that described above in Example 3, N-methyl-N-(3-amino-4-methoxybenzyl)-N,N-bis(3-formamidopropyl)ammonium chloride was hydrolyzed and the resulting N-methyl-N-(3-amino-4-methoxybenzyl)-N,N-bis(3-aminopropyl)ammonium chloride was diazotized and coupled with N,N'-ethylenebis(3-hydroxy-2-naphthamide) to obtain the red water-soluble dyestuff having the formula

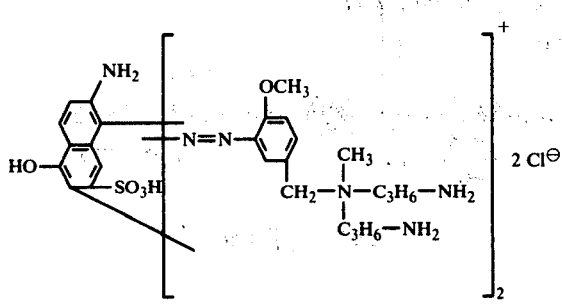

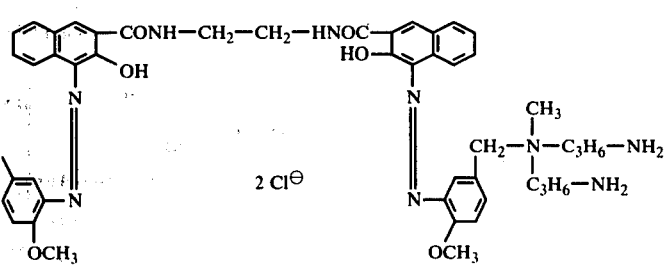

EXAMPLE 66

When a procedure similar to that described in Example 1A, is followed for diazotization of N,N-dimethyl-N-2-(p-aminophenoxy)-ethyl-N-3-formamidopropylammonium chloride and coupling with 3-hydroxy-2-naphth-o-anisidide (Naphthol AS-OL), there is obtained the dyestuff having the formula

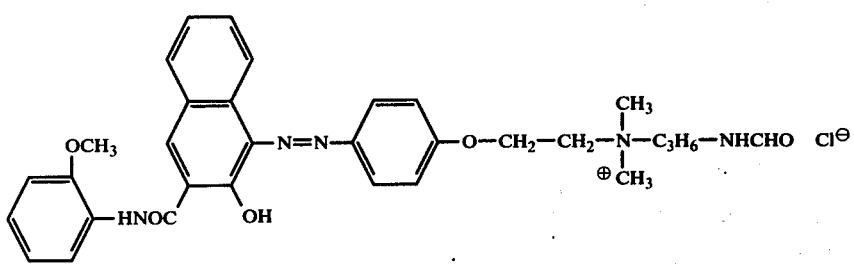

EXAMPLE 67

When a procedure similar to that described in Example 1A, is followed for diazotization of N,N-diethyl-N-2-(N'-methyl-p-aminobenzamido)ethyl-N-3-formamidopropylammonium chloride and coupling with 4,4'-bi-o-acetoacetanisidide, there is obtained the dyestuff having the formula

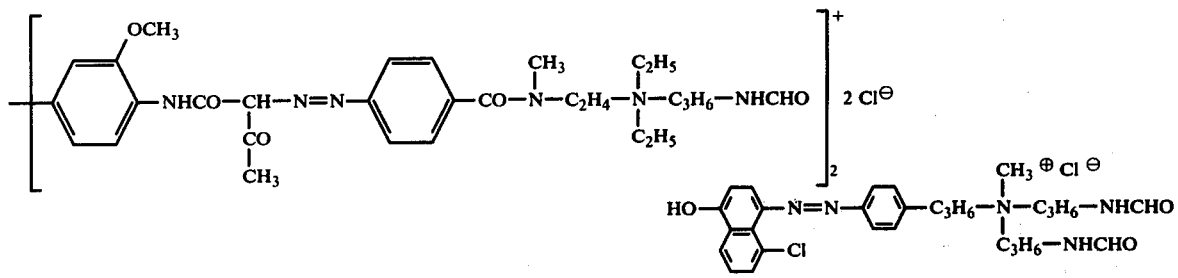

EXAMPLE 68

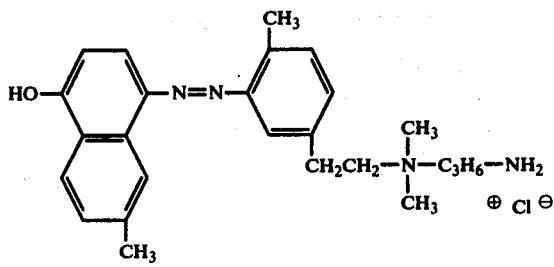

EXAMPLE 69

EXAMPLE 70

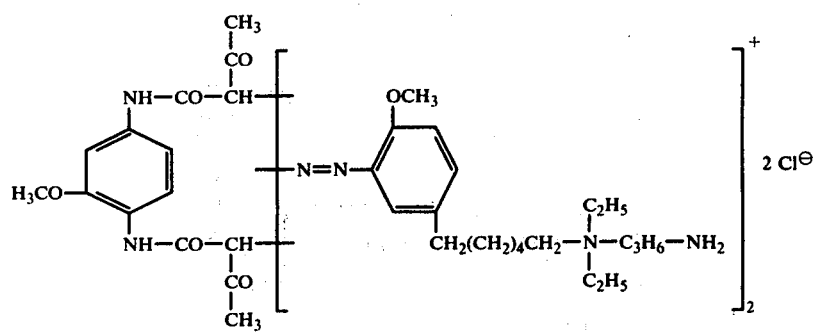

EXAMPLE 71
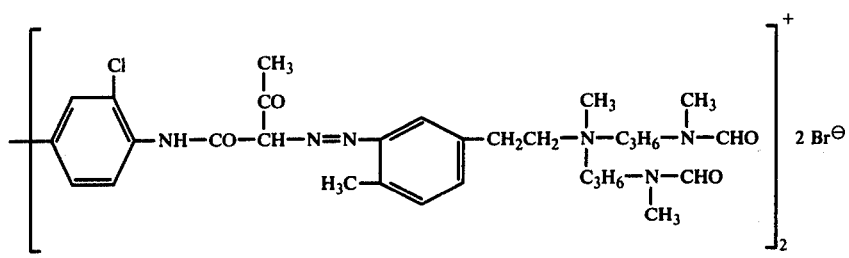
EXAMPLE 74
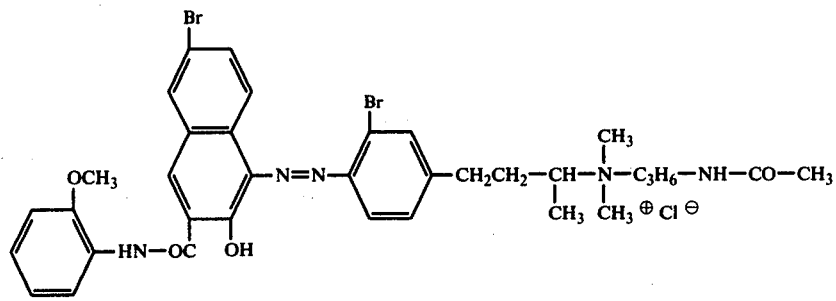
EXAMPLE 72
EXAMPLE 75
EXAMPLE 73
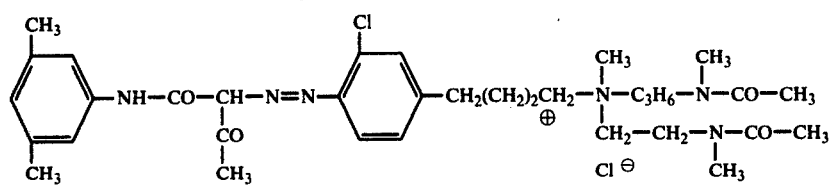
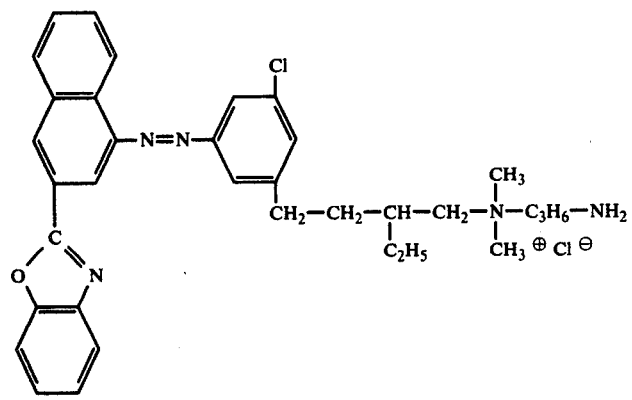

EXAMPLE 76
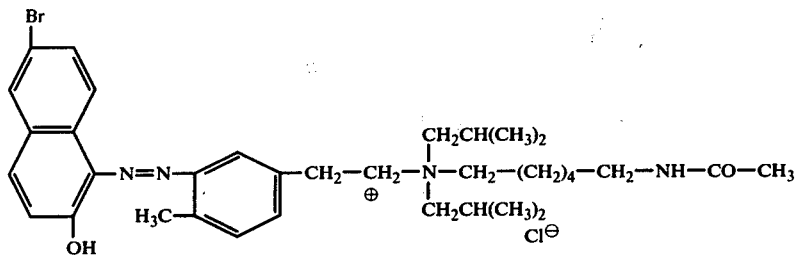
EXAMPLE 77
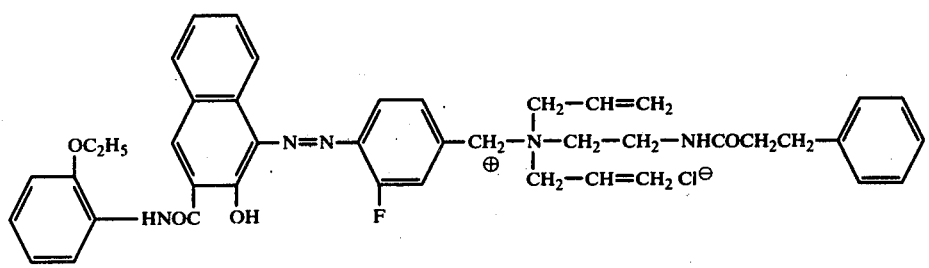
EXAMPLE 78
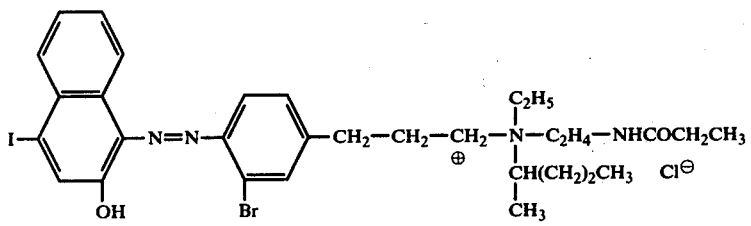
EXAMPLE 79
EXAMPLE 80
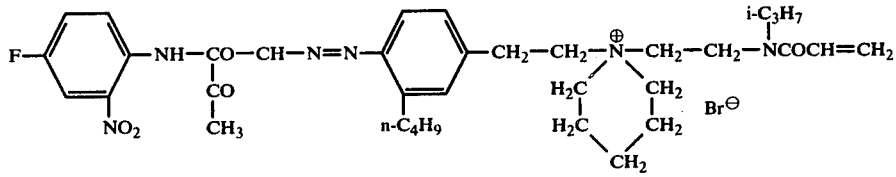
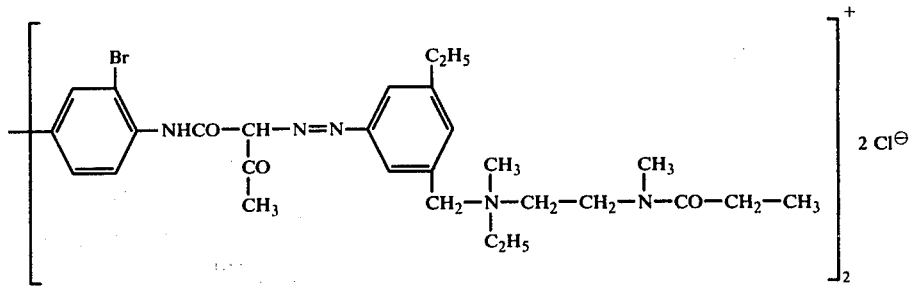

EXAMPLE 81
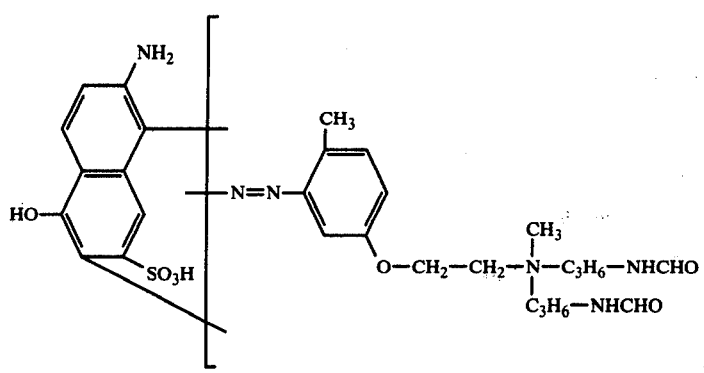
EXAMPLE 82
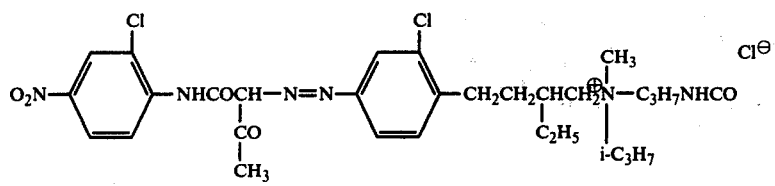
EXAMPLE 83
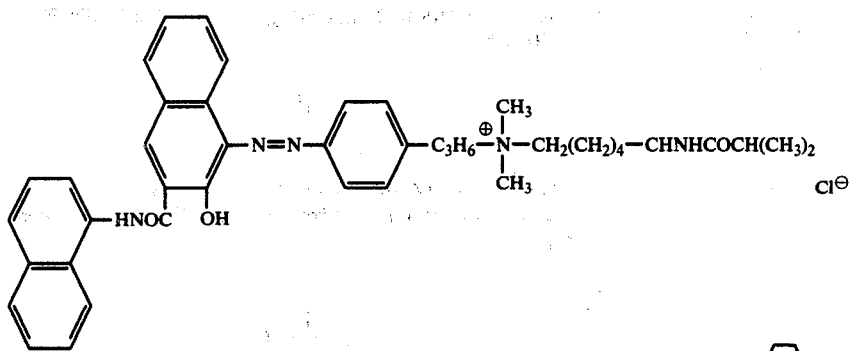
EXAMPLE 84
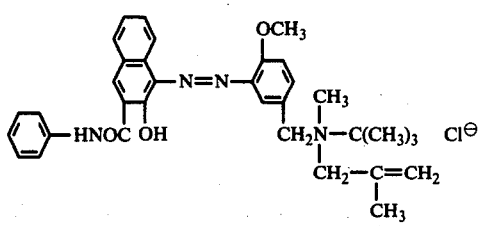
EXAMPLE 85
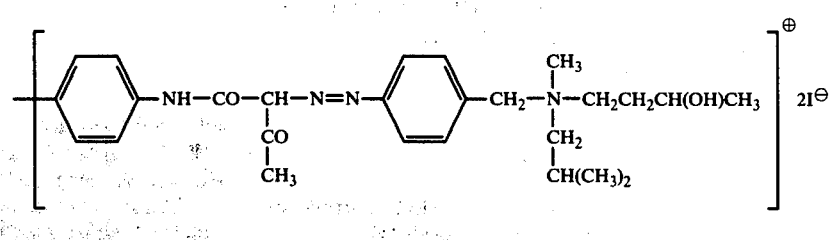

EXAMPLE 86

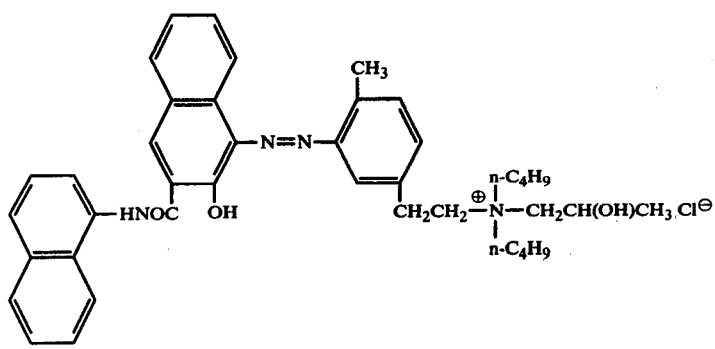

EXAMPLE 87

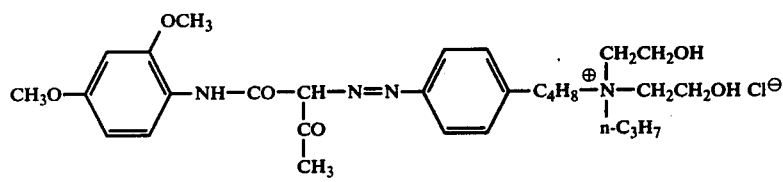

EXAMPLE 88

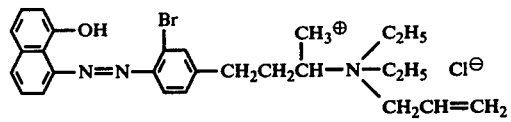

We claim:
1. A compound of the formula

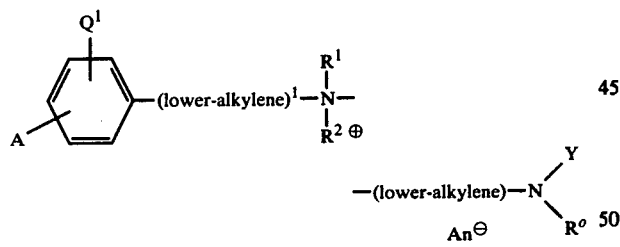

wherein:
A is nitro or amino;
$Q^1$ is hydrogen, lower-alkyl, lower-alkoxy or halogen;
$R°$ is hydrogen, lower-alkyl or hydroxy-lower-alkyl;
$R^1$ is lower-alkyl, lower alkenyl or hydroxy-lower-alkyl;
$R_2$ is lower-alkyl, lower-alkenyl, hydroxy-lower-alkyl or -(lower-alkenylene)-NR°Y;
Y is

—C—R wherein R is hydrogen, lower-alkyl, lower-alkenyl, phenyl or phenyl-lower-alkyl; and An is an anion selected from the class consisting of halide, hydroxy, alkanoate, hydroxyalkanoate, nitrate, phosphate, alkylsulfonate and arylsulfonate.

2. A compound according to claim 1 wherein $R^1$ and $R^2$ are each lower-alkyl.

3. A compound according to claim 2 wherein (lower-alkylene) is 1,3-propylene; (lower-alkylene)$^1$ is methylene; $R^1$ and $R^2$ are each methyl; and $Q^1$ is 4-methoxy.

4. The compound according to claim 3 wherein A is 3-nitro; Y is

—C—R wherein R is hydrogen; and R° is hydrogen.

5. The compound according to claim 3 wherein A is 3-amino; Y is

—C—R wherein R is hydrogen; and R° is hydrogen.

6. The compound according to claim 3 wherein A is 3-nitro; Y is

—C—R wherein R is phenyl; and R° is hydrogen.

7. The compound according to claim 3 wherein A is 3-amino; Y is

—C—R wherein R is phenyl; and R° is hydrogen.

8. A compound according to claim 1 wherein $R^2$ is -(lower-alkylene)-NR°Y.

9. The compound according to claim 8 wherein $R^1$ is methyl; A is 3-nitro; $Q^1$ is 4-methoxy; (lower-alkylene)

is 1,3-propylene; (lower-alkylene)¹ is methylene; R° is hydrogen; and Y is

wherein R is hydrogen.

10. The compound according to claim 8 wherein R¹ is methyl; A is 3-amino; Q¹ is 4-methoxy; (lower-alkylene) is 1,3-propylene; (lower-alkylene)¹ is methylene; R° is hydrogen; and Y is

wherein R is hydrogen.

11. A compound of the formula

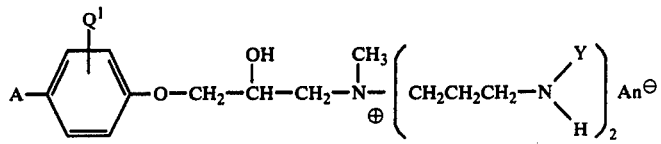

wherein:
A is nitro or amino;
Q¹ is hydrogen, lower-alkyl, lower-alkoxy or halogen;
Y is formyl; and
An is an anion selected from the class consisting of halide, hydroxy, alkanoate, hydroxyalkanoate, nitrate, phosphate, alkylsulfonate and arylsulfonate.

12. A compound according to claim 11 wherein A is nitro; and Q¹ is hydrogen.

* * * * *

UNITED STATES PATENT AND TRADEMARK OFFICE
CERTIFICATE OF CORRECTION

PATENT NO. : 4,146,558

DATED : March 27, 1979

INVENTOR(S) : Patrick J. Jefferies and Nathan N. Crounse

It is certified that error appears in the above-identified patent and that said Letters Patent is hereby corrected as shown below:

In the title, "INTERMEDIATE" should read -- INTERMEDIATES: --; and "AMINEALKYL" should read -- AMINOALKYL --.

Column 1, title, "INTERMEDIATE" should read -- INTERMEDIATES: --; and "AMINEALKYL" should read -- AMINOALKYL --.

Column 1, line 22, "U.S. Pat. No. 4,103,042" should read -- U.S. Pat. No. 4,103,092 --.

UNITED STATES PATENT AND TRADEMARK OFFICE
CERTIFICATE OF CORRECTION

PATENT NO. : 4,146,558
DATED : March 27, 1979
INVENTOR(S) : Patrick J. Jefferies and Nathan N. Crounse It is certified that error appears in the above-identified patent and that said Letters Patent is hereby corrected as shown below:

Column 83, claim 1, line 60, "-(lower-alkenylene)-" should read -- -(lower-alkylene)- --.

Signed and Sealed this

Twenty-sixth Day of November 1985

[SEAL]

Attest:

DONALD J. QUIGG

Attesting Officer

Commissioner of Patents and Trademarks